United States Patent
Isono

(10) Patent No.: US 7,309,112 B2
(45) Date of Patent: Dec. 18, 2007

(54) BRAKING SYSTEM HAVING VALVE DEVICE FOR DELIVERING PRESSURIZED FLUID TO BRAKE CYLINDER SELECTIVELY FROM AT LEAST TWO PRESSURIZING CHAMBERS OR ONLY ONE OF THEM

(75) Inventor: Hiroshi Isono, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 16 days.

(21) Appl. No.: 09/833,763

(22) Filed: Apr. 13, 2001

(65) Prior Publication Data
US 2001/0038243 A1    Nov. 8, 2001

(30) Foreign Application Priority Data
May 2, 2000    (JP)    ............................. 2000-133541
Apr. 2, 2001    (JP)    ............................. 2001-103288

(51) Int. Cl.
*B60T 13/18*    (2006.01)

(52) U.S. Cl. ................... 303/11; 303/113.4; 303/113.5; 303/114.1; 303/115.4; 303/122.11

(58) Field of Classification Search ................. 303/11, 303/113.4, 113.5, 114.1, 115.4, 115.5, 116.1, 303/116.2, 122.11
See application file for complete search history.

(56) References Cited

U.S. PATENT DOCUMENTS

| | | | |
|---|---|---|---|
| 2,587,023 A | | 2/1952 | Allyn |
| 4,852,952 A | | 8/1989 | Kervagoret |
| 5,234,086 A | * | 8/1993 | Matsuda et al. ............. 188/358 |
| 5,249,853 A | * | 10/1993 | Reinartz et al. .......... 303/114.1 |
| 5,470,137 A | * | 11/1995 | Every et al. ................ 303/188 |
| 5,496,099 A | | 3/1996 | Resch |
| 5,707,115 A | * | 1/1998 | Bodie et al. ................... 303/3 |
| 5,826,953 A | * | 10/1998 | Heubner ................ 303/122.13 |
| 5,882,093 A | * | 3/1999 | Enomoto et al. ........... 303/152 |
| 6,007,164 A | * | 12/1999 | Sakai et al. ............ 303/122.12 |
| 6,076,897 A | * | 6/2000 | Binder et al. ............ 303/116.1 |
| 6,126,248 A | | 10/2000 | Kawahata et al. |
| 6,186,602 B1 | * | 2/2001 | Jonner et al. ............ 303/115.4 |
| 6,196,641 B1 | * | 3/2001 | Oka et al. ................ 303/114.1 |
| 6,206,484 B1 | * | 3/2001 | Ganzel ..................... 303/113.4 |
| 6,231,134 B1 | * | 5/2001 | Fukasawa et al. .......... 303/152 |
| 6,264,287 B1 | | 7/2001 | Sekihara |
| 6,322,162 B2 | | 11/2001 | Mohr |
| 6,412,881 B1 | | 7/2002 | Isono |

(Continued)

FOREIGN PATENT DOCUMENTS

DE    24 36 059 A1    2/1976

(Continued)

*Primary Examiner*—Bradley King
(74) *Attorney, Agent, or Firm*—Oliff & Berridge, PLC

(57) ABSTRACT

Braking system including a master cylinder having at least two pressurizing pistons partially defining at least two mutually isolated pressurizing chambers, and wherein a working fluid in each pressurizing chamber is pressurized by an advancing movement of the corresponding pressurizing piston, a hydraulically operable brake cylinder for activating a brake, and a valve device having a first state in which the pressurized fluid is delivered from two pressurizing chambers of the at least two pressurizing chambers to the brake cylinder, and a second state in which the pressurized fluid is delivered from only one of the two pressurizing chambers.

43 Claims, 21 Drawing Sheets

U.S. PATENT DOCUMENTS 6,412,882 B1    7/2002  Isono et al.

FOREIGN PATENT DOCUMENTS

| | | | |
|---|---|---|---|
| DE | 34 26 612 | * | 1/1986 |
| DE | 37 28 298 A1 | | 3/1989 |
| DE | 44 25 578 A1 | | 1/1996 |
| DE | 196 39 537 A1 | | 4/1998 |
| DE | 197 16 404 | * | 10/1998 |
| DE | 198 13 031 A1 | | 5/1999 |
| DE | 199 17 810 A1 | | 11/1999 |
| DE | 198 33 084 C1 | | 2/2000 |
| DE | 199 21 478 A1 | | 11/2000 |
| JP | A 7-40820 | | 2/1995 |
| JP | 11-341604 | * | 5/1998 |
| WO | WO 97/26168 A1 | | 7/1997 |

* cited by examiner

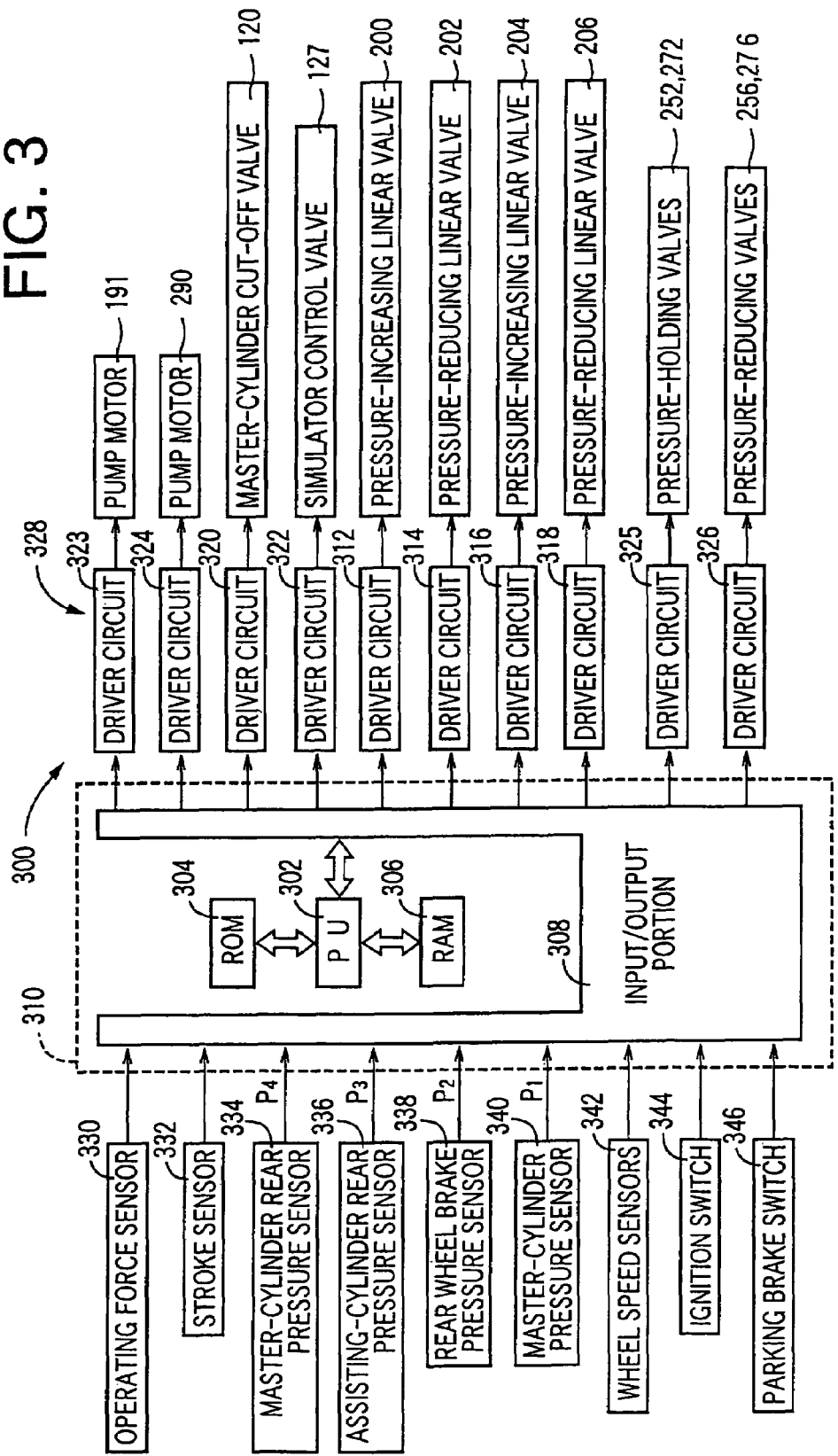

FIG. 15

| MASTER-CYLINDER CUT-OFF VALVE 120 | | ELEMENTS DETERMINED TO BE DEFECTIVE |
|---|---|---|
| IN CLOSED STATE | IN OPEN STATE | |
| $P_2, P_3 \fallingdotseq 0$ | $P_1, P_2, P_3 \fallingdotseq 0$ | DEFECTIVE SERVO SYSTEM |
| ABNORMAL $F_P$-$P_1$ RELATIONSHIP | $P_1 = P_2 = P_3$ | DEFECTIVE OPERATING-FORCE SENSOR 330 |
| ABNORMAL $F_P$-$P_1$ RELATIONSHIP | $P_1 \neq P_2 = P_3$ | DEFECTIVE MASTER-CYLINDER PRESSURE SENSOR 340 |
| $P_2 \neq P_3$, AND NORMAL $F_P$-$P_3$ RELATIONSHIP | ($P_1 \neq P_2$) | DEFECTIVE REAR WHEEL BRAKE PRESSURE SENSOR 338 |
| | $P_1 \fallingdotseq 0$, AND NORMAL $F_P$-$P_2$, $P_3$ RELATIONSHIP | DEFECTIVE FRONT SUB-SYSTEM |
| | $P_2 \fallingdotseq 0$, AND NORMAL $F_P$-$P_3$ RELATIONSHIP | DEFECTIVE REAR SUB-SYSTEM |

BRAKING SYSTEM HAVING VALVE DEVICE FOR DELIVERING PRESSURIZED FLUID TO BRAKE CYLINDER SELECTIVELY FROM AT LEAST TWO PRESSURIZING CHAMBERS OR ONLY ONE OF THEM

This application is based on Japanese Patent Application Nos. 2000-133541 filed May 2, 2000 and 2001-103288 filed Apr. 2, 2001, respectively, the contents of which are incorporated hereinto by reference.

BACKGROUND OF THE INVENTION

1. Field of the Invention

The present invention relates to a hydraulically operated braking system including a maser cylinder and a brake cylinder.

2. Discussion of Related Art

JP-A-7-40820 discloses an example of a hydraulic braking apparatus of the type including a master cylinder operable to generate a fluid pressure corresponding to an operating force of a manually operable brake operating member, and a brake cylinder activated with the fluid pressure generated by the master cylinder. In the braking apparatus disclosed in the above-identified publication, there are disposed a master-cylinder cut-off valve and an assisting cylinder in series connection with each other between one pressurizing chamber of the master cylinder and the brake cylinder. The assisting cylinder has a variable-volume chamber. In an anti-lock braking pressure control, the master-cylinder cut-off valve is closed to isolate the brake cylinder from the master cylinder, and the assisting cylinder is operated so as to change the volume of its variable-volume chamber, for increasing and reducing the fluid pressure in the brake cylinder, irrespective of the operating force of the brake operating member (irrespective of the fluid pressure in the master cylinder).

SUMMARY OF THE INVENTION

It is an object of the present invention to provide an improved hydraulically operated braking system including a hydraulic braking apparatus having a master cylinder and a brake cylinder. This object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A braking system comprising:

a master cylinder including a housing, and at least two pressurizing pistons which are fluid-tightly and slidably fitted in the housing and which cooperate with the housing to define at least two pressurizing chambers which are isolated from each other, and wherein a working fluid in each of the at least two pressurizing chambers is pressurized by an advancing movement of a corresponding one of the at least two pressurizing pistons;

a hydraulically operable brake cylinder for activating a brake; and a valve device having a first state in which the pressurized fluid is delivered from two pressurizing chambers of the at least two pressurizing chambers to the brake cylinder, and a second state in which the pressurized fluid is delivered from only one of the two pressurizing chambers.

The braking system constructed according to the above mode (1) of the present invention includes a hydraulic braking apparatus wherein the brake is activated by the brake cylinder operated by the pressurized fluid delivered from the master cylinder. The master cylinder has at least two pressurizing chambers which partially define at least two mutually isolated two pressurizing chambers. When the at least two pressurizing pistons are advanced, the fluid in each pressurizing chamber is pressurized.

The master cylinder may be of any type, provided it includes at least two pressurizing pistons. For instance, the master cylinder is of a tandem type including two pressurizing pistons arranged in series with each other. In this case, two pressurizing chambers are formed in front of the respective two pressurizing pistons such that the two pressurizing chambers are isolated from each other (or formed independently of each other). Alternatively, the master cylinder is provided with a small-diameter piston and a large-diameter piston which are movable as a unit. In this case, two pressurizing chambers are formed independently of each other, in front of the respective small-diameter and large-diameter pistons. In the latter case, the master cylinder may be considered to include a single stepped piston having a small-diameter portion and a large-diameter portion which serve as respective two pistons movable as a unit.

Irrespective of the type of the master cylinder, the present braking system includes a valve device operable between the first and second states. In the first state of the valve device, the brake cylinder is supplied with the pressurized fluid delivered from the two pressurizing chambers. In the second state, the brake cylinder is supplied with the pressurized fluid delivered from one of the two pressurizing chambers. In the first state in which the pressurized fluid is delivered from the two pressurizing chambers to the brake cylinder, the overall rate of flow of the pressurized fluid to the brake cylinder is higher than in the second state in which the pressurized fluid is delivered from only of the two pressurizing chambers to the brake cylinder. In the braking system according to the present mode (1) of this invention, the fluid flow from the master cylinder to the brake cylinder can be controlled in at least two different manners. In this respect, the present braking system is improved. The valve device may have a third state in which the pressurized fluid is delivered to the brake cylinder from none of the two pressurizing chambers indicated above. This valve device is useful in the braking system which is provided with a power-operated hydraulic pressure control device operable to control the fluid pressure in the brake cylinder while the brake cylinder is disconnected or isolated from the master cylinder.

The valve device may be of any type, provided the flow of the pressurized fluid from the pressurizing chambers of the master cylinder to the brake cylinder is controllable. The valve device may include only one valve or two or more valves. Where the valve device includes two or more valves, the valve device may include two or valves of the same kind or of different kinds, which may be disposed either in series with each other or in parallel with each other. The valve device may be an electromagnetically operated control valve operable with a controlled amount of electric current, a pilot-operated control valve operable according to a pilot pressure or a fluid pressure difference across the control valve, or a mechanically operated control valve. The valve device may be totally or partially incorporated within the master cylinder, or disposed outside the master cylinder. Where the valve device includes a plurality of valves, at least one of the valves may be incorporated within the master cylinder, with the other valve or valves being disposed externally of the master cylinder.

For instance, the valve device includes at least one valve selected from among: at least one cut-off valve; at least one pressure-relief valve; at least one check valve; and at least one directional control valve. The cut-off valve has an open state for permitting fluid flows through a fluid passage, and a closed state for inhibiting the fluid flows through the fluid passage. The cut-off valve may be a flow control valve whose amount of opening is controllable in the open state, to control a rate of flows of the fluid through the fluid passage. Alternatively, the cut-off valve may be a shut-off valve whose amount of opening is not controllable. The relief pressure of the pressure relief valve may be constant or variable. The relief pressure may be changed according to an electric signal applied to the pressure relief valve. The directional control valve may be switched according to an electric signal or pilot pressure applied thereto. A specific example of the directional control valve will be described later. The directional control valve may be considered to be a combination of a plurality of cut-off valves.

(2) A braking system according to the above mode (1), wherein the valve device is placed in the first state while the pressure of the pressurized fluid in one of the two pressurizing chambers is not higher than a predetermined value, and is placed in the second state while the pressure of the pressurized fluid in the above-indicated one pressurizing chamber is higher than the predetermined value. In this case, the valve device placed in the second state inhibits a flow of the pressurized fluid from the above-indicated one pressurizing chamber to the brake cylinder, and permits a flow of the pressurized fluid from the other of the two pressurizing chambers to the brake cylinder.

In the braking system according to the above mode (2), the pressurized fluid is delivered from the two pressurizing chambers to the brake cylinder while the pressure of the pressurized fluid in one of the two pressurizing chambers is not higher than a predetermined threshold, and is delivered from only the other pressurizing chamber to the brake cylinder while the pressure of the fluid in the above-indicated one pressurizing chamber is higher than the predetermined value. For increasing the fluid pressure in the brake cylinder by a given amount, a larger amount of the pressurized fluid is required to be delivered to the brake cylinder when the fluid pressure in the brake cylinder is relatively low at the time of initiation of the increase of the fluid pressure in the brake cylinder, than when the fluid pressure in the brake cylinder is relatively high. Accordingly, the fluid pressure in the brake cylinder can be increased at a high rate by delivering the pressurized fluid from both of the two pressurizing chambers while the fluid pressure in the two pressurizing chambers is relatively low.

The one and the other of the two pressurizing chambers may be fixed in the specific arrangement of the master cylinder, or may be changed as needed depending upon the operating condition of the braking system.

(3) A braking system according to the above mode (1), wherein the valve device is placed in the first state while the pressure of the pressurized fluid in one of the two pressurizing chambers is higher than that in the other of the two pressurizing chambers, and is placed in the second state while the pressure of the pressurizing fluid in the above-indicated one pressurizing chamber is lower than that in the other pressurizing chamber, the valve device placed in the second state permitting a flow of the pressurized fluid from the other pressurizing chamber to the brake cylinder and inhibiting a flow of the pressurized fluid from the above-indicated one pressurizing chamber to the brake cylinder.

In the braking system according to the above mode (3), the pressurized fluid is delivered from the two pressurizing chambers to the brake cylinder while the pressure of the pressurized fluid in one of the two pressurizing chambers is higher than that in the other pressurizing chamber. While the pressure of the fluid in the above-indicated one pressurizing chamber is equal to or lower than that in the other pressurizing chamber, the pressurized fluid is delivered from the above-indicated other pressurizing chamber to the brake cylinder, while the pressurized fluid is inhibited from being delivered from the above-indicated one pressurizing chamber to the brake cylinder.

(4) A braking system according to any one of the above modes (1)-(3), wherein the brake cylinder is connected to a first pressurizing chamber which is one of the two pressurizing chambers, and the valve device includes an internal valve incorporated within the master cylinder, the valve device having a state in which the pressurized fluid supplied from a second pressurizing chamber which is the other of the two pressurizing chambers, to the first pressurizing chamber, and a state in which the pressurized fluid is not supplied from the second pressurizing chamber to the first pressurizing chamber.

In the braking system according to the above mode (4), the valve device includes an element in the form of the internal valve incorporated in the master cylinder. Since this element of the valve device is disposed within the master cylinder, the braking system can be made smaller than when the entirety of the valve device is located outside the master cylinder. Further, the braking system does not require a fluid passage and ports which would be required to connect the two pressurizing chambers, at a position outside the master cylinder. Accordingly, the braking system is available at a reduced cost. The internal valve may be provided in the housing or the pressurizing piston of the master cylinder.

The valve device in the braking system according to the above mode (4) has a state in which the pressurized fluid is supplied from the second pressurizing chamber to the first pressurizing chamber through the internal valve, and a state in which the pressurized fluid is not supplied from the second pressurizing chamber to the first pressurizing chamber through the internal valve. When the pressurized fluid is supplied from the second pressurizing chamber to the first pressurizing chamber, the pressurized fluid is delivered from the two pressurizing chambers to the brake cylinder. When the fluid flow from the second pressurizing chamber to the first pressurizing chamber is inhibited, the pressurized fluid is not delivered from the second pressurizing chamber to the brake cylinder. Namely, the fluid pressurized in the second pressurizing chamber is not delivered to the brake cylinder while the valve device is placed in the second state.

(5) A braking system according to the above mode (4), wherein the internal valve is a check valve which permits a flow of the pressurized fluid in a first direction from the second pressurizing chamber toward the first pressurizing chamber and inhibits a flow of the pressurized fluid in a second direction opposite to the first direction.

The check valve permits the pressurized fluid to flow from the second pressurizing chamber to the first pressurizing chamber when the pressure of the pressurized fluid in the second pressurizing chamber is higher than that in the first pressurizing chamber, and inhibits the pressurized fluid to flow from the first pressurizing chamber to the second pressurizing chamber even when the pressure of the firs pressurizing chamber is higher than that in the second pressurizing chamber. Thus, the check valve permits the valve device to selectively establish the first state for delivering the pressurizing fluid from the two pressurizing chambers to the brake cylinder, and the second state for delivering the pressurizing fluid from only the first pressurizing chamber to the brake cylinder, while reducing a drop of the fluid pressure in the first pressurizing chamber.

(6) A braking system according to the above mode (4) or (5), further comprising a low-pressure source, and wherein the valve device further includes a pressure relief valve which inhibits a discharge flow of the pressurized fluid from the second pressurizing chamber into the low-pressure source when the pressure of the pressurized fluid in the second pressurizing chamber is not higher than a predetermined value, and permits the above-indicated discharge flow when the pressure of the pressurized fluid in the second pressurizing chamber is higher than the predetermined value.

For instance, the pressure relief valve is disposed between the second pressurizing chamber and the low-pressure source. The low-pressure source may be a reservoir or a suction passage connected to a pump. While the pressure of the pressurized fluid in the second pressurizing chamber is lower than a preset relief pressure value, the pressure relief valve does not permit the pressurized fluid to be discharged from the second pressurizing chamber into the low-pressure source so that the fluid pressure in the second pressurizing chamber is raised as the pressurizing piston is advanced. When the fluid pressure in the second pressurizing chamber has been raised above the preset relief pressure value, the pressurized fluid is discharged through the pressure relief valve into the low-pressure source as the pressurizing piston is advanced. Accordingly, the fluid pressure in the second pressurizing chamber is held at the preset relief pressure value.

Where the valve device includes both the pressure relief valve and the check valve which have been described, the pressurized fluid is permitted to be supplied from the second pressurizing chamber to the first pressurizing chamber, so that the pressurized fluid is delivered from both of the first and second pressurizing chambers to the brake cylinder, when the fluid pressure in the second pressurizing chamber is not higher than the preset relief pressure value and is higher than that in the first pressurizing chamber. When the fluid pressure in the second pressurizing chamber is higher than the preset relief pressure value, the pressurized fluid is discharged from the second pressurizing chamber into the low-pressure source, and is not supplied to the first pressurizing chamber, so that the pressurized fluid is delivered from only the first pressurizing chamber to the brake cylinder. The fluid flow from the first pressurizing chamber to the second pressurizing chamber is inhibited by the check valve, even when the fluid pressure in the second pressurizing chamber is lower than that in the first pressurizing chamber.

The predetermined pressure value above which the discharge flow of the fluid from the second pressurizing chamber into the low-pressure source is permitted, that is, the preset relief pressure value of the pressure relief valve may be determined to be equal to or higher than (e.g., higher than) the fluid pressure in the brake cylinder at which the fast filling of the brake cylinder is expected to be completed. In this case, the pressurized fluid can be delivered from the two pressurizing chambers to the brake cylinder at least until the fast filling of the brake cylinder is terminated. Accordingly, the fast filling can be completed in a shorter time than where the fast filling is effected by the fluid flow from only one of the two pressurizing chambers. Thus, the present arrangement is effective to reduce a delay in the activation of the brake cylinder to provide a braking effect.

(7) A braking system according to any one of the above modes (1)-(6), further comprising two separate fluid passages which are connected to the two pressurizing chambers, respectively, and which merge into a common fluid passage to which the brake cylinder is connected, the valve device including at least one valve provided in at least one of the two separate fluid passages.

In the braking system according to the above mode (7), the brake cylinder is connected to the common fluid passage, which in turn is connected to the two separate fluid passages extending from the respective two pressurizing chambers. The brake cylinder is supplied with the pressurized fluid delivered from at least one of the two pressurizing chambers through the corresponding at least one of the two separate fluid passages and through the common fluid passage.

The valve device includes at least one valve in at least one of the two separate fluid passages. The valve device may have any arrangement, provided that the valve device is capable of controlling the fluid flow through at least one of the two separate fluid passages. For instance, the valve device includes at least one valve selected from among: at least one cut-off valve; at least one pressure-relief valve; at least one check valve; and at least one directional control valve, as described above with respect to the above mode (1) of this invention. Where the cut-off valve is provided in each of at least one of the two separate fluid passages, the valve device can be selectively placed in the first state for delivering the pressurized fluid from the two pressurizing chambers to the brake cylinder, and the second state for delivering the pressurized fluid from one of the two pressurizing chambers to the brake cylinder, by selectively placing the cut-off valve or valves in the open and closed states. Where the separate fluid passage provided with the cut-off valve becomes defective, an influence of this defective separate fluid passage on the other separate fluid passage can be prevented by placing the cut-off valve in the closed state.

The separate fluid passages may be provided with an orifice, a stroke simulator or any other desired component other than the valve device. The valve device may include both the internal valve disposed in the master cylinder, and at least one valve disposed in at least one of the two separate fluid passages connected to the two pressurizing chambers.

(8) A baking system according to the above mode (7), wherein the above-indicated at least one valve of the valve device includes at least one switch valve which is provided in at least one of the two separate fluid passages and which is operable between two states for respectively permitting and inhibiting a flow of the fluid from the corresponding pressurizing chamber toward the brake cylinder.

The switch valve provided in the separate fluid passage selectively permits the pressurized fluid to be delivered from the corresponding pressurizing chamber to the brake cylinder. Two switch valves may be provided in the respective two separate fluid passages, or one switch valve may be provided in one of the two separate fluid passages. In the former case, it is easy to permit or inhibit a supply flow or flows of the pressurized fluid from a selected one or both of the two pressurizing chambers to the brake cylinder. The switch valve may include a pressure relief valve and a check valve, or an electromagnetically operated shut-off valve.

(9) A braking system according to he above mode (7) or (8), further comprising a low-pressure source, and wherein the above-indicated at least one valve of the valve device includes a pressure relief valve connected to one of the two separate fluid passages, the pressure relief valve inhibiting a discharge flow of the pressurized fluid from the corresponding one of the two pressurizing chamber to the low-pressure source while the pressure of the pressurized fluid in the corresponding pressurizing chamber is not higher than a predetermined value, and permitting the discharge flow of the pressurized fluid while the pressure of the pressurized fluid in the corresponding pressurizing chamber is higher than the predetermined value.

The pressure relief valve may be provided in a fluid passage directly connecting the pressurizing chamber and the low-pressure source, as described above with respect to the mode (6). However, the pressure relief valve may be provided in a fluid passage connecting the corresponding separate fluid passage and the low-pressure source. In either of these cases, the pressure relief valve is opened by the fluid pressure in the corresponding pressurizing chamber so that the fluid pressure in the separate fluid passage connected to the corresponding pressurizing chamber will not exceed the predetermined value, namely, the present relief pressure value. In this sense, the separate fluid passage provided with the pressure relief valve may be called a low-pressure fluid passage.

When the fluid pressure in the pressurizing chamber corresponding to the pressure relief valve is raised above the predetermined value or present relief pressure value, the pressurized fluid is discharged from this pressurizing chamber into the low-pressure source, so that the pressurized fluid is not usually delivered from this pressurizing chamber to the brake cylinder.

(10) A braking system according to the above mode (9), wherein the above-indicated at least one valve of the valve device further includes a check valve provided in the above-indicated one of the two separate fluid passages, the check valve permitting a flow of the pressurized fluid in a first direction from the corresponding pressurizing chamber toward the brake cylinder and inhibiting a flow of the pressurized fluid in a second direction opposite to the. first direction.

The check valve is provided in the low-pressure fluid passage inhibits a flow of the pressurized fluid from one of the two pressurizing chambers which has a higher fluid pressure than that of the other pressurizing chamber toward that other pressurizing chamber.

(11) A braking system according to any one of the above modes (1)-(10), further comprising a stroke simulating device including a stroke simulator connected to one of the above-indicated at least two pressurizing chambers, and a simulator control valve operable to control the stroke simulator.

The stroke simulator may be connected to only one of the above-indicated two pressurizing chambers from which the pressurized fluid is delivered to the brake cylinder when the valve device is placed in the first state. Where the master cylinder has at least three pressurizing chambers, the stroke simulator may be connected to the third pressurizing chamber which is other than the above-indicated two pressurizing chambers. The stroke simulator may be provided in a fluid passage connecting the corresponding one of the two separate fluid passages and the low-pressure source (which may be a reservoir or the atmosphere), or a fluid passage which directly connects the corresponding pressurizing chamber and the low-pressure source. In either case, the stroke simulator is connected to one of the pressurizing chambers and is disposed between the corresponding pressurizing chamber and the low-pressure source. Where the master cylinder is operated by a manually operable brake operating member, the stroke simulator absorbs the pressurized fluid delivered from the corresponding pressurizing chamber, so that the operating stroke of the brake operating member is increased even when the pressurized fluid is not delivered from the master cylinder to the brake cylinder. Accordingly, the stroke simulator is effective to reduce deterioration of the operating feel of the brake operating member even when the pressurized fluid is not delivered from the master cylinder to the brake cylinder during an operation of the brake operating member by the operator of the braking system.

The simulator control valve may be disposed between the stroke simulator and the corresponding pressurizing chamber, or between the stroke simulator and the low-pressure source. Where the simulator control valve is disposed between the corresponding pressurizing chamber and the stroke simulator, the pressurized fluid is permitted to be fed from the corresponding pressurizing chamber to the stroke simulator when the simulator control valve is in an open state, but the pressurized fluid is not permitted to be fed from the pressurizing chamber to the stroke simulator when the simulator control valve is in a closed state. Where the simulator control valve is disposed between the stroke simulator and the low-pressure source, a movement of the piston of the stroke simulator is permitted when the simulator control valve is in the open state, but the movement of the stroke simulator piston is not permitted when the simulator control valve is in the closed state. In either of the two cases indicated above, therefore, the simulator control valve enables the stroke simulator to operate when the simulator control valve is in the open state, and disables the stroke simulator to operate when the simulator control valve is in the closed state.

The operating state of the stroke simulator can be controlled by controlling the simulator control valve. For instance, the simulator control valve is switched from the closed state to the open state when the pressure of the pressurized fluid in the corresponding pressurizing chamber is raised to a predetermined value, so that the stroke simulator is enabled to operate when the fluid pressure in the corresponding pressurizing chamber has been raised to the predetermined value.

The simulator control valve may be an electromagnetic shut-off valve which is opened and closed by energizing and de-energizing its solenoid coil. Alternatively, the simulator control valve may be a flow control valve whose amount of opening is controllable with an amount of electric current applied to its solenoid coil. Further alternatively, the simulator control valve may be a pilot-operated shut-off valve operated according to the fluid pressure in the corresponding pressurizing chamber. Thus, the simulator control valve is adapted to selectively place the stroke simulator in its operable or inoperable state. However, the stroke simulator may be further adapted to control the ease of movement of the piston of the stroke simulator, namely, control the sensitivity of the stroke simulator to a change in the fluid pressure in the pressurizing chamber, as described below.

(12) A braking system according to the above mode (11), wherein the stroke simulator permits a flow of the pressurized fluid from the corresponding pressurizing chamber into the stroke simulator while the pressure of the pressurized fluid in the corresponding pressurizing chamber is higher than a predetermined value.

For instance, the stroke simulator includes: a housing; a simulator piston which is received within the housing and which cooperates with the housing to define, on opposite sides thereof, a first variable-volume chamber connected to said corresponding pressurizing chamber (through the separate fluid passage in some case) and a second variable-volume chamber connected to the low-pressure source; and a spring which biases the simulator piston toward said first variable-volume chamber. In this stroke simulator, the simulator piston is not moved against a biasing force of the spring and therefore the stroke simulator is not operable, while a force based on the fluid pressure in the first variable-volume chamber is smaller than the biasing force of the spring. When the force based on the fluid pressure in the first variable-volume chamber becomes larger than the biasing force of the spring, the simulator piston is moved against the biasing force of the spring, so that the pressurized fluid received from the corresponding pressurizing chamber is absorbed into the first variable-volume chamber, that is, an operation of the stroke simulator is initiated. The fluid pressure at which this operation is initiated is determined by the biasing force of the spring (preset load of the spring).

The stroke simulator described above with respect to the above mode (12) may be used in a braking system which does not include the simulator control valve. Even in the absence of the simulator control valve, the stroke simulator can be made operable when the fluid pressure in the corresponding pressurizing chamber becomes higher than the predetermined value.

(13) A braking system according to any one of the above modes (1)-(12), wherein the valve device includes a master-cylinder cut-off valve disposed between at least one of the above-indicated at least two pressurizing chambers and the brake cylinder, the master-cylinder cut-off valve having an open state in which the brake cylinder is communicated with the at least one of said at least two pressurizing chambers, and a closed state in which the brake cylinder is isolated from the at least one of said at least two pressurizing chambers.

The master-cylinder cut-off valve may be disposed between the brake cylinder and the pressurizing chamber connected to the stroke similar (separate fluid passage) indicated above, or between the brake cylinder and the other pressurizing chamber. Further, the master-cylinder cut-off valve may be disposed between the brake cylinder and only one of the pressurizing chambers or between the brake cylinder and two or three of the pressurizing chambers.

When the master-cylinder cut-off valve is placed in the open state, the at least one pressurizing cylinder and the brake cylinder are communicated with each other through the master-cylinder cut-off valve, so that the pressurized fluid is delivered from the at least one pressurizing chamber to the brake cylinder. In the closed state of the master-cylinder cut-off valve, the pressurized fluid is not usually delivered from the at least one pressurizing chamber to the brake cylinder.

Where the master-cylinder cut-off valve provided according to the above mode (13) is used in the braking system according to the above mode (11) or (12), it is desirable to control the master-cylinder cut-off valve and the simulator control valve in a predetermined operational relationship with each other. For example, the simulator control valve is held in the open state while the master-cylinder cut-off valve is placed in the closed state. In this case, the simulator control valve permits the fluid flows between the corresponding pressurizing chamber or chambers and the stroke simulator, depending upon an operation of the manually operable brake operating member. Thus, the simulator control valve and the stroke simulator cooperate to permit a change of the operating stroke of the brake operating member even when the supply flow of the pressurized fluid from the pressurizing chamber or chambers to the brake cylinder is blocked by the master-cylinder cut-off valve. Accordingly, the deterioration of the operating feel of the brake operating member which would take place in the closed state of the master-cylinder cut-off valve can be prevented or reduced.

While the master-cylinder cut-off valve is in the open state, the simulator control valve is held in the closed state, so that the pressurized fluid can be delivered from the corresponding pressurizing chamber or chambers to the brake cylinder, for activating the brake, since the simulator control valve prevents the discharge flow of the pressurized fluid from the pressurizing chamber or chambers to the stroke simulator. Thus, unnecessary consumption of the pressurized fluid by the stroke simulator can be avoided.

The master-cylinder cut-off valve may be an electromagnetic valve operable with an electric current, or a mechanical valve operable with a pilot pressure, for instance. The electromagnetic valve may be opened and closed by energization or de-energization of its solenoid coil, for communication or isolation of the at least one pressurizing chamber with or from the brake cylinder.

(14) A braking system according to the above mode (13), further comprising two separate fluid passages which are connected to the two pressurizing chambers, respectively, and wherein the master-cylinder cut-off valve is disposed in each of at least one of the two separate fluid passages, and the valve device further includes a first check valve which is disposed in parallel connection with the master-cylinder cut-off valve and which permits a flow of the pressurized fluid in a first direction from a corresponding one of the two pressurizing chambers toward the brake cylinder and inhibits a flow of the pressurized fluid in a second direction opposite to the first direction.

The master-cylinder cut-off valve may be disposed in each of the two separate fluid passages, or in only one of the two separate fluid passages. In the latter case, the master-cylinder cut-off valve is preferably disposed in the high-pressure side separate fluid passage in which the pressure relief valve indicated above is not disposed.

The first check valve disposed in parallel connection with the master-cylinder cut-off valve permits the pressurized fluid to be delivered from the master cylinder to the brake cylinder while the pressure of the pressurized fluid in the master cylinder is higher than that in the brake cylinder, even when the master-cylinder cut-off valve is placed in the closed state.

The master-cylinder cut-off valve and the simulator control valve may be disposed independently of each other. For instance, the master-cylinder cut-off valve is disposed in one of the two separate fluid passages connected to the two pressurizing chambers, while the simulator control valve is disposed between the corresponding pressurizing chamber and the stroke simulator. In this case, however, the separate master-cylinder cut-off valve and simulator control valve may be replaced by a single directional control valve. For example, the directional control valve is operable between a first state in which the corresponding pressurizing chamber is communicated with the brake cylinder and is isolated from the stroke simulator, and a second state in which the corresponding pressurizing chamber is isolated from the brake cylinder and is communicated with the stroke simulator through the above-indicated one separate fluid passage. This directional control valve performs the function of the simulator control valve and the function of the master-cylinder cut-off valve.

(15) A braking system according to the above mode (14), wherein said master-cylinder cut-off valve is disposed in one of said two separate fluid passages which is connected to one of the two pressurizing chambers, and the valve device includes a pressure relief valve and a second check valve which are connected to the other of the two pressurizing chambers, the pressure relief valve being switched from a closed state to an open state when the pressure of the pressurized fluid in the other pressurizing chamber becomes higher than a predetermined value, the second check valve permitting a flow of the pressurizing fluid in a first direction from the other pressurizing chamber toward the brake cylinder and inhibits a flow of the pressurized fluid in a second direction opposite to the first direction.

In the braking system according to the above mode (15), the master-cylinder cut-off valve and the first check valve are connected to one of the two pressurizing chambers such that the cut-off valve and the first check valve are parallel with each other, while the pressure-relief valve and the second check valve are connected to the other pressurizing chamber. The pressure relief valve and the second check valve may be disposed in parallel with each other, or alternatively in series with each other. In the latter case, the second check valve is disposed between the brake cylinder and the pressure relief valve.

There will be described an operation of the braking system wherein the stroke simulator, the master-cylinder cut-off valve and the check valve are connected to one of the two pressurizing chambers of the master cylinder, while the pressure relief valve and the second check valve are connected to the other pressurizing chamber. When the simulator control valve is in the open state, the pressurizing fluid in the above-indicated one pressurizing chamber is not fed to the stroke simulator and is delivered to the brake cylinder through the master-cylinder cut-off valve placed in the open state or through the first check valve, while the fluid pressure in the above-indicated one pressurizing chamber is lower than a predetermined value (hereinafter referred to "simulation-initiating threshold value" above which the stroke simulator is operable). When the fluid pressure in the above-indicated one pressurizing chamber exceeds the simulation-initiating threshold, the pressurized fluid is fed from that one pressurizing chamber to the stroke simulator.

When the master-cylinder cut-off valve is placed in the open state while the simulation control valve is placed in the closed state, the pressurized fluid is delivered from the two pressurizing chambers to the brake cylinder, as long as the fluid pressure in the other pressurizing chamber is held lower than the predetermined relief pressure value. After the fluid pressure in the other pressurizing chamber exceeds the relief pressure value, the pressurized fluid is delivered from only the above-indicated one pressurizing chamber to the brake cylinder.

When the master-cylinder cut-off valve is placed in the closed state while the simulator control valve is placed in the open state, the pressurized fluid is delivered from the above-indicated other pressurizing chamber to the brake cylinder while the pressurized fluid is delivered from the above-indicated one pressurizing chamber to the brake cylinder through the first check valve, as long as the fluid pressure in the above-indicated other pressurizing chamber is lower than the predetermined relief pressure value. Since the simulation-initiating threshold is set to be equal to or higher than the relief pressure value, the pressurized fluid is not fed from the above-indicated one pressurizing chamber to the stroke simulator and is delivered to the brake cylinder through the first check valve, while the fluid pressure in the above-indicated one pressurizing chamber is lower than the relief pressure value (and lower than the simulation-initiating threshold). When the fluid pressure in the above-indicated one pressurizing chamber exceeds the simulation-initiating threshold, the pressurized fluid is fed from the above-indicated one pressurizing chamber to the stroke simulator as the pressurizing piston is advanced. This arrangement permits an increase of the operating stroke of the manually operable brake operating member even while the master-cylinder cut-off valve is in the closed state. After the fluid pressure in the above-indicated one pressurizing chamber has become higher than the simulation-initiating threshold, the supply flows of the pressurized fluid from the two pressurizing chambers to the brake cylinder are both inhibited.

(16) A braking system according to any one of the above modes (1)-(15), wherein the housing has a large-diameter portion and a small-diameter portion which is located in front of the large-diameter portion and which has a smaller diameter than the large-diameter portion, and one of the at least one pressurizing pistons is a large-diameter piston fluid-tightly and slidably fitted in the large-diameter portion, while another of the at least two pressurizing pistons is a small-diameter piston fluid-tightly and slidably fitted in the small-diameter portion, the large-diameter and small-diameter pistons being moved as a unit, the small-diameter piston partially defining one of the two pressurizing chambers in front of the small-diameter portion, while the large-diameter piston and the small-diameter piston partially defining therebetween the other of the two pressurizing chambers.

In the braking system according to the above mode (16) of this invention, the master cylinder includes the large-diameter piston and the small-diameter piston, which may be separate pistons that are moved as a unit, or may be provided by respective large-diameter and small-diameter portions of a so-called "stepped piston".

The small-diameter and large-diameter pistons of the master cylinder partially define the respective small-diameter and large-diameter pressurizing chambers in front of the respective small-diameter and large-diameter pistons. In this master cylinder, an equilibrium of forces is established between an input force applied to the two pistons based on an operating force of a manually operable brake operating member and a sum of two forces based on the pressures of the pressurized fluid in the small-diameter and large-diameter pressurizing chambers. This arrangement is effective to reduce an undesirable advancing movement of the two pistons when the fluid pressure in one of the two pressurizing chambers is lowered to the atmospheric level. Where the master cylinder includes two pistons arranged in series with each other such that the two pistons are movable relative to each other (not moved as a unit), a drop of the fluid pressure in one of the two pressurizing chambers to the atmospheric level causes the front-side piston to be advanced into abutting contact with the front bottom wall of the housing, or the rear-side piston to be advanced into abutting contact with the rear end of the front-side piston. Such abutting contact gives the operator of the brake operating member a strange operating feel during an operation of the brake operating member. In the present braking system, the separate small-diameter and large-diameter pistons are moved as a unit, or the small-diameter and large-diameter portions of the single stepped piston member serve as the respective small-diameter and large-diameter pistons, so that a drop of the fluid pressure in one of the two pressurizing chambers will not cause an undesirable advancing movement of the pistons.

(17) A braking system according to the above mode (16), wherein the valve device includes a pressure relief valve and an orifice which are connected to one of the two pressurizing chambers such that the pressure relief valve and the orifice are disposed in parallel with each other.

Where the small-diameter and large-diameter pistons are moved as a unit, the input force applied to the two pistons based on the operating force of the brake operating member is equal to a sum of the force based on the fluid pressure in the pressurizing chamber formed in front of the small-diameter piston and the force based on the fluid pressure in the pressurizing chamber formed in front of the large-diameter piston. With the same operating force of the brake operating member is held constant, a drop of the fluid pressure in one of the two pressurizing chambers will cause a corresponding amount of increase of the fluid pressure in the other pressurizing chamber.

In view of the above fact, the orifice is provided in parallel with the pressure relief valve for one of the two pressurizing chambers, so that the fluid pressure in that one pressurizing chamber is held at the atmospheric pressure when the two pressurizing pistons are held at the same positions for a relatively long time, that is, while the manually operable brake operating member is kept operated with substantially the same operating force. As a result of the fluid pressure drop to the atmospheric level in the above-indicated one pressurizing chamber, the fluid pressure in the other pressurizing chamber will be accordingly increased, with the operating force of the brake operating member being held constant. For instance, the pressure relief valve and the orifice in series connection with each other are connected to one of the two separate fluid passages which is connected to one of the pressurizing chambers formed in front of the small-diameter and large-diameter pistons.

For example, the pressure relief valve and the orifice are connected to the pressurizing chamber in front of the large-diameter piston, while the brake cylinder is connected to the pressurizing piston in front of the small-diameter piston.

(18) A braking system according to any one of the above modes (1)-(17), wherein the above-indicated at least two pressurizing pistons include two pressurizing pistons have respective different pressure-receiving surface areas which partially define the two pressurizing chambers, respectively.

The amount of the pressurized fluid to be delivered from each of the two pressurizing chambers when the corresponding pressurizing piston is advanced by a given distance is determined by the pressure-receiving surface area of the piston which partially defines that pressurizing chamber. Namely, the amount of the pressurized fluid to be delivered from the pressurizing chamber and supplied to the brake cylinder for a given distance of the advancing movement of the corresponding piston increases with an increase in the pressure-receiving surface area of the piston The technical feature of the two pressurizing pistons according to the above mode (18) is preferably applied to the braking system according to the above mode (4) such that a pressure relief valve and an orifice are connected to the second pressurizing chamber and such that the pressure-receiving surface area of the pressurizing piston which partially defines this second pressurizing chamber is larger than that of the first pressurizing piston which partially defines the first pressurizing chamber connected to the brake cylinder. In this arrangement, the amount of the pressurized fluid delivered from the first and second pressurizing chambers to the brake cylinder until the fluid pressure n the second pressurizing chamber is raised to the relief pressure value is made comparatively large. However, the pressure-receiving surface area of the piston partially defining the second pressurizing chamber may be made smaller than tat of the piston partially defining the first pressurizing chamber.

(19) A braking system according to any one of the above modes (1)-(18), wherein the two pressurizing chambers of the master cylinder have different transverse cross sectional areas.

The amount of the pressurized fluid to be delivered from each pressurizing chamber by an advancing movement of the corresponding pressurizing piston can be increased by increasing the transverse cross sectional area of the pressurizing chamber and the pressure-receiving surface area of the corresponding pressurizing piston. In the braking system according to the above mode (4), the cross sectional area of the second pressurizing chamber is desirably made larger than that of the first pressurizing chamber.

(20) A braking system according to any one of the above modes (1)-(3) and (7-19), wherein the master cylinder is a master cylinder of tandem type includes two pressurizing pistons arranged in series with each other and partially defining a front and a rear pressurizing chamber, respectively, the front pressurizing chamber being connected to a first brake cylinder while the rear pressurizing chamber being connected to a second brake cylinder, the valve device including a directional control valve disposed between the first and second brake cylinders and one of the front and rear pressurizing chambers, the directional control valve having a first and a second state for fluid communication of the one pressurizing chamber and the first and second brake cylinders, respectively.

The braking system according to the above mode (20) is selectively placed in one of a first pressurizing state and a second pressurizing state, by selectively placing the directional control valve in one of the first and second states. In the first pressurizing state, the front pressurizing chamber is communicated with the first brake cylinder and is isolated from the rear brake cylinder. In the second pressurizing state, the front pressurizing chamber is communicated with the second brake cylinder and is isolated from the first brake cylinder. The second brake cylinder is supplied with the pressurized fluid delivered from only the rear pressurizing chamber, in the first pressurizing state of the braking system, and is supplied with the pressurized fluid delivered from the two pressurizing chambers, in the second pressurizing state.

Where the first brake cylinder is connected to a common fluid passage connected to the two pressurizing chambers, the directional control valve of the valve device is connected to the common fluid passage, the rear pressurizing chamber and the second brake cylinder such that the directional control valve is operable to connect the rear pressurizing chamber selectively to the common fluid passage or the second brake cylinder.

(21) A braking system according to any one of the above modes (1)-(20), wherein the master cylinder has a rear pressure chamber partially defined by a rear surface of one of the above-indicated at least two pressurizing pistons, the braking system further comprising a master-cylinder pressure control device operable to control a pressure of the fluid in the rear pressure chamber of the master cylinder.

By controlling the fluid pressure in the rear pressure chamber, the fluid pressure in the pressurizing chambers and the operating stroke of the manually operable brake operating member can be controlled. Accordingly, it is possible to control relationships between the fluid pressures in the pressurizing chambers and the operating state of the brake operating member. Where the fluid pressures in the pressurizing chambers correspond to the fluid pressure in the corresponding brake cylinders, these relationships may be considered to represent one form of brake operating characteristics of the braking system. The rear pressure chamber and the master-cylinder pressure control device may be considered to constitute a hydraulic booster.

The fluid pressure in a desired pressurizing chamber, rather than the fluid pressure in the rear pressure chamber, can be directly controlled. Further, the fluid pressure in a desired one of the rear pressure chamber and the two pressurizing chambers may be controlled.

(22) A braking system according to any one of the above modes (1)-(21), further comprising an assisting pressure control device disposed between the master cylinder and the brake cylinder and operable to control the pressure of the fluid in the brake cylinder such that the pressure of the fluid in the brake cylinder is higher than that of the pressurized fluid in the master cylinder.

The assisting pressure control device includes a power-operated actuator operable to control the fluid pressure in the brake cylinder such that the fluid pressure in the brake cylinder is higher than the fluid pressure in the master cylinder. When the assisting pressure control device is operated to control the brake cylinder pressure to be higher than the master cylinder pressure, the brake cylinder is isolated from the master cylinder, that is, the assisting pressure control device is isolated from the master cylinder. Although the valve device may be arranged to isolate the assisting pressure control device from the master cylinder, there may be provided an exclusive valve for isolating the assisting pressure control device from the master cylinder. In either case, the assisting pressure control device is arranged to control the wheel brake cylinder pressure to a desired value irrespective of the master cylinder pressure, so that the wheel brake cylinder pressure corresponding to a given operating state of the manually operable brake operating member can be controlled to a value different from the maser cylinder pressure.

The wheel brake cylinder pressure can be controlled by the assisting pressure control device, while the brake cylinder is held in communication with the master cylinder.

(23) A braking system according to the above mode (22), wherein the assisting pressure control device comprising (a) an assisting cylinder including a housing, and an assisting piston which is fluid-tightly and slidably fitted in the housing and which cooperates with the housing to define an assisting chamber connected to the brake cylinder, and (b) a power-operated assisting-piston drive device operable to move the assisting piston relative to the housing.

The assisting piston of the assisting cylinder is moved by the assisting-piston drive device to control the fluid pressure in the assisting chamber. The assisting-piston drive device may be adapted to move the assisting piston with a pressure of the fluid in a rear pressure chamber which is partially defined by the assisting piston and located on a rear side of the assisting piston remote from the assisting chamber. Alternatively, the assisting-piston drive device may include an electric motor operable to produce a drive force for moving the assisting piston. In the former case, the assisting-piston drive may include a power-operated pressure generating source, and a pressure control unit for controlling the output pressure of the pressure generating source. The pressure control unit may be adapted to control an electric energy to be applied to an electric motor provided to drive a pump device of the pressure generating source. Alternatively, the pressure control unit may include a pressure control valve device. In the latter case wherein the assisting piston is moved by the drive force of an electric motor, the assisting-piston drive device may include that electric motor, a motion converting device for converting the rotary motion of the electric motor into a linear motion of the assisting piston, and a drive force control device for controlling the electric motor to control the drive force of the electric motor.

In the braking system wherein the master-cylinder cut-off valve and the check valve indicated above are connected in parallel with each other to one of the two separate fluid passages connected to the respective two pressurizing chambers of the master cylinder, while the valve device is connected to the other of the two separate fluid passages, the assisting cylinder may be disposed such that the assisting cylinder is connected to a common fluid passage connected to the two separate fluid passages. In this case, the brake cylinder pressure is controlled by the assisting pressure control device to be higher than the master cylinder pressure while the master-cylinder cut-off valve is placed in the closed state, and while the check valve permits a flow of the fluid from the master cylinder toward the brake cylinder and inhibits a flow of the fluid from the assisting cylinder (i.e., brake cylinder) back to the master cylinder. Thus, the brake cylinder pressure is controlled to be higher than the master cylinder pressure, by the assisting pressure control device in cooperation with the master-cylinder cut-off valve and the check valve. During this control of the brake cylinder pressure, the fluid flows in the opposite directions between the master cylinder and the brake cylinder are inhibited in the presence of the check valve and because the controlled brake cylinder pressure is higher than the master cylinder pressure.

The brake cylinder pressure may be lower than the master cylinder pressure immediately after the moment of initiation of an operation of the assisting pressure control device, due to a control delay of the assisting control device. In this event, the pressurized fluid is delivered from one of the pressurizing chambers of the master cylinder to the brake cylinder through the check valve. Thus, the delay in the increase of the brake cylinder pressure is reduced.

The assisting cylinder is disposed between the servo system (including the above-indicated combination of a pressure generating source and a pump drive electric motor, or a motion converting device) and the brake cylinder, such that the servo system and the brake cylinder are isolated from each other by the assisting cylinder (including the assisting piston). This arrangement provides a fail-safe operation of the braking system, in the event of a failure of the servo system, namely, is effective to minimize an adverse influence of the failure of the servo system on the brake cylinder pressure.

Therefore, the braking system according to the above mode (23) of this invention described above has an improved degree of control response, without having to improve the pressure control capability of the assisting pressure control device per se. Accordingly, the present braking system is capable of exhibiting an improved operating reliability, while avoiding an increase in the cost of manufacture. Namely, the control response in an initial period of an operation of the brake operating member by the operator of the braking system can be made relatively high owing to the supply of the pressurized fluid from the two pressurizing chambers to the brake cylinder, even if the rate of increase of the brake cylinder pressure by the assisting pressure control device is lower than the rate of increase of the master cylinder pressure during the operation of the brake operating member, due to insufficient pressure control capacity of the assisting pressure control device per se.

Where the assisting cylinder and the assisting-piston drive device which have been described are provided in the braking system according to the above mode (21), and the master-cylinder cut-off valve is provided in the common fluid passage, the master cylinder can be isolated from the brake cylinder with higher reliability, so as to prevent an influence of the fluid pressure in the assisting cylinder on the master cylinder pressure, so that the operating feel of the brake operating member can be improved by controlling the manual-pressure-generating system including the master cylinder. Further, the brake cylinder pressure can be controlled to be lower than the master cylinder pressure, if desired. In this case, the master-cylinder cut-off valve should be disposed in the common fluid passage.

(24) A braking system according to the above mode (22) or (23), further comprising a braking-pressure control valve device disposed between the assisting cylinder and the brake cylinder.

The braking-pressure control valve device includes at least one electromagnetically operated or solenoid-operated control valve, which is preferably a pressure-holding valve having an open state in which the assisting chamber and the brake cylinder are communicated with each other, and a closed state in which the assisting chamber and the brake cylinder are isolated from each other. The braking-pressure control valve device may include a pressure-reducing valve having an open state in which the brake cylinder is communicated with a low-pressure source, and a closed state in which the brake cylinder is isolated from the low-pressure source.

Where the braking system includes a plurality of brake cylinders, the braking-pressure control valve device is preferably arranged to control the fluid pressures in the individual brake cylinders, independently of each other. Since the fluid pressures in the two or more brake cylinders are all controlled by the assisting cylinder such that the fluid pressures in all of the brake cylinders are equal to the fluid pressure in the assisting chamber, the fluid pressures in the individual brake cylinders are desirably controlled independently of each other, so as to meet the specific braking requirement for each brake cylinder.

Where the braking system is used for braking a wheel of a vehicle, the braking-pressure control valve device may be arranged to function as a slip control device for controlling the fluid pressure in the brake cylinder for braking the wheel, so as to maintain a slipping state of the wheel in an optimum state. For instance, the slip control device is an anti-lock braking pressure control device adapted to control the brake cylinder pressure so as to prevent an excessive slipping state of the corresponding wheel during an operation of the manually operated brake operating member.

(25) A braking system comprising:

a master cylinder including a housing, and a pressurizing piston which is fluid-tightly and slidably fitted in the housing and which is operatively connected to a manually operable brake operating member, the pressurizing piston cooperating with the housing to define a pressurizing chamber and a rear pressure chamber on respective front and rear sides of the pressurizing piston;

a brake cylinder connected to the pressurizing chamber;

an assisting cylinder including a housing, and an assisting piston fluid-tightly and slidably fitted in the housing and cooperating with the housing to define an assisting chamber on a front side thereof, the assisting chamber being connected to the brake cylinder and the master cylinder such that the assisting chamber is located between the brake cylinder and the master cylinder;

a master-cylinder cut-off valve disposed between the assisting chamber and the pressurizing chamber, and having an open state in which the assisting chamber and the pressurizing chamber are communicated with each other, and a closed state in which the assisting chamber and the pressurizing chamber are isolated from each other;

a stroke simulating device operable to permit flows of a working fluid between the stroke simulating device and the pressurizing chamber according to a movement of the pressurizing piston while the master-cylinder cut-off valve is placed in the closed state, such that the stroke simulating device applies to the pressurizing piston a reaction force which corresponds to a pressure of the fluid in the pressurizing chamber; and a braking characteristic control device operable to control at least one of a pressure of the fluid in the rear pressure chamber and the pressure of the fluid in the pressurizing chamber, for thereby controlling braking characteristics of the braking system, and wherein the braking characteristic control device comprises:

a first control portion operable while the master-cylinder cut-off valve is placed in the closed state, to control the pressure of the fluid in the rear pressure chamber on the basis of an operating stroke of the brake operating member, and control the pressure of the fluid in the assisting chamber on the basis of an operating force of the brake operating member; and a second control portion operable while the master-cylinder is placed in the open state, to control the pressure of the rear pressure chamber on the basis of the operating force, and control the pressure of the fluid in the assisting chamber on the basis of the operating stroke.

In the braking system according to the above mode (25), the fluid in the pressurizing chamber of the master cylinder is pressurized to a level corresponding to a force applied to the pressurizing piston, which force is a sum of the operating force of the brake operating member and a force based on the pressure in the rear pressure chamber. Thus, the fluid pressure in the pressurizing chamber can be controlled by controlling the fluid pressure in the rear pressure chamber. The operating force of the brake operating member may be zero.

While the master-cylinder cut-off valve is placed in the closed state, the fluid pressure in the rear pressure chamber on the basis of the operating stroke of the brake operating member. In the closed state of the master-cylinder cut-off valve, the pressurized fluid is fed from the pressurizing chamber to the stroke simulator as the pressurizing piston is advanced. The fluid pressure in the pressurizing chamber is increased with an increase in the fluid pressure in the stroke simulator, so that a reaction force corresponding to the fluid pressure in the pressurizing chamber is applied to the pressurizing piston. The operator of the brake operating member operates the brake operating member while feeling this reaction force acting on the brake operating member and the operating stroke of the same. Therefore, the operating feel of the brake operating member can be controlled by controlling the fluid pressure in the rear pressure chamber on the basis of the operating stroke of the brake operating member. In the meantime, the fluid pressure in the brake cylinder in the closed state of the master-cylinder cut-off valve is controlled by controlling the fluid pressure in the assisting chamber. Accordingly, the relationship between the operating force and the brake cylinder pressure is controlled by controlling the fluid pressure in the assisting cylinder on the basis of the operating force acting on the brake operating member.

While the master-cylinder cut-off valve is placed in the open state, on the other hand, the fluid pressure in the rear pressure chamber of the master cylinder is controlled on the basis of the operating force of the brake operating member, while the fluid pressure in the assisting chamber on the basis of the operating stroke. Thus, it is possible to control the braking characteristics of the braking system, which is the relationship between the operating state of the brake operating member and the brake cylinder pressure.

In the braking system according to the above mode (25) described above, the braking characteristics of the braking system can be controlled irrespective of whether the master-cylinder cut-off valve is placed in the open state or in the closed state. The braking characteristics of the conventional braking system are not controlled in this manner. In this sense, the present braking system is improved.

The braking system according to the above mode (25) may incorporate the technical feature according to any one of the modes (1)-(24) of the present invention described above.

(26) A braking system according to the above mode (25), which is adapted to be installed on a vehicle, wherein the braking characteristic control device further comprises a control-portion selecting portion operable to select one of the first and second control portions on the basis of an operating state of the vehicle.

In the braking system according to the above mode (26), either the first control portion or the second control portion is selected depending upon the operating state of the vehicle. For instance, the selection of one of the first and second control portions is made on the basis of, or depending upon: an operating state of a switch operable by the operator of the vehicle; whether the braking system is placed in a cooperative braking control mode in which the vehicle is braked by a combination of a hydraulic braking force generated by the brake cylinder and a regenerative braking force; whether the braking system is normal, or defective at any component thereof; a running condition of the vehicle; or an operating speed of the manually operable brake operating member.

For example, the first and second control portions of the braking characteristic control device are arranged to provide respective different braking characteristics, the control-portion selecting portion may be arranged to permit the vehicle operator to select one of the first and second control portions.

In the cooperative braking control, the brake cylinder pressure is usually controlled to a value lower than a value corresponding to the operating force of the brake operating member. In this respect, it is desirable to select the first control portion when the braking system is operated in the cooperative braking control mode. The brake cylinder pressure is controlled by controlling the fluid pressure in the assisting chamber of the assisting chamber while the master-cylinder cut-off valve is placed in the closed state.

Where the running condition of the vehicle requires an abrupt or emergency brake application to the vehicle, it is desirable to select the second control portion, since the brake cylinder pressure can be increased at a comparatively high rate in the open state of the master-cylinder cut-off valve.

Where the operating speed of the brake operating member is higher than a predetermined value, it is desirable to select the second control portion. In this case, a delay in the activation of the brake cylinder to provide a braking effect can be reduced, since the brake cylinder pressure can be increased at a comparatively high rate in the open state of the master-cylinder pressure, as described above.

While there have been described the cases in which the rate of increase of the brake cylinder by operation of the master cylinder is higher than the rate of increase of the brake cylinder pressure by operation of the assisting cylinder, the first control portion may be selected when it is required to rapidly increase the brake cylinder pressure, where the rate of increase of the brake cylinder by operation of the assisting cylinder is higher than that by operation of the master cylinder. The braking characteristic control device may be arranged to directly control the fluid pressure in the pressurizing chamber or selectively control one of the fluid pressures in the rear pressure chamber and the pressurizing chamber, rather than control the fluid pressure in the rear pressure chamber.

(27) A braking system according to the above mode (25) or (26), wherein the housing and the assisting piston of the assisting cylinder cooperate to define an assisting rear pressure chamber on a rear side of the assisting piston remote from the assisting chamber, the assisting cylinder being operated according to the pressure of the fluid in the assisting rear pressure chamber, the braking system further comprising a hydraulic pressure source operable to deliver a pressurized fluid used commonly for the rear pressure chamber of the master cylinder and the assisting rear pressure chamber of the assisting cylinder, and wherein the braking characteristic control -device includes a ratio control portion operable while the master-cylinder cut-off valve is placed in the closed state, to control a ratio of a rate of flow of the pressurized fluid from the hydraulic pressure source to the assisting rear pressure chamber of the assisting chamber, to a rate of flow of the pressurized fluid from the hydraulic pressure source to the rear pressure chamber of the master cylinder.

For instance, the ratio of the rate of flow of the pressurized fluid from the hydraulic pressure source to the assisting rear pressure chamber of the assisting cylinder is made higher than the rate of flow of the pressurized fluid from the hydraulic pressure source to the rear pressure chamber of the master cylinder (hereinafter referred to as "master-cylinder rear pressure chamber), when the operating speed of the brake operating member is higher than a predetermined upper limit. In this case, the fluid pressure in the assisting rear pressure chamber can be changed to a desired value in a relatively short time, so that the brake cylinder pressure can be rapidly increased even while the master-cylinder cut-off valve is placed in the closed state. Thus, the controlling the ratio of the rates of flows of the pressurized fluid from the hydraulic pressure source to the master-cylinder and assisting rear pressure chambers makes it possible to control the rates of change of the fluid pressures in the master-cylinder rear pressure chamber and the assisting rear pressure chamber, as needed, without having to use the hydraulic pressure source having a large pressurizing capacity. Accordingly, the required size of the braking system can be reduced.

The ratio control portion may be operated while the master-cylinder cut-off valve is placed in the open state.

(28) A braking system according to the above mode (27), wherein the ratio control portion includes a first cut-off valve disposed between the hydraulic pressure source and the rear pressure chamber of the master cylinder and having an open state and a closed state in which the rear pressure chamber is communicated with and isolated from the hydraulic pressure source, respectively, a second cut-off valve disposed between the hydraulic pressure source and the assisting rear pressure chamber and having an open state and a closed state in which the assisting rear pressure chamber is communicated with and isolated from the hydraulic pressure source, and a cut-off valve control portion operable to control at least one of the first and second cut-off valves for thereby controlling the rates of flows of the pressurized fluid from the hydraulic pressure source to the rear pressure chamber of the master cylinder and the assisting rear pressure chamber of the assisting cylinder.

Each of the first and second cut-off valves may be a flow control valve whose opening is controllable in the open state, or a shut-off valve whose opening is not controllable in the open state. The rate of flow of the pressurized fluid through the shut-off valve can be controlled by controlling its duty ratio or cycle.

One of the rates of flows of the fluid from the hydraulic pressure source to the two rear pressure chambers may be zero. When one of the first and second cut-off valves is placed in the closed state, the pressurized fluid is not delivered from the hydraulic pressure source to the corresponding one of the master-cylinder and assisting rear pressure chambers.

(29) A braking system comprising:
a master cylinder including a pressurizing piston which is operatively connected to a manually operable brake operating member and which defines a pressurizing chamber and a rear pressure chamber on respective front and rear sides thereof;
a brake cylinder connected to the pressurizing chamber;
an assisting cylinder including a housing, and an assisting piston fluid-tightly and slidably fitted in the housing and cooperating with the housing to define an assisting chamber and an assisting rear pressure chamber on respective front and rear sides thereof, the assisting chamber being connected to the brake cylinder and the master cylinder such that the assisting chamber is located between the brake cylinder and the master cylinder wherein the assisting cylinder being operated according to the pressure of the fluid in the assisting rear pressure chamber;
a master-cylinder cut-off valve disposed between the assisting chamber and the pressurizing chamber, and having an open state in which the assisting chamber and the pressurizing chambers are communicated with each other, and a closed state in which the assisting chamber and the pressurizing chamber are isolated from each other;
a braking characteristic control device operable to control at least one of a pressure of the fluid in the rear pressure chamber of the master cylinder and a pressure of the fluid the assisting rear pressure chamber, for thereby controlling braking characteristics of the braking system; and
a hydraulic pressure source operable to deliver a pressurized fluid used commonly for the rear pressure chamber of the master cylinder and the assisting rear pressure chamber of the assisting cylinder,
and wherein the braking characteristic control device includes a ratio control portion operable while the master-cylinder cut-off valve is placed in the closed state, to control a ratio of a rate of flow of the pressurized fluid from the hydraulic pressure source to the assisting rear pressure chamber of the assisting chamber, to a rate of flow of the pressurized fluid from the hydraulic pressure source to the rear pressure chamber of the master cylinder.

The braking system according to the above mode (29) may incorporate the technical feature according to any one of the above modes (1)-(28).

(30) A braking system according to any one of the above modes (5)-(29), further comprising at least one of:
a first diagnosing device operable while the master-cylinder cut-off valve is in the closed state, to diagnose a manual-pressure-generating system on the basis of a relationship between an operating state of the manually operable brake operating member and the pressure of the fluid in the pressurizing chamber of the master cylinder; and
a second diagnosing device operable while the master-cylinder cut-off valve is in the closed state, to diagnose a brake-cylinder activating system on the basis of a relationship between the pressure of the fluid in the brake cylinder and an operating state of the assisting cylinder.

In the closed state of the master-cylinder cut-off valve, the manual-pressure-generating system and the brake-cylinder activating system can be diagnosed for any abnormality thereof, independently of each other.

The manual-pressure-generating system can be diagnosed on the basis of the relationship between the operating state of the brake operating member and the fluid pressure in the pressurizing chamber of the master cylinder, while the brake-cylinder activating system can be diagnosed on the basis of the fluid pressure in the brake cylinder and the operating state of the assisting cylinder. For instance, the manual-pressure-generating system and the brake-cylinder activating system are diagnosed to be normal if the respective relationships indicated above meet respective predetermined requirements, and are diagnosed to be defective if the respective relationships do not meet the respective predetermined requirements.

The operating state of the assisting cylinder may be obtained on the basis of the fluid pressure in the assisting chamber, the position of the assisting piston relative to the housing, the fluid pressure in the assisting rear pressure chamber, the operating state of an electric motor used to move the assisting piston, the operating state of a device provided to control the fluid pressure in the assisting rear pressure chamber.

(31) A braking system according to any one of the above modes (25)-(30), further comprising a third diagnosing device operable to diagnose the braking system, on the basis of at least two relationships selected from relationships between at least two of the operating state of the brake operating member, the fluid pressure in the pressurizing chamber of the master cylinder, the operating state of the assisting cylinder, and the fluid pressure in the brake cylinder, which are obtained while the maser-cylinder cut-off valve is in the closed and open states.

On the basis of the at least two relationships between or among the above-indicated four parameters while the master-cylinder cut-off valves are placed in the closed and open states, the braking system can be diagnosed for any abnormality or defect. Specific manners of the diagnosis of the braking system will be described in the DETAILED DESCRIPTION OF THE PREFERRED EMBODIMENTS.

The technical feature according to the above mode (31) may be available, in the absence of the technical feature according to any one of the above modes (25)-(30). That is, the braking system comprising the third diagnosing device is available irrespective of the manners in which the fluid pressure in the rear pressure chamber of the master cylinder and the fluid pressure in the assisting rear pressure chamber of the assisting cylinder are controlled, and irrespective of whether the assisting piston is operated by an electric motor or by the fluid pressure in the assisting rear pressure chamber. In any case, the operating state of the braking system is diagnosed by the third diagnosing device on the basis of the above-indicated two or more relationships in the closed and open states of the master-cylinder cut-off valve. The fluid pressures in the assisting cylinder and the rear pressure chamber of the master cylinder are controlled when the brake cylinder is required to be activated, and when the brake cylinder is not required to be activated, namely, when the braking system is diagnosed.

(32) A braking system according to the above mode (30) or (31), wherein the control-portion selecting portion is operable to select the first control portion when the first diagnosing device has detected that the manual-pressure-generating system is defective.

When the manual-pressure-generating system is diagnosed to be defective, the first control portion is operated to control the brake cylinder pressure on the basis of the operating force of the brake operating member, while the brake cylinder is isolated from the master cylinder.

(33) A braking system comprising:
a master cylinder including a pressurizing piston which is operatively connected to a manually operable brake operating member and which defines a pressurizing chamber and a rear pressure chamber on respective front and rear sides thereof;
a brake cylinder) connected to the pressurizing chamber;
an assisting cylinder including a housing, and an assisting piston fluid-tightly and slidably fitted in the housing and cooperating with the housing to define an assisting chamber and an assisting rear pressure chamber on respective front and rear sides thereof, the assisting chamber being connected to the brake cylinder and the master cylinder such that the assisting chamber is located between the brake cylinder and the master cylinder, the assisting cylinder being operated according to the pressure of the fluid in the assisting rear pressure chamber;
a master-cylinder cut-off valve disposed between the assisting chamber and the pressurizing chamber, and having an open state in which the assisting chamber and the pressurizing chambers are communicated with each other, and a closed state in which the assisting chamber and the pressurizing chamber are isolated from each other;
a braking characteristic control device operable to control at least one of a pressure of the fluid in the rear pressure chamber of the master cylinder and a pressure of the fluid in the assisting rear pressure chamber, for thereby controlling braking characteristics of the braking system; and
at least one of (a) a first diagnosing device operable while the master-cylinder cut-off valve is in the closed state, to diagnose a manual-pressure-generating system on the basis of a relationship between an operating state of the manually operable brake operating member and the pressure of the fluid in the pressurizing chamber of the master cylinder, and (b) a second diagnosing device operable while the master-cylinder cut-off valve is in the closed state, to diagnose a brake-cylinder activating system on the basis of a relationship between the pressure of the fluid in the brake cylinder and an operating state of the assisting cylinder.

The braking system according to the above mode (33) may incorporates the technical feature according to any one of the above modes (1)-(32).

(34) A braking system characterized by comprising:
a master cylinder including a pressurizing piston which is operatively connected to a manually operable brake operating member and which partially defines a pressurizing chamber;
a stroke simulator connected to the pressurizing chamber;
a simulator control valve operable to control an operating state of the stroke simulator; and
a stroke control device operable to control the simulator control valve on the basis of an operating state of the brake operating member.

For example, the simulator control valve has a state enabling the stroke simulator to operate and a state disabling the stroke simulator to operate, or alternatively, a state in which the stroke simulator is highly sensitive to a change in the fluid pressure in the pressurizing chamber and a state in which the stroke simulator is not highly sensitive to above-indicated change. Further alternatively, the simulator control valve is capable of changing continuously or in steps the sensitivity of the stroke simulator to the above-indicated change.

The simulator control valve may be disposed between the pressurizing chamber and the stroke simulator, or between the stroke simulator and the low-pressure source, as described above. Where the simulator control valve is disposed between the pressurizing chamber and the stroke simulator (more precisely, the primary or first variable-volume chamber of the stroke simulator), the pressurizing chamber and the stroke simulator can be communicated with each other by controlling the simulator control valve, so that the fluid flows between the pressurizing chamber and the stroke simulator can be controlled. For instance, an excessively large amount of increase of the operating stroke of the brake operating member can be avoided by controlling the simulator control valve so as to inhibit or restrict the fluid flow from the pressurizing chamber into the stroke simulator, when the operating stroke or the rate of increase of the operating stroke exceeds a predetermined upper limit.

In the above instance wherein the fluid flow into the stroke simulator is inhibited or restricted when the rate of increase of the operating stroke exceeds the predetermined upper limit, it is possible to prevent an excessive increase of the operating stroke. In any case, the amount of change of the operating stroke can be reduced by controlling the simulator control valve so as to inhibit or restrict the fluid flows between the pressurizing chamber and the stroke simulator.

Where the simulator control valve is disposed between the low-pressure source and the stroke simulator (more precisely, the auxiliary or second variable-volume chamber of the stroke simulator), the fluid flows between the pressurizing chamber and the primary chamber of the stroke simulator can be controlled by controlling the simulator control valve so as to inhibit or restrict the discharge flow of the fluid from the auxiliary chamber of the stroke simulator.

The braking system according to the above mode (34) may incorporate the technical feature according to any one of the above modes (1)-(33).

(35) A braking system comprising:
a master cylinder including a pressurizing piston which is operatively connected to a manually operable brake operating member and which defines a pressurizing chamber and a rear pressure chamber on respective front and rear sides thereof;
a brake cylinder connected to the pressurizing chamber;
an assisting cylinder including a housing, and an assisting piston fluid-tightly and slidably fitted in the housing and cooperating with the housing to define an assisting chamber in front of the assisting piston, the assisting chamber being connected to the brake cylinder and the master cylinder such that the assisting chamber is located between the brake cylinder and the master cylinder;
a master-cylinder cut-off valve disposed between the assisting chamber and the pressurizing chamber, and having an open state in which the assisting chamber and the pressurizing chambers are communicated with each other, and a closed state in which the assisting chamber and the pressurizing chamber are isolated from each other;
a braking characteristic control device operable to control at least one of a pressure of the fluid in the rear pressure chamber of the master cylinder and a pressure of the fluid in the assisting rear pressure chamber, for thereby controlling braking characteristics of the braking system; and
a cut-off valve control device operable when the braking characteristic control device is operated to control the at least one of the pressure of the fluid in the rear pressure chamber and the pressure of the fluid in the assisting rear pressure chamber while the master-cylinder cut-off valve is placed in the closed state, the cut-off valve control device switching the master-cylinder cut-off valve to the open state when an operating speed of the manually operable brake operating member is not lower than a predetermined threshold.

The braking system according to the above mode (35) may incorporate the technical feature according to any one of the above modes (1)-(34).

(36) A braking system comprising;
a hydraulic braking apparatus including (a) a brake cylinder operable to generate a hydraulic braking torque for braking a wheel of a vehicle, (b) a master cylinder including a pressurizing piston which is operatively connected to a manually operable brake operating member and which partially defines a pressurizing chamber, the pressurizing piston being advanced to pressurize a working fluid to a value corresponding to an operating force of the brake operating member, (c) an assisting cylinder including a housing, and an assisting piston-fluid-tightly and slidably fitted in the housing and cooperating with the housing to partially define an assisting chamber in front of the assisting piston, the assisting chamber being connected to the brake cylinder and the master cylinder such that the assisting chamber is located between the brake cylinder and the master cylinder, and (d) a brake-cylinder cut-off valve disposed between the assisting chamber and the brake cylinder and having an open state in which the assisting chamber and the brake cylinder are communicated with each other, and a closed state in which the assisting chamber and the brake cylinder are isolated from each other;
a regenerative braking apparatus including an electric motor which is operatively connected to the wheel and which is operable to generate a regenerative braking torque for braking the wheel;
a braking-pressure control valve device operable to control the pressure of the fluid in the brake cylinder such that a sum of the regenerative braking torque and the hydraulic braking torque substantially coincides with a required total braking torque determined on the basis of an operating state of the brake operating member; and
a stand-by control device operable when the regenerative braking torque that can be generated by the electric motor of the regenerative braking apparatus is not smaller than the determined required total braking torque, the stand-by control device placing the brake-cylinder cut-off valve in the closed state, and controlling the pressure of the fluid in the assisting chamber, on the basis of at least one of the determined required total braking torque and the regenerative braking torque that is generated by the electric motor.

In the closed state of the brake-cylinder cut-off valve, the pressurized fluid is not delivered from the assisting chamber to the brake cylinder, and the fluid pressure in the brake cylinder is at the atmospheric pressure. In this state, the fluid pressure in the assisting chamber is controlled on the basis of at least one of the required total braking torque and the regenerative braking torque, when the required total braking torque is provided by the regenerative braking torque. When the hydraulic braking torque is subsequently required since the regenerative braking torque that can be generated by the regenerative braking apparatus is smaller than the required total braking torque, the brake-cylinder cut-off valve is returned to the open state, so that the brake cylinder can be rapidly operated to provide the desired hydraulic braking torque, which cooperates with the regenerative braking torque to provide the required total braking torque.

The possibility that any amount of hydraulic braking torque is subsequently required can be estimated on the basis of at least one of the required total braking torque and the actual regenerative braking torque. The actual regenerative braking torque is smaller when the operating speed of the electric motor is relatively low than when the operating speed is relative high. On the other hand, the required total braking torque increases with an increase in the operating force of the brake operating member. Therefore, when the actual regenerative braking torque has a tendency of decreasing, or when the required total braking torque has a tendency of increasing, it indicates a relatively high possibility that the brake cylinder will be required to generate a hydraulic braking torque in the near future. The possibility that the hydraulic braking torque is subsequently required can be estimated on the basis of the actual regenerative braking torque alone, the deceleration value of the vehicle, or on the basis of the required total braking toque alone or the rate of increase of the required total braking torque. Further, the above-indicated possibility can be estimated on the basis of both the rate of increase of the required total braking torque and the rate of decrease of the actual regenerative braking torque. In this case, the accuracy of the estimation is improved. The possibility can also be estimated on the basis of a difference between the required total braking torque and the actual regenerative braking torque, or a rate of change of this difference.

The braking system according to the above mode (36) may incorporates the technical feature according to any one of the above modes (1)-(35).

(37) A braking system according to the above mode (39), wherein the stand-by control device includes:
- a possibility-obtaining portion operable on the basis of at least one of the determined required total braking torque and the regenerative braking torque generated by the electric motor; and
- a control portion operable to command the braking-pressure control valve device to control the pressure of the fluid in the assisting chamber, on the basis of the possibility obtained by the possibility-obtaining portion.

For instance, the fluid pressure in the assisting chamber is controlled to increase with an increase in the possibility, so that the delay in the activation of the brake cylinder to provide a braking effect can be reduced.

(38) A braking system comprising:
- a hydraulic braking apparatus including (a) a brake cylinder operable to generate a hydraulic braking torque for braking a wheel of a vehicle, (b) a master cylinder including a pressurizing piston which is operatively connected to a manually operable brake operating member and which partially defines a pressurizing chamber, the pressurizing piston being advanced to pressurize a working fluid to a value corresponding to an operating force of the brake operating member, (c) an assisting cylinder including a housing, and an assisting piston fluid-tightly and slidably fitted in the housing and cooperating with the housing to partially define an assisting chamber in front of the assisting piston, the assisting chamber being connected to the brake cylinder and the master cylinder such that the assisting chamber is located between the brake cylinder and the master cylinder, and (d) a brake-cylinder cut-off valve disposed between the assisting chamber and the brake cylinder and having an open state in which the assisting chamber and the brake cylinder are communicated with each other, and a closed state in which the assisting chamber and the brake cylinder are isolated from each other;
- a regenerative braking apparatus including an electric motor which is operatively connected to the wheel and which is operable to generate a regenerative braking torque for braking the wheel;
- a braking-pressure control valve device operable to control the pressure of the fluid in the brake cylinder such that a sum of the regenerative braking torque and the hydraulic braking torque substantially coincides with a desired total braking torque determined on the basis of an operating state of the brake operating member; and
- a stand-by control device operable when the regenerative braking torque that can be generated by the electric motor of the regenerative braking apparatus is not smaller than the determined desired total braking torque, the stand-by control device placing the brake-cylinder cut-off valve in the closed state, and controlling the pressure of the fluid in the assisting chamber, on the basis of at least one of an operating state of the hydraulic braking apparatus and an operating state of the regenerative braking apparatus.

The possibility that any amount of hydraulic braking torque is subsequently required can be estimated on the basis of at least one of the operating states of the hydraulic braking apparatus and the regenerative braking apparatus. In the braking system according to the above mode (36), the stand-control device is operated on the basis of at least one of the required total braking torque and the actual regenerative braking torque. In the present braking system, the stand-by control device is operated on the basis of at least one of the operating state of the hydraulic braking apparatus and the operating state of the regenerative braking apparatus. The required total braking torque can be obtained on the basis of the operating state of the hydraulic braking apparatus, while the actual regenerative braking torque can be obtained on the basis of the operating state of the regenerative braking apparatus. It is also noted that an electric energy is generated when the electric motor of the regenerative braking apparatus is operated to generate the regenerative braking torque. This electric energy is usually stored in a suitable electric energy storage device. The regenerative braking apparatus may be arranged such that the regenerative braking torque is zeroed when the amount of electric energy stored in the electric energy storage device is larger than a predetermined upper limit. Therefore, the possibility that the hydraulic braking torque is required to be generated can be obtained on the basis of the detected amount of electric energy stored in the storage device, which amount is considered to be the operating state of the regenerative braking apparatus. Thus, the stand-by control device can be operated on the basis of the amount of electric energy presently stored in the storage device.

The braking system according to the above mode (38) may incorporate the technical feature according to any one of the above modes (1)-(37).

BRIEF DESCRIPTION OF THE DRAWING

The above and other objects, features, advantages and technical and industrial significance of the present invention will be better understood by reading the following detailed description of presently preferred embodiments of the invention, when considered in connection with the accompanying drawings, in which:

FIG. 3 is a block diagram schematically illustrating an electronic brake control unit and components connected thereto in the hydraulic braking apparatus;

FIG. 15 is a view schematically showing a diagnostic data table stored in the ROM of the brake control unit;

DETAILED DESCRIPTION OF THE PREFERRED EMBODIMENTS

Figure 1:
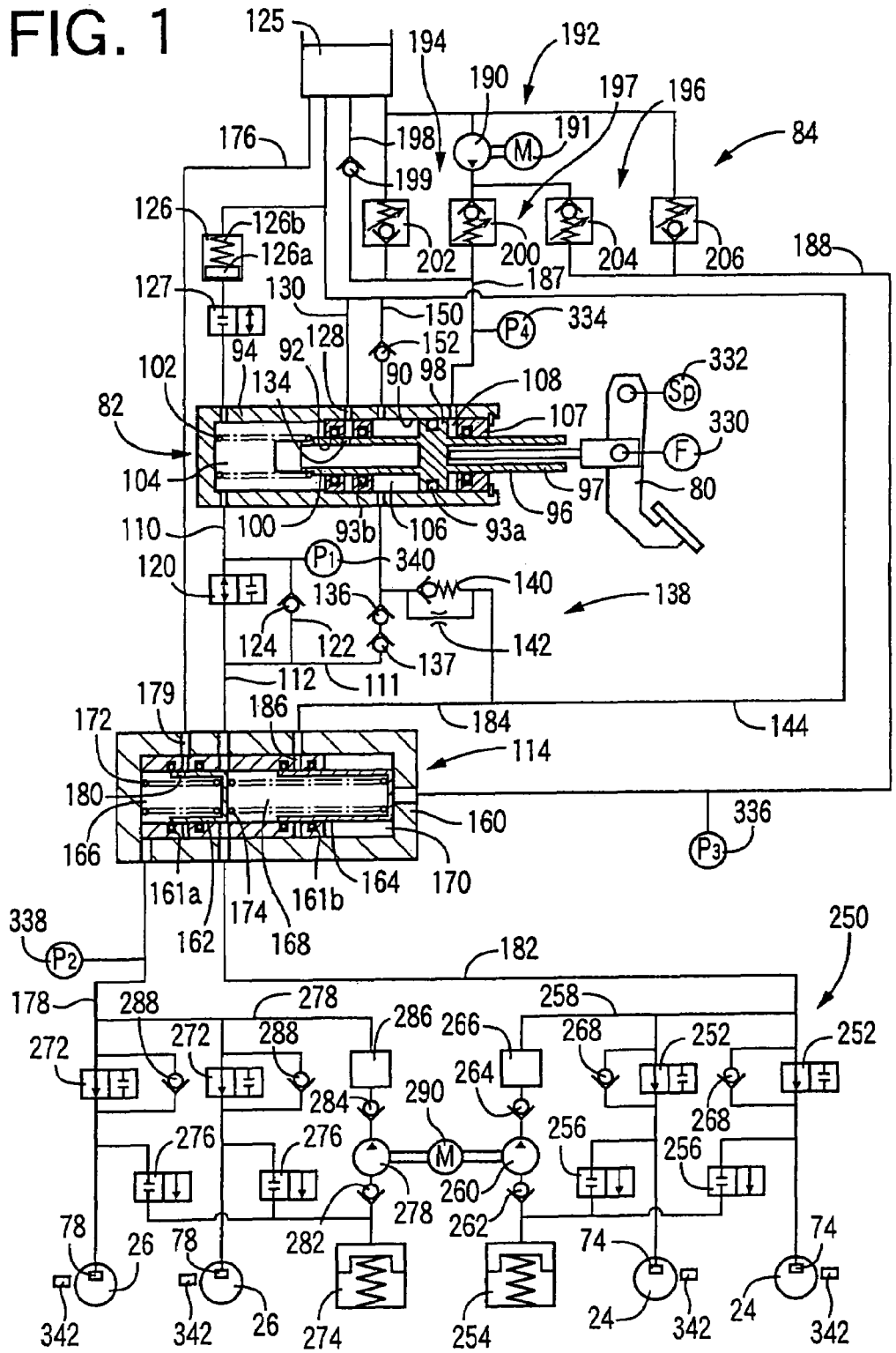
FIG. 1 is a hydraulic circuit diagram showing a hydraulic braking apparatus included in a braking system according to one embodiment of this invention.

Referring first to FIG. 1, there is shown a hydraulically operated braking system constructed according to a first embodiment of this invention, which includes a hydraulic braking apparatus arranged to apply a hydraulic braking force in the form of a frictional braking force to each of front wheels 24 and rear wheels 26. The hydraulic braking apparatus includes brake cylinders 74 for braking the front left and right wheels 24, brake cylinders 78 for braking the rear left and right wheels 26, a brake pedal 80, a master cylinder 82, and a power-operated hydraulic pressure source device 84. Each brake cylinder 74, 78 is arranged to force a friction member onto a rotor rotating with the corresponding wheel 24, 26, when the brake cylinder 74, 78 is operated with a pressurized working fluid supplied thereto, so that the wheel 24, 26 is braked with the frictional braking force generated between the friction member and the rotor, which frictional braking force corresponds to the pressure of the pressurized fluid supplied to the wheel brake cylinder 74,78.

The master cylinder 82 includes a stepped cylinder housing body 94, and a pressurizing piston 96 fluid-tightly and slidably fitted in the cylinder housing body 94. The stepped cylinder housing body 94 has a large-diameter portion 90, and a small-diameter portion 92 having a smaller diameter than the large-diameter portion 90. The pressurizing piston 96 has a piston rod 96 connected to a brake pedal 80, and is a stepped cylindrical member having a large-diameter portion 96 and a small-diameter portion 100 having a smaller diameter than the large-diameter portion 96. The large-diameter portion 98 and the small-diameter portion 100 of the pressurizing piston 96 are fluid-tightly fitted in the respective large-diameter and small-diameter portions 90, 92 of the cylinder housing body 94 through respective sealing members 93a, 93b. The large-diameter portion 98 and small-diameter portion 100 may be considered to be a large-diameter piston and a small-diameter piston, respectively, and the pressurizing piston 96 may be considered to be a piston consisting of the large-diameter piston 98 and the small-diameter piston 100 which are movable as a unit. A return spring 102 is disposed between the small-diameter portion 100 of the pressurizing piston 96 and the cylinder housing body 94, for holding the pressurizing piston 96 at its fully retracted position (at the rightmost position as viewed in FIG. 1). The small-diameter portion 100 of the pressurizing piston 96 cooperates with the cylinder housing body 94 to define a cylindrical front pressurizing chamber 104 on the front side (left side as seen in FIG. 1) of the small-diameter portion 100, while the large-diameter 98 cooperates with the outer circumferential surface of the small-diameter portion 100 and the cylinder housing body 94 to define an annular front pressurizing chamber 106 on the front side of the large-diameter portion 98. An open end of the cylinder housing body 94 is closed by a closure member 107. This closure member 107 cooperates with the large-diameter portion 98 and the cylinder housing body 94 to define a cylindrical rear pressure chamber 108 on the rear side of the large-diameter portion 98.

As described above, the master cylinder 82 used in the present embodiment includes the stepped cylinder housing body 94, and the stepped pressurizing piston 96 consisting of the large-diameter piston 98 and the small-diameter piston 100, so that the stepped cylinder housing body 94 and the stepped pressurizing piston 96 cooperate to define the two mutually independent front pressurizing chambers 104, 106.

A fluid passage 110 is connected to the front pressurizing chamber 104, while a fluid passage 110 is connected to the front pressurizing chamber 106. These two fluid passages 110, 111 merge into a common fluid passage 112, which is connected to the brake cylinders 74 for the front left and right wheels 24. To a portion of the common fluid passage 112 between the master cylinder 82 and the front wheel brake cylinders 24, there is connected an assisting cylinder 114. Thus, the two front pressurizing chambers 104, 106 are connected through the assisting cylinder 114 to the front left and right wheel brake cylinders 74.

The fluid passages 110, 111 extending from the respective front pressurizing chambers 104, 106 may be referred to separate fluid passages, while the assisting cylinder 114 may be referred to as a downstream cylinder since it is disposed downstream of the master cylinder 82.

The fluid passage 110 (separate fluid passage corresponding to the front pressurizing chamber 104) is provided with a master-cylinder cut-off valve 120 having an open state and a closed state for opening and closing the fluid passage 110, respectively. A by-pass passage 122 is provide by-passing the master-cylinder cut-off valve 120. The by-pass passage 122 is provided with a check valve 124 which permits a flow of a working fluid in a direction from the master cylinder 82 toward the wheel brake cylinders 74, and inhibits a flow of the fluid in the reverse direction. While the fluid pressure in the front pressurizing chamber 104 is higher than that in the wheel brake cylinders 74, the fluid is delivered from the pressurizing chamber 104 to the wheel brake cylinders 74 through the by-pass passage 122 (and the check valve 124), even if the master-cylinder cut-off valve 120 is in the closed state.

The braking system includes a low-pressure source in the form of a reservoir 125. The front pressurizing chamber 104 are connected to the reservoir 125 through a stroke simulator 126 and a simulator control valve 127 such that the simulator control valve 127 is disposed between the pressurizing chamber 104 and the stroke simulator 126. The stroke simulator 126 includes a housing, a partition member (simulator piston) 126a received within the housing so as to divide the interior space of the housing into two variable-volume chambers, and a spring 126b which biases the partition member 126a in a direction that reduces the volume of one of the two variable-volume chambers. This one variable-volume chamber of the stroke simulator 126 is connected to the front pressurizing chamber 104, while the other variable-volume chamber is connected to the reservoir 125. While the master-cylinder cut-off valve 120 is placed in its closed state, the simulator control valve 126 is placed in an open state for fluid communication between the pressurizing chamber 104 and the stroke simulator 126. While the master-cylinder cut-off valve 120 is placed in its open state, the simulator control valve 127 is placed in a closed state for disconnecting the pressurizing chamber 104 from the stroke simulator 126. The stroke simulator 126 is held inoperable with its partition member 166a remaining in the original position while the fluid pressure in the pressurizing chamber 104 is lower than a simulation-initiating threshold value $P_0$ determined by a set load of the spring 126b. When the fluid pressure in the pressurizing chamber 104 has been raised to or above the simulation-initiating threshold $P_0$, the stroke simulator 126 is brought into an operable state with a movement of the partition member 126a against the biasing force of the spring 126b, permitting a flow of the fluid from the pressurizing chamber 104 into the stroke simulator 126. In the present embodiment, the simulation-initiating threshold pressure $P_0$ is set higher than a set pressure of a pressure relief valve 140 which will be described.

The cylinder housing body 94 has a port 128 formed through the small-diameter portion 92 between a pair of cup seals serving as the sealing members 93b. To this port 128, there is connected a reservoir passage 130. The small-diameter portion 100 of the pressurizing piston 96 has a communication passage 134. When the pressurizing piston 96 is placed in its fully retracted position, the communication passage 134 is held in communication with the port 128, so that the pressurizing chamber 104 is held in communication with the reservoir 125 through the port 128, communication passage 134 and reservoir passage 130. When the pressurizing piston 96 is advanced from the fully retracted position, the port 128 is disconnected from the communication passage 134, so that the pressurizing chamber 104 is disconnected from the reservoir 125.

The fluid passage 111 (separate passage corresponding to the pressurizing chamber 106) is provided with two check valves 136, 137 in series connection with each other. These check valves 136, 137 permit a flow of the fluid in a direction from the pressurizing chamber 106 toward the wheel brake cylinders 74, and inhibit a flow of the fluid in the reverse direction. In the presence of the two check valves 136, 137, the fluid flow from the wheel brake cylinders 74 or pressurizing chamber 104 to the pressurizing chamber 106 can be inhibited with high reliability, even if one of the check valves 136, 137 is defective, for instance, stuck in the closed state.

To the fluid passage 111, there is connected a flow restricting device 138, which includes a pressure relief valve 140 and an orifice connected in parallel with each other. The flow restricting device 138 is also connected to a reservoir passage 144, which in turn is connected to the reservoir 125. In the presence of the pressure relief valve 140, the fluid pressure in the pressurizing chamber 106 is prevented from exceeding a relief pressure of the pressure relief valve 140. The relief pressure is set such that fast filling of the front wheel brake cylinders 74 is completed when the fluid pressure in the front pressurizing chamber 106 has been raised to the relief pressure. Namely, the front wheel brake cylinders 74 are supplied with the pressurized fluid supplied from the pressurizing chamber 106 while the pressurizing piston 96 is advanced, until the fast filling of the cylinders 74 is completed or terminated. When the fluid pressure in the pressurizing chamber 106 has been raised to the relief pressure, the pressurized fluid delivered from the pressurizing chamber 106 is returned to the reservoir 125 through the pressure relief valve 140 and the reservoir passage 144. Since the pressurizing chamber 106 is held in communication with the reservoir 125 through the orifice 142, the fluid pressure in the pressurizing chamber 106 is kept at the atmospheric pressure while the pressurizing piston 96 is held at a given advanced position.

The front pressurizing chamber 106 is connected to the reservoir 125 through a reservoir passage 150, which is provided with a check valve 152 permitting a flow of the fluid in a direction from the reservoir 125 toward the pressurizing chamber 106 and inhibiting a flow of the fluid in the reverse direction. When the volume of the pressurizing chamber 106 is increased, the fluid is supplied from the reservoir 125 into the pressurizing chamber 106 through the reservoir passage 150, so that the fluid pressure in the pressurizing chamber 106 is prevented from being lowered below the atmospheric pressure.

In the present embodiment, the master-cylinder cut-off valve 120, the check valves 124, 136, 137 and the pressure relief valve 140 constitute a valve device having a first state in which the pressurized fluid is delivered from the two pressurizing chambers 104, 106 to the front wheel brake cylinders 74, and a second state in which the pressurized fluid is delivered from only the pressurizing chamber 104 to the brake cylinders 74.

The assisting cylinder 114 includes a cylinder housing body 160, and a first and a second assisting piston 164, 166 arranged in series with each other and fluid-tightly and slidably fitted in the cylinder housing body 160 through sealing members 161a, 161b. The first and second assisting pistons 164, 166 cooperate with the cylinder housing body 160 to define a first assisting chamber 166 and a second assisting chamber 168, which are on the front side of the respective assisting pistons 164, 166. The second assisting piston 166 and the cylinder housing body 160 cooperate to define an assisting rear pressure chamber 170, which is formed on the rear side of the second assisting piston 166. A return spring 162 is disposed between the cylinder housing body 160 and the first assisting piston 162, while a return spring 174 is disposed between the first and second return springs 162, 164.

In the assisting cylinder 114 provided in the present embodiment, one of the opposite surfaces of the first assisting piston 162 which partially defines the first assisting chamber 166, and the opposite surfaces of the second assisting piston 164 which partially define the second assisting chamber 168 and the rear pressure chamber 170, respectively, have the same pressure-receiving surface area, and the two return springs 172, 174 have the same biasing force. In this arrangement of the assisting cylinder 114, the first and second assisting chambers 166, 168 and the rear pressure chamber 170 have the same fluid pressure.

The cylinder housing body 160 has a port 179 formed through a portion thereof between a pair of cup seals serving as the sealing members 161a. To this port 179, there is connected a reservoir passage 176 connected to the reservoir 125. To the first assisting chamber 166, there is connected a brake cylinder passage 178 connected to the brake cylinders 78 for the rear left and right wheels 26.

While the port 179 is in communication with a communication passage 180 formed through the first assisting piston 162, the fist assisting chamber 166 is held in communication with the reservoir 125. While the port 179 is closed by the first assisting piston 162, the first assisting chamber 166 is disconnected from the reservoir 125, so that the fluid pressure in the first pressurizing chamber 166 can be raised by a movement of the first assisting piston 162. The first assisting chamber 166 is communicated with the reservoir 125 through the cup seals 161a, so that the fluid pressure in the first assisting chamber 166 is prevented from being lowered below the atmospheric pressure.

The second assisting chamber 168 is communicated with an upstream portion and a downstream portion 182 of the common passage 112. The downstream portion 182 functions as a brake-cylinder passage connected to the front wheel brake cylinders 74. The cylinder housing body 160 has a port 186 formed through a portion thereof between a pair of cup seals serving as the sealing members 161b. To this port 186, there is connected a reservoir passage 184 connected to the reservoir 125. In this arrangement, the fluid pressure in the second assisting chamber 168 is prevented from being lowered below the atmospheric pressure. The reservoir passage 184 may be referred to as a fluid supply passage.

The rear pressure chamber 107 of the master cylinder 82 and the rear pressure chamber 170 of the assisting cylinder 114 are connected the power-operated hydraulic pressure source device 84 through respective fluid passages 187, 188. The power-operated hydraulic pressure source device 84 includes a pump device 192 (pressure generating device) and a control portion 197. The pump device 192 includes a pump 190 and a pump motor 191 for driving the pump 190. The control portion 197 includes a first and a second linear valve device 194, 196. The fluid pressure in the rear pressure chamber 108 of the master cylinder 82 is controlled by the first linear valve device 194, while the fluid pressure in the rear pressure chamber 170 of the assisting cylinder 114 is controlled by the second linear valve device 196. The pump 190 is operated to pressure the fluid received from the reservoir 125, and the pump device 192 is provided commonly for the two rear pressure chambers 108, 170.

The rear pressure chamber 108 of the master cylinder 82 is also directly connected to the reservoir 125 through a fluid supply passage 198, which is provided with a check valve 199 which permits a flow of the fluid in a direction from the reservoir 125 toward the rear pressure chamber 108 and inhibits a flow of the fluid in the reverse direction. When the pressurizing piston 96 is advanced with a result of an increase in the volume of the rear pressure chamber 108, the fluid is rapidly supplied from the reservoir 125 into the rear pressure chamber 108 through the fluid supply passage 199, so that the fluid pressure in the rear pressure chamber 108 is prevented from being lowered below the atmospheric pressure.

Figure 2A:
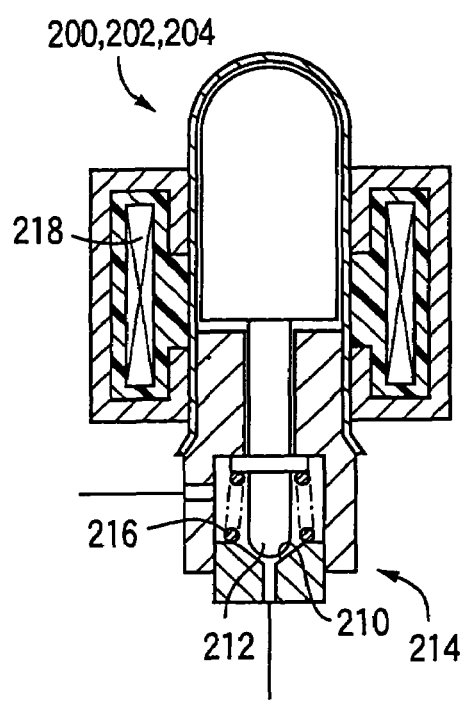
FIGS. 2A and 2B are elevational views in cross section of a linear valve device included in the hydraulic braking apparatus.
Figure 2B:
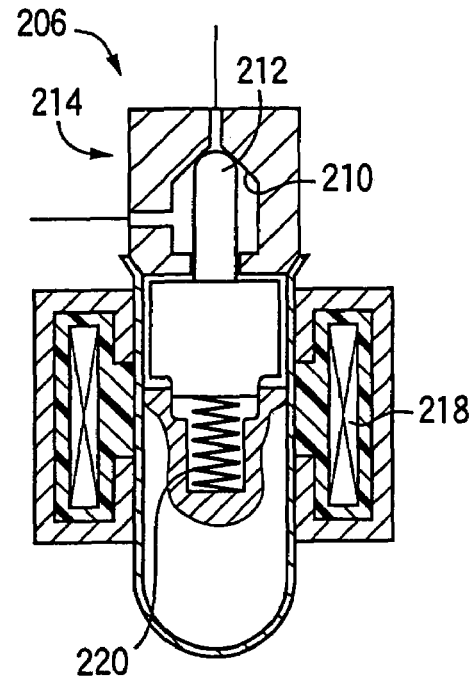

The first linear valve device 194 includes a pressure-increasing linear valve 200 and a pressure-reducing linear valve 202, while the second linear valve device 196 includes a pressure-increasing linear valve 204 and a pressure-reducing linear valve 206. As shown in FIGS. 2A and 2B, each of these pressure-increasing linear valves 200, 204 and pressure-reducing linear valves 202, 206 is provided with a seating valve 214 including a valve seat 210, and a valve member 212 movable toward and away from the valve seat 210. Each of the pressure-increasing linear valves 200, 204 and the pressure-reducing linear valve 202 is a normally open valve which is normally open with its solenoid coil 218 kept in a de-energized state. On the other hand, the pressure-reducing linear valve 206 is a normally closed valve which is normally closed with its solenoid coil 218 kept in a de-energized state.

In the pressure-increasing linear valves 200, 204 and the pressure-reducing linear valve 202, the spring 216 is disposed to bias the valve member 212 in a direction away from the valve seat 210, as indicated in FIG. 2A. A force on the basis of a fluid pressure difference across the valve 200, 204, 202 also acts on the valve member 212 in the direction away from the valve seat 210. An electromagnetic force corresponding to an amount of electric current applied to the solenoid coil 218 acts on the valve member 212 in a direction toward the valve seat 210. Described in detail, the valve member 212 of the seating valve 214 receives a biasing force F1 of the spring 216, the force F2 based on the fluid pressure difference and the electromagnetic force F3, such that a sum of the biasing force F1 and the force F2 acts on the valve member 212 so as to be moved apart from the valve seat 210, while the electromagnetic force F3 acts on the valve member 212 so as to be seated onto the valve seat 210. The position of the valve member 212 relative to the valve seat 210 is determined by the values of the forces F1, F2 and F3. The fluid pressure difference across the valve 200, 204, 202 can be controlled by controlling the electromagnetic force F3, that is, by controlling the amount of electric current applied to the solenoid coil 218.

Each of the pressure-increasing linear valves 200, 204 is disposed between the pump device 192 and the rear pressure chamber 108, 170. Accordingly, the fluid pressure difference across the pressure-increasing linear valve 200 is a difference between the delivery pressure of the pump device 192 and a fluid pressure $P_4$ in the rear pressure chamber 108 of the master cylinder 82, while the fluid pressure difference across the pressure-increasing linear valve 204 is a difference between the delivery pressure of the pump device 192 and a fluid pressure P3 in the rear pressure chamber 170 of the assisting cylinder 114. Where the pump device 192 has a predetermined delivery pressure, the fluid pressures P4, P3 in the rear pressure chamber 108, 170 is controlled by controlling the amount of electric current to be applied to the solenoid coil 218. The pressure-reducing valve 202 is disposed between the rear pressure chamber 108 of the master cylinder 82 and the reservoir 125. Since the fluid in the reservoir 125 is kept at the atmospheric pressure, the fluid pressure difference across the pressure-reducing valve 202 is equal to the fluid pressure $P_4$ in the rear pressure chamber 108. The fluid pressure $P_4$ is controlled by controlling the amount of electric current to be applied to the solenoid coil 218.

In the pressure-reducing linear valve 206, a spring 220 is disposed so as to bias the valve member 212 in a direction toward the valve seat 210, as indicated in FIG. 2B. When an electric current is applied to the solenoid coil 218, an electromagnetic force is generated to bias the valve member 212 in a direction away from the valve seat 210. Since the pressure-reducing linear valve 206 is disposed between the rear pressure chamber 170 of the assisting cylinder 114 and the reservoir 125, a force based on the fluid pressure $P_3$ in the rear pressure chamber 170 acts on the valve member 212. In the seating valve 214 of the pressure-reducing linear valve 206, the position of the valve member 212 relative to the valve seat 210 is determined by the values of the biasing force of the spring 220, electromagnetic force and the force based on the fluid pressure $P_3$. The fluid pressure $P_3$ can be controlled by controlling the electromagnetic force, that is, by controlling the amount of electric current to be applied to the solenoid coil 218.

In the present embodiment, the fluid pressure $P_4$ in the rear pressure chamber 108 of the master cylinder 82 is controlled by controlling the pressure-increasing linear valve 200 and the pressure-reducing linear valve 202, while the fluid pressure in the rear pressure chamber 170 of the assisting cylinder 114 is controlled by controlling the pressure-increasing linear valve 204 and the pressure-reducing linear valve 206.

An electromagnetic braking-pressure control valve device 250 is provided between the assisting cylinder 114 and the wheel brake cylinders 74, 78. The braking-pressure control valve device 250 includes a plurality of electromagnetic shut-off valves, and may be referred to as an anti-lock braking pressure control device since it is operated for performing special controls of the wheel brake cylinders 74, 78, such as an anti-lock braking pressure control during an operation of the brake pedal 80.

The electromagnetic braking-pressure control valve device 250 includes two pressure-holding valves 252 provided in the brake-cylinder passage 182 connecting the second assisting chamber 168 of the assisting cylinder 114 and the respective front wheel brake cylinders 74, and two pressure-reducing valves 256 provided in pressure-reducing passages connecting the respective front wheel brake cylinders 74 and a reservoir 254. A pump passage 258 is connected at its one end to the reservoir 254 and at the other end to an upstream portion of the brake-cylinder passage 182 between the second assisting chamber 186 and the pressure-holding valves 252. The pump passage 258 is provided with a pump 260, two check valves 262, 264 and a damper 266, which are arranged in series connection with each other. The fluid received from the reservoir 254 is pressurized by the pump 260, and the pressurized fluid is returned to the brake-cylinder passage 182. A check valve 268 is provided in a by-pass passage which by-passes each of the two pressure-holding valves 252. This check valve 268 permits a flow of the fluid in a direction from the corresponding front wheel brake cylinder 74 toward the assisting cylinder 114 (toward the master cylinder 82), and inhibits a flow of the fluid in the reverse direction.

The electromagnetic braking-pressure control valve device 250 further includes two pressure-holding valves 272 provided in the brake-cylinder passage 178 connecting the first assisting chamber 166 of the assisting cylinder 114 and the respective rear wheel brake cylinders 78, and two pressure-reducing valves 276 provided in pressure-reducing passages connecting the respective rear wheel brake cylinders 78 and a reservoir 274. A pump passage 278 is connected at its one end to the reservoir 274 and at the other end to an upstream portion of the brake-cylinder passage 178 between the pressure-holding valves 272 and the first assisting chamber 166. The pump passage 278 is provided with a pump 280, two check valves 282, 284 and a damper 286, which are arranged in series connection with each other. The fluid received from the reservoir 274 is pressurized by the pump 278, and the pressurized fluid is returned to the brake-cylinder passage 178. A check valve 288 is provided in a by-pass passage which by-passes each pressure-holding valve 272. This check valve 288 permits a flow of the fluid in a direction from the corresponding rear wheel brake cylinder 78 toward the assisting cylinder 114 (toward the master cylinder 82), and inhibits a flow of the fluid in the reverse direction.

These two pumps 260, 280 are driven by a common electric motor 290.

The present braking system includes an electronic brake control unit (hereinafter abbreviated as "brake control ECU") 300, which includes a control portion 310, and a driver portion 328. The control portion 310 is constituted principally by a computer incorporating a processing unit (PU) 302, a read-only memory (ROM) 304, a random-access memory (RAM) 306, and an input/output portion 308. The driver portion 328 includes: a driver circuit 312 for controlling an electric current to be applied to the solenoid coil 218 of the pressure-increasing linear valve 200; driver circuits 314, 316, 318 for controlling electric currents to be applied to the solenoid coils of the pressure-reducing linear valve 202, pressure-increasing linear valve 204 and pressure-reducing linear valve 206; driver circuits 320, 322 for energizing and de-energizing the solenoid coils of the master-cylinder cut-off valve 120 and the simulator control valve 127; driver circuits 323, 324 for controlling the pump motors 191, 290; and driver circuits 325, 326 for controlling electric currents to be applied to the pressure-holding valves 252, 272 and the pressure-reducing valves 256, 276.

To the input/output portion 308 of the control portion 310, there are connected: an operating force sensor 330 for detecting an operating force $F_P$ acting on the brake pedal 80; a stroke sensor 332 for detecting an operating stroke $S_P$ of the brake pedal 80; a master-cylinder rear pressure sensor 334 for detecting the fluid pressure $P_4$ in the rear pressure chamber 108 of the master cylinder 82; an assisting-cylinder rear pressure sensor 336 or detecting the fluid pressure $P_3$ in the rear pressure chamber 170 of the assisting cylinder 114; a rear wheel brake pressure sensor 338 or detecting a fluid pressure $P_2$ in the rear wheel brake cylinders 78 for the rear wheels 26; a master-cylinder pressure sensor 340 for detecting a fluid pressure $P_1$ in the front pressurizing chamber 104 of the master cylinder 82; wheel speed sensors 342 for detecting the rotating speeds of the front and rear wheels 24, 26; an ignition switch 344; and a parking brake switch 346. The parking brake switch 346 is provided to detect that a parking lever for applying or releasing a parking brake to or from the vehicle is placed in an operated position thereof. In the present embodiment, the rear wheel brake pressure sensor 33 is connected to the brake-cylinder passage 178, for detecting the fluid pressure in the rear wheel brake cylinders 78 for the rear left and right wheels 26. The fluid pressure detected by this pressure sensor 338 may be considered to be the fluid pressure in the first assisting chamber 166 of the assisting cylinder 114.

Figure 4:
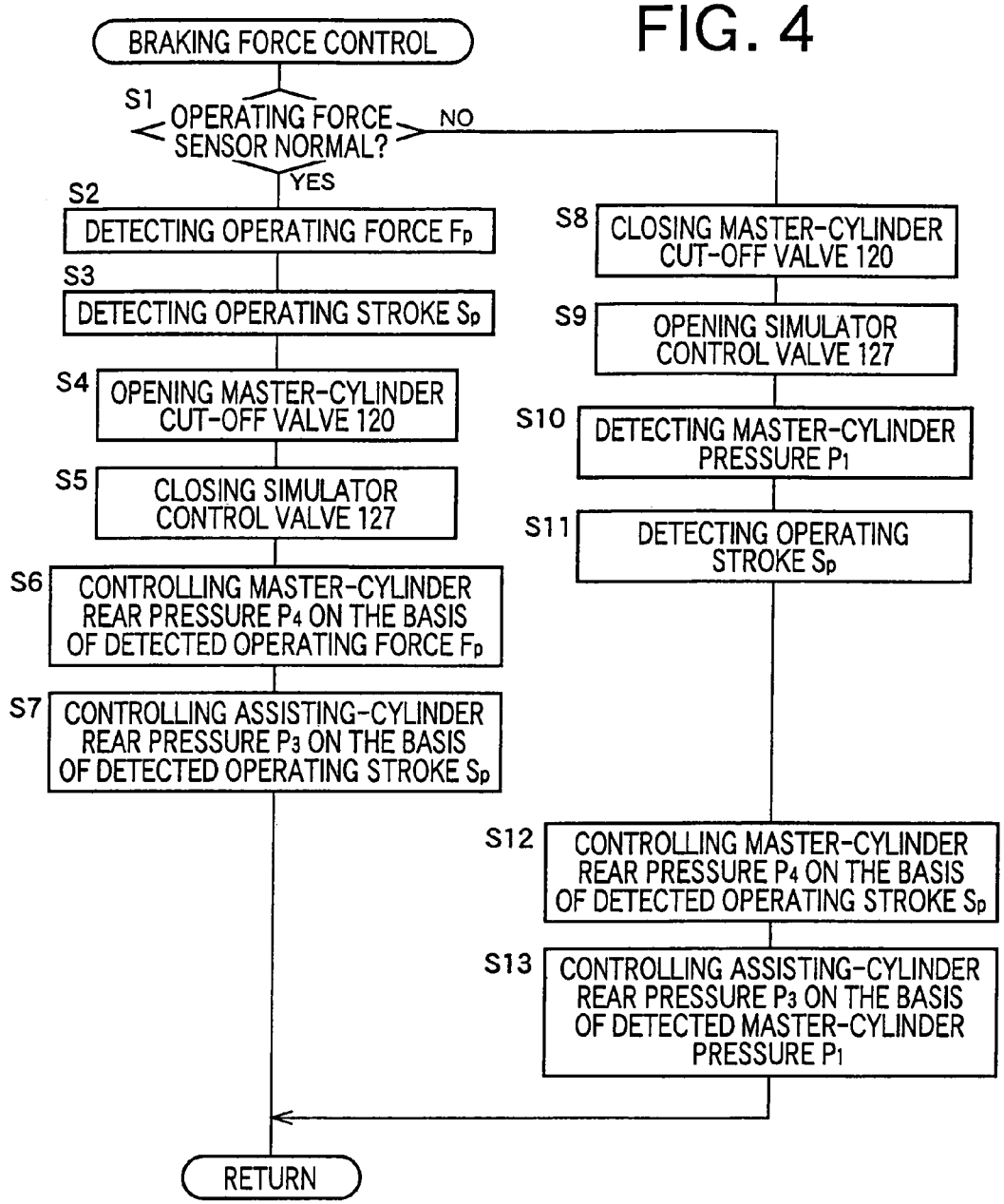
FIG. 4 is a flow chart illustrating a braking force control routine executed according to a control program stored in a ROM of the brake control unit.
Figure 5:
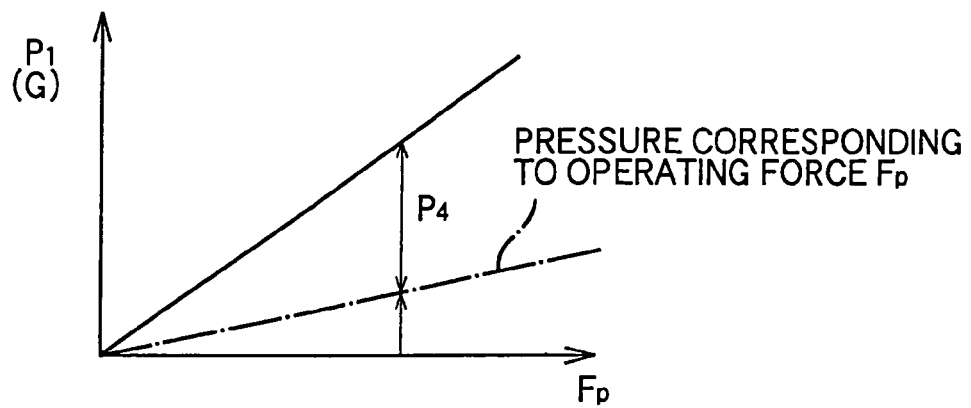
FIG. 5 is a graph indicating a data table stored in the ROM of the brake control unit and used to control a rear pressure in a master cylinder.
Figure 6:
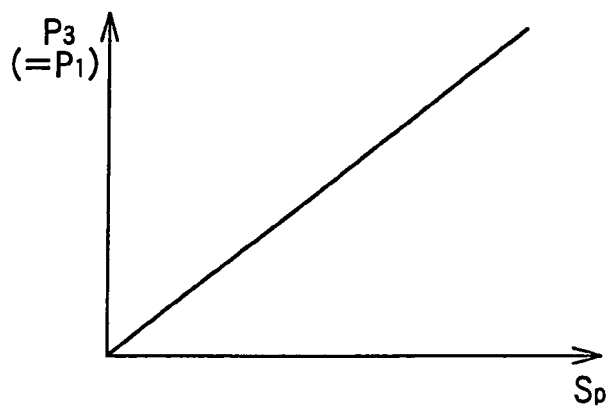
FIG. 6 is a graph indicating a data table stored in the ROM of the brake control unit and used to control a rear pressure in an assisting cylinder.
Figure 7:
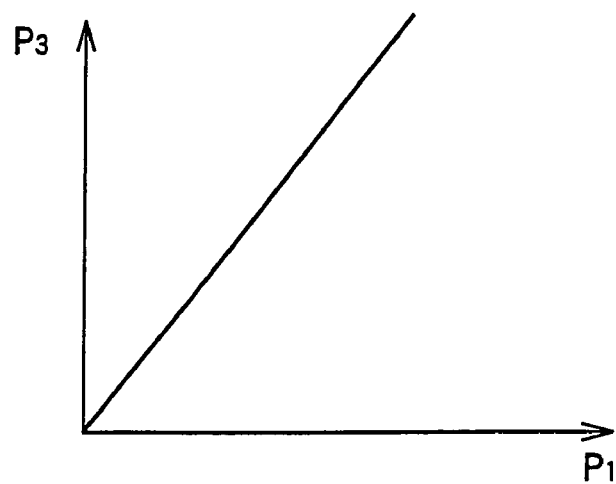
FIG. 7 is a graph indicating a data table stored in the ROM of the brake control unit and used to control the rear pressure in the assisting cylinder.
Figure 8:
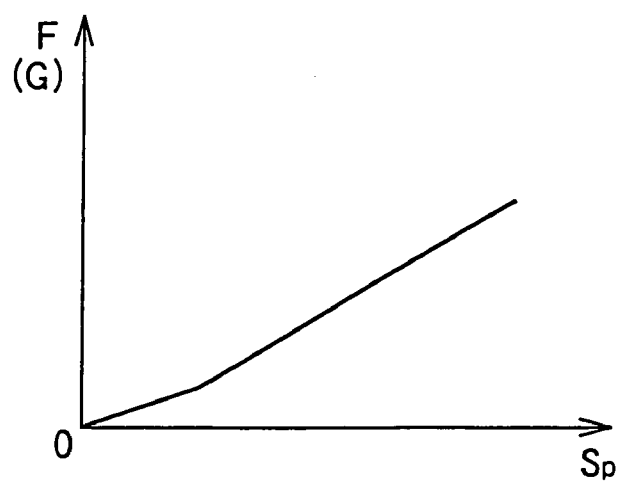
FIG. 8 is a graph indicating a data table stored in the ROM of the brake control unit and used to control the rear pressure in the master cylinder.
Figure 14:
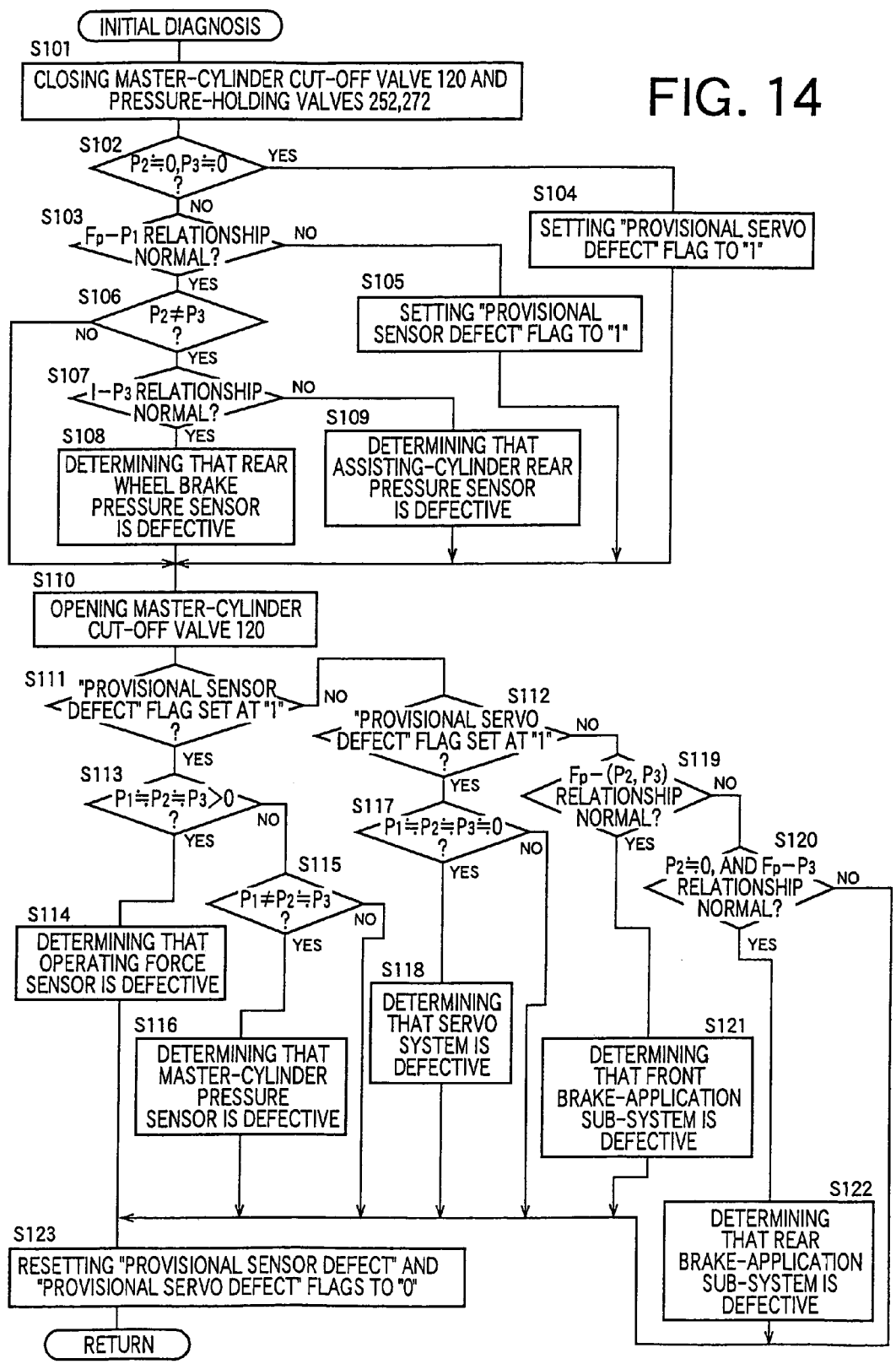
FIG. 14 is a flow chart illustrating an initial diagnostic routine executed according to a control program stored in the ROM of the brake control unit.

The ROM 304 stores various control programs such as a braking force control program for executing a braking force control routine illustrated in the flow chart of FIG. 4, and a diagnosing control program for executing an initial diagnostic routine illustrated in the flow chart of FIG. 14, and further stores various data maps or tables such as master-cylinder rear pressure control data tables of FIGS. 5 and 8, and assisting-cylinder rear pressure control data tables of FIGS. 6 and 7.

There will be described an operation of the braking system constructed as described above. In a normal braking operation of the braking system, the fluid pressure $P_4$ in the rear pressure chamber 108 is controlled on the basis of the detected operating force FP of the brake pedal 80 detected by the rear pressure sensor 330 while the master-cylinder cut-off valve 120 is placed in the open state. Where the operating force sensor 330 is defective, the fluid pressure $P_4$ in the master-cylinder rear pressure chamber 108 is controlled on the basis of the detecting operating stroke $S_P$ detected by the stroke sensor 332, and the fluid pressure $P_3$ in the assisting-cylinder rear pressure chamber 170 is controlled on the basis of the fluid pressure $P_1$ in the front pressurizing chamber 104 detected by the master-cylinder pressure sensor 340, while the master-cylinder cut-off valve 120 is placed in the closed state. In this respect, it is noted that the fluid pressure $P_1$ corresponds to the operating force $F_P$ of the brake pedal 80, and is used to control the fluid pressure $P_3$ on the basis of the detected fluid pressure $P_1$.

The power-operated hydraulic pressure source device 84, the front and rear brake-application sub-systems, and the various sensors such as the operating force sensor 340 are diagnosed for any abnormality, in an initial diagnosis, and the corresponding flags are set according to results of the initial diagnosis. This initial diagnosis will be described later by reference to the flow chart of FIG. 14.

During an operation of the brake pedal 80, the braking force control routine illustrated in the flow chart of FIG. 4 is executed to control the first and second linear valve devices 194, 196, so as to give a predetermined operating feel of the brake pedal 80 and so as to exhibit predetermined braking characteristics.

The braking force control routine is initiated with step S1 to determine whether the operating force sensor 330 is normally functioning. If the operating force sensor 330 is normal, the control flow goes to step S2 and the following steps. If the operating force sensor 330 is not normal, the control flow goes to step S8 and the following steps.

In step S2 implemented when the operating force sensor 330 is normal, the operating force $F_P$ acting on the brake pedal 80 is detected by the operating force sensor 330. Step S2 is followed by step S3 to detect the operating stroke $S_P$ of the brake pedal 80. Then, the control flow goes to step S4 to open the master-cylinder cut-off valve 120 and close the simulator control valve 127. Step S5 is followed by step S6 in which the fluid pressure $P_4$ in the master-cylinder rear pressure chamber 108 is controlled on the basis of the detected operating force $F_P$ and according to the data table indicated in the graph of FIG. 5. Step S6 is followed by step S7 in which the fluid pressure $P_3$ in the assisting-cylinder rear pressure chamber 170 is controlled on the basis of the detected operating stroke $S_P$ and according to the data table indicated in the graph of FIG. 6.

When the brake pedal 80 is operated, and the fluid pressure in the front pressurizing chambers 104, 106 is raised as the pressurizing piston 96 is advanced. Before the pressure in the pressurizing chamber 106 has reached a relief pressure of the pressure relief valve 140, the fluid pressurized in the pressurizing chamber 106 is delivered to the front wheel brake cylinders 74 through the fluid passage 111 (and the check valves 136, 137), while the fluid pressurized in the pressurizing chamber 104 is delivered to the front wheel brake cylinders 74 through the fluid passage 110 (through the open master-cylinder cut-off valve 120) or the check valve 124.

Thus, the fast filling of the front wheel brake cylinders 74 is effected by the pressurized fluid delivered from the two front pressurizing chambers 104, 106 of the master cylinder 82, until the pressure of the fluid in these chambers 104, 106 has been raised to the relief pressure of the pressure relied valve 140. Since the front wheel brake cylinders 74 is filled with the pressurized fluid delivered from the two pressurizing chambers 104, 106, the fast filling can be completed in a short time, so that a delay in the increase of the front wheel braking pressure in an initial period of the braking operation can be minimized.

When the fast filling of the front wheel brake cylinders 74 is completed with the fluid pressure in the pressurizing chamber 106 reaching the relief pressure, the pressurized fluid delivered from the pressurizing chamber 106 is returned to the reservoir 125 through the pressure relief valve 140. Since the pressurizing chamber 106 is communicated with the reservoir 125 through the orifice 142, the pressurizing chamber 106 is kept at the atmospheric pressure while the pressurizing piston is held at a given advanced position. After the fast filling of the front wheel brake cylinders 74 is completed, the front wheel brake cylinders 74 receive only the pressurize fluid delivered from the pressurizing chamber 104. Since the small-diameter portion 100 of the pressuring piston 96 which partially defines the pressurizing chamber 104 has a smaller effective pressure-receiving surface area than the large-diameter portion 98 which partially defines the pressurizing chamber 106, the fluid pressure in the pressurizing chamber 104 at a given value of the operating force $F_P$ is higher after the fast filling of the front wheel brake cylinders 74 than before the fast filling.

It will be understood that the flow restricting device 138 including the pressure relief valve 140 may be considered to be a fill-up device for effecting the fast filling of the front wheel brake cylinders 74.

The fluid pressure $P_4$ in the master-cylinder rear pressure chamber 108 is controlled so as to establish a predetermined relationship of FIG. 5 between the operating force $F_P$ and the master-cylinder pressure $P_1$, which relationship is represented by the data table stored in the ROM 304. The fluid pressure $P_1$ generated in the pressurizing chamber 104 corresponds to a sum of the operating force $F_P$ applied by the vehicle operator to the pressurizing piston 96 and an assisting force based on the fluid pressure $P_4$ in the rear pressure chamber 108. The fluid pressure $P_4$ in the rear pressure chamber 108 can be controlled to establish the predetermined $P_1$-$F_P$ relationship of FIG. 5, by increasing the fluid pressure $P_4$ with an increase in the operating force $F_P$, namely, to establish a predetermined constant servo ratio.

In the master cylinder 82, the following equation is satisfied:

$$P_1 \cdot S_2 = F_P + P_4(S_1 - S_2) - P_f(S_1 - S_2)$$

wherein, $S_1$=cross sectional surface area of large-diameter portion 98;

$S_2$=cross sectional surface area of small-diameter portion 100 (input rod 97);

$P_1$=fluid pressure in chamber 104;

$P_f$=fluid pressure in chamber 106;

$P_4$=fluid pressure chamber 108; and $F_P$=operating force of brake pedal 80.

Since the cross sectional surface area of the input rod 97 is equal to the cross sectional surface area $S_2$ of the small-diameter portion 100, the pressure-receiving surface area $(S_1-S_2)$ of the pressurizing piston 96 which partially defines the front pressurizing chamber 106 is equal to the pressure-receiving surface area of the pressurizing piston 96 which partially defines the rear pressure chamber 108. Further, the cross section surface area $(S_1-S_2)$ which partially defines the front pressuring chamber 106 is larger than the pressure-receiving surface area which partially defines the front pressurizing chamber 104 (cross sectional surface area $S_2$ of the small-diameter portion 100). Since the fluid pressure $P_f$ in the front pressurizing chamber 106 is increased with an increase in the operating force $F_P$ until the fast filling of the wheel brake cylinders 74 is completed, the fluid pressure $P_f$ can be represented by an equation $P_f = k_1 \cdot F_P$. It is also noted that since the master-cylinder pressure $P_1$ and the operating force $F_P$ are controlled so as to establish the predetermined servo ratio $\gamma (P_1 = \gamma \cdot F_P)$, the fluid pressure $P_4$ in the master-cylinder rear pressure chamber 108 is controlled so as to satisfy the following equation:

$$P_4 = \{(\gamma \cdot S_2 - 1) + k_1(S_1 - S_2)\} F_P / (S_1 - S_2)$$

The predetermined constant servo ratio $\gamma$ can be established by linearly increasing the fluid pressure $P_4$ in the rear pressure chamber 108 of the master cylinder 82 with an increase in the operating force $F_P$ according to the above equation.

After the fast filling of the front wheel brake cylinders 74 is terminated, the fluid pressure $P_f$ in the pressurizing chamber 106 is kept at the atmospheric pressure. Accordingly, the fluid pressure $P_4$ in the rear pressure chamber 108 is controlled according to the following equation:

$$P_4 = (\gamma \cdot S_2 - 1) F_P / (S_1 - S_2)$$

While the fluid pressure $P_f$ in the pressurizing chamber 106 is held at the atmospheric pressure, the fluid pressure $P_4$ in the rear pressure chamber 108 required to control the fluid pressure $P_1$ in the pressurizing chamber 104 to a given value can be reduced for a given value of the operating force $F_P$, so that the required amount of energy consumption can be accordingly reduced.

In the present embodiment, the amounts of electric current to be applied to the solenoid coils of the pressure-increasing and pressure-reducing linear valves 200, 202 of the first liner valve device 194 are determined so that the fluid pressure $P_4$ in the rear pressure chamber 108 approaches a desired value, and control signals corresponding to the determined amounts of electric current are applied to the respective driver circuits 312, 314. Alternatively, the amounts of electric current to be applied to the linear valves 200, 202 may be determined so that the fluid pressure $P_1$ in the pressurizing chamber 104 approaches a desired value.

The fluid pressure $P_3$ in the rear pressure chamber 170 of the assisting cylinder 114 is controlled so as to establish a predetermined relationship of FIG. 6 between the operating stroke $S_P$ and the fluid pressure $P_3$, which relationship is represented by the data table stored in the ROM 304. With an increase of the fluid pressure in the second assisting chamber 170, the second assisting piston 164 is advanced, and the fluid pressure in the second assisting chamber 168 is increased, so that the first pressurizing piston 162 is advanced. As a result, the first assisting chamber 166 is disconnected from the reservoir 125, and the fluid pressure in the chamber 166 is increased. Thus, the first assisting piston 162 is a piston which is moved on the basis of a difference between the fluid pressures in the first and second assisting chambers 166, 168.

In the assisting cylinder 114, the first and second assisting chambers 166, 168 and the rear pressure chamber 170 have the same fluid pressure, as described above. It is also noted that the upstream and downstream portions of the common passage 120 on the respective upstream and downstream sides of the assisting cylinder 114 have the same fluid pressure. Therefore, the fluid pressure in the brake cylinders 74 for the front wheels 24, the fluid pressure in the brake cylinders 78 for the rear wheels 26 (fluid pressure $P_2$ detected by the rear wheel brake pressure sensor 338), the master-cylinder pressure $P_1$ (in the pressurizing chamber 104) and the assisting-cylinder pressure $P_3$ (in the rear pressure chamber 170) are all equal to each other. Therefore, the fluid pressure $P_3$ represents the fluid pressure in the wheel brake cylinders 74, 78, and corresponds to an actual deceleration value G of the vehicle. Namely, the relationship between the operating stroke $S_P$ and the fluid pressure $P_3$ corresponds to a relationship between the operating stroke $S_P$ and the deceleration value G of the vehicle. Accordingly, the braking characteristics as represented by a relationship between the operating states of the brake pedal 80 and the wheel brake cylinders 74, 78 are controlled. That is, the amounts of electric current to be applied to the pressure-increasing and pressure-reducing linear valves 204, 206 of the second linear valve device 196 are determined so that the fluid pressure P3 in the rear pressure chamber 170 approaches a desired value, and control signals corresponding to the determined amounts of electric current are applied to the respective driver circuits 316, 318.

While the master-cylinder cut-off valve 120 is placed in the open state, the power-operated hydraulic pressure source device 84 can be relatively easily controlled so as to establish the predetermined relationships among the operating force $F_P$ and stroke $S_P$ of the brake pedal 80 and the deceleration value G of the vehicle, as described above.

In the present embodiment, the linear valve devices 194, 196 are controlled so as to establish the predetermined linear relationship of FIG. 5 between the operating force $F_P$ and the vehicle deceleration value G (corresponding to the master-cylinder pressure $P_1$) and the predetermined linear relationship of FIG. 6 between the operating stroke $S_P$ and the vehicle deceleration value G. However, the linear valve devices 194, 196 may be controlled so as to establish other predetermined $F_P$-G and $S_P$-G relationships represented by respective curves, for instance. Further, the gradients of the straight lines representing the linear relationships (servo ratio) may be changed as needed.

When the brake pedal 80 is released or returned to the non-operated position, the pump device 192 is turned off, and the solenoid coils of the linear valves 200-206 are de-energized with the amount of electric current being zeroed. As a result, the pressure-increasing linear valves 200, 204 and the pressure-reducing linear valve 202 are opened, while the pressure-reducing linear valve 206 is closed, so that the fluid in the rear pressure chamber 108 of the master cylinder 82 is returned to the reservoir 126 through the opened pressure-reducing linear valve 202, while the fluid in the rear pressure chamber 170 of the assisting cylinder 114 is returned to the reservoir 125 through the opened pressure-increasing linear valves 200, 204 and the opened pressure-reducing linear valve 202. The pressurizing piston 92 of the master cylinder 82 is returned to its fully retracted position, and the first and second assisting pistons 162, 164 of the assisting cylinder 114 are returned to their fully retracted positions.

The pressurized fluid in the brake cylinders 74 for the front wheels 24 is returned to the pressurizing chamber 104 through the second assisting chamber 168 and the open master-cylinder cut-off valve 120, and the pressurized fluid in the pressurizing chamber 104 is returned to the reservoir 125 through the communication passage 134, port 128 and reservoir passage 130. As the second assisting piston 164 is retracted, the volume of the second assisting chamber 168 is increased while the fluid is supplied to this chamber 168 through the reservoir passage 184.

The pressurized fluid in the brake cylinders 78 for the rear wheels 26 is returned to the reservoir 125 through the first assisting chamber 166, communication passage 180 and fluid passage 176.

As the pressurizing piston 96 is retracted, the volume of the pressurizing chamber 106 is increased while the fluid is supplied from the reservoir 125 to this chamber 106 through the check valve 152, so that the fluid pressure in the pressurizing chamber 106 is prevented from being lowered below the atmospheric pressure.

Where the operating force sensor 330 is defective, a negative decision (NO) is obtained in step S1, and the control flow goes to steps S8 and S9 to close the master-cylinder cut-off valve 120 and open the simulator control valve 127. Step S9 is followed by steps S10 and S11 to detect the master cylinder pressure $P_1$ on the basis of the output signal of the master-cylinder pressure sensor 340, and detect the operating stroke $S_P$ on the basis of the output signal of the stroke sensor 332. Step S11 is followed by step S12 in which the fluid pressure $P_4$ in the rear pressure chamber 108 of the master cylinder 82 is controlled on the basis of the detected operating stroke $S_P$. Then, the control flow goes to step S13 in which the fluid pressure $P_3$ in the rear pressure sensor 170 of the assisting cylinder 114 is controlled on the basis of the master cylinder pressure $P_1$.

After the fluid pressure $P_1$ in the pressurizing chamber 104 has reached the simulation-initiating threshold value $P_0$, the fluid is permitted to flow between the pressurizing chamber 104 and the stroke simulator 126, depending upon a movement of the pressurizing piston 96. The piston 96 receives a reaction force corresponding to the fluid pressure $P_1$. On the other hand, the vehicle operator operates the brake pedal 80 while feeling the reaction force acting on the brake pedal 80, and the operating stroke $S_P$. Therefore, the fluid pressure $P_1$ in the pressurizing chamber 104 may be considered to correspond to the operating force $F_P$ desired by the operator. In this sense, it is reasonable to use the fluid pressure $P_1$ in place of the operating force $F_P$.

Before the fast filling of the front wheel brake cylinders 74 is completed after the initiation of an operation of the brake pedal 80, the brake cylinders 74 is supplied with the pressurized fluid from both of the two front pressurizing chambers 106, 104 of the master cylinder 82, as described above. At this time, however, the pressurized fluid is delivered from the pressurizing chamber 104 to the brake cylinders 74 through the check valve 124 since the master-cylinder cut-off valve 120 is in the closed state.

The delivery capacity of the pump 190 used in the present embodiment is not so large, so that the fluid pressure in the pressurizing chambers 104, 106 is higher than that in the second assisting chamber 168, at least before the fast filling of the brake cylinders 74 is completed. Described in detail, the rate of increase of the fluid pressure in the second assisting chamber 168 by an operation of the pump 190 is lower than the rate of increase of the fluid pressure in the pressurizing chamber 104 by an operation of the brake pedal 80, so that the fluid pressure in the pressurizing chambers 104, 106 is increased before the fluid pressure in the second assisting chamber 168 is increased. Therefore, the response of the fluid pressure in the brake cylinders 74 can be improved although the delivery capacity of the pump device 192 is relatively small, so that the braking system has a high degree of operating reliability with the pump device 192 of relatively small capacity which is available at a relatively low cost. In the braking system according to the present embodiment, the front wheel brake cylinders 74 can be fast-filled at a relatively high rate during an initial period of operation of the brake pedal 80, even while the master-cylinder cut-off valve 120 is in the closed state.

The fluid pressure $P_3$ in the assisting-cylinder rear pressure chamber 170 is controlled on the basis of the master-cylinder pressure $P_1$ and according to a predetermined relationship of FIG. 7 between the fluid pressures $P_3$ and $P_1$, which relationship is represented by the data table stored in the ROM 304. The pressurized fluid in the pressurizing chamber 104 is delivered through the check valve 124 while the master cylinder pressure $P_1$ is higher than the fluid pressure $P_3$, as described above. After the fluid pressure $P_3$ has exceeded the fluid pressure $P_1$, the pressurized fluid is no longer delivered from the pressurizing chamber 104. In the present embodiment, the desired value of the fluid pressure $P_3$ is determined to be higher than the fluid pressure $P_1$.

Since the fluid pressure $P_3$ in the assisting-cylinder rear pressure chamber 170 and the fluid pressure $P_2$ in the rear wheel brake cylinders 78 are equal to each other, as described above, the braking characteristics can be controlled by controlling the relationship between the fluid pressures $P_3$ and $P_1$.

Figure 9:
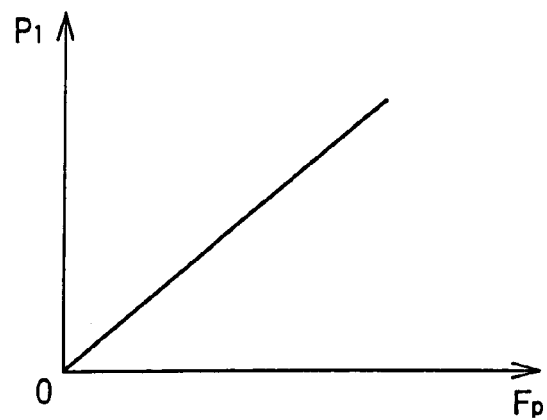
FIG. 9 is a graph indicating a change in master-cylinder pressure Pi with a change in operating force of a brake pedal in the hydraulic braking apparatus.
Figure 10:
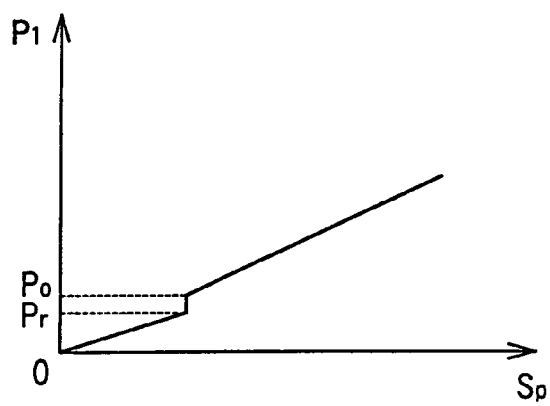
FIG. 10 is a graph indicating a change in the master-cylinder pressure $P_1$ with a change in the operating stroke of the brake pedal in the hydraulic braking apparatus.

The fluid pressure $P_4$ in the master-cylinder rear pressure chamber 108 is controlled so as to establish a predetermined relationship of FIG. 8 between the operating stroke $S_P$ and the reaction force (operating force) of the brake pedal 80, which relationship is represented by the data table stored in the ROM 304. The reaction force is generated on the basis of an operation of the stroke simulator 126, as described above, and corresponds to the fluid pressure $P_1$ in the rear pressure chamber 104, as indicated in the graph of FIG. 9. The simulation-initiating threshold value $P_0$ of the stroke simulator 126 is set to be higher than the relief pressure $P_r$ of the pressure relief valve 140. Wile the fluid pressure $P_4$ in the rear pressure chamber 108 is not controlled, therefore, the fluid pressure $P_1$ in the pressurizing chamber 104 changes with a change in the operating stroke $S_P$, as indicated in the graph of FIG. 10. Namely, the pressurized fluid in the pressurizing chambers 104, 106 is delivered to the front wheel brake cylinders 74 before the fluid pressure $P_1$ in the pressurizing chamber 104 has been raised to the relief pressure Pr (until the fast filling of the brake cylinders 74 is completed), and the pressurized fluid in the pressurizing chamber 104 is delivered to the stroke simulator 126 after the fluid pressure $P_1$ has reached the simulation-initiating threshold value $P_0$.

Figure 11:
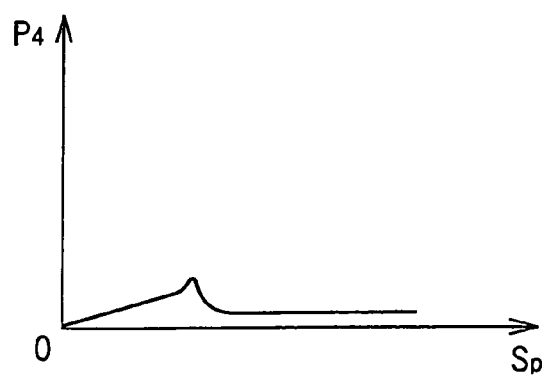
FIG. 11 is a graph indicating a relationship between the operating stroke and a master-cylinder rear pressure $P_4$ in the hydraulic braking apparatus.

If the fluid pressure $P_4$ in the master-cylinder rear pressure chamber 108 is controlled on the basis of the operating stroke $S_P$ as indicated in the graph of FIG. 11, the relationship between the operating stroke $S_P$ and the operating force $F_P$ can be controlled as indicated in the graph of FIG. 8, to control the operating feel of the brake pedal 80.

As described above, the braking system according to the present embodiment of this invention is arranged such that the simulation-initiating threshold value P9 is higher than the relief pressure Pr of the stroke simulator 126, so that the front wheel brake cylinders 74 is supplied with the pressurized fluid delivered from both of the two pressurizing chambers 104, 106 of the master cylinder 82, until the fast filling of the brake cylinders 74 is completed. Thus, the fast filling can be completed in a relatively short time. Since the pressurized fluid is not absorbed in or consumed by the stroke simulator 126 before the fast filling is completed, the brake cylinders 74 can be fast-filled at a relatively high rate of flow of the pressurized fluid.

After the fluid pressure in the second assisting chamber 168 has exceeded the fluid pressure in the pressurizing chamber 104 as a result of an operation of the pump 190, the master cylinder 82 is disconnected from the front wheel brake cylinders 74, to prevent an influence of a variation of the fluid pressure in the brake cylinders 74 on the fluid pressure on the pressurizing chamber 104. In addition, the fluid pressure in the brake cylinders 74 can be controlled independently of the operation of the brake pedal 80, in other words, without utilizing the fluid pressure generated by the master cylinder 82. Thus, the master cylinder 82 is disconnected from the assisting cylinder 114, by a shut-off device which is constituted by the master-cylinder cut-off valve 120 and check valve 124, and an arrangement wherein the fluid pressure in the second assisting chamber 168 is made higher than that in the pressurizing chamber 104 by the operation of the pump 190.

It is further noted that the master cylinder 82 is not of a tandem type having two pressurizing pistons which are arranged in series with each other and are mutually independently movable relative to each other, but is of a type using the single stepped piston 96 (which may be considered to have two pressurizing pistons that are movable as a unit). This arrangement of the master cylinder 82 prevents a so-called "pedal sink", namely, an increase of the operating stroke SP of the brake pedal 80 when the fluid pressure in the pressurizing chamber 106 has been lowered down to the atmospheric level. Thus, the present braking system does not suffer from deterioration of the operating feel of the brake pedal 80 when the fluid pressure in the pressurizing chamber 106 has been lowered to the atmospheric level.

When the brake pedal 80 is released, the solenoid coils of the linear valves 200-206 are de-energized, and the master-cylinder cut-off valve 120 is opened, as described above. In this respect, the master-cylinder cut-off valve 120 may be opened before the brake pedal 80 has been returned to the non-operated position, if it is estimated that the pressurized fluid whose pressure is almost equal to the pressure at the end of the fast filling and does not provide a braking effect is left in the front wheel brake cylinders 64. In this case, the pressurized fluid can be efficiently returned from the brake cylinders 74 to the reservoir 125. The pressure of the fluid in the brake cylinder 74 can be estimated on the basis of the output signal of the rear wheel brake pressure sensor 338.

Where the servo system including the power-operated hydraulic pressure source device 84 is defective, the master-cylinder cut-off valve 120 is returned to the open state. In this case, the fluid pressurized in the pressurizing chamber 104 by an operation of the brake pedal 80 is supplied to the brake cylinders 74 to brake the front wheels 24. An influence of the defect of the servo system on the brake-cylinder activating system can be reduced, providing the braking system with a high fail-safe capability, since the servo system and the brake-cylinder activating system are isolated from each other by the assisting cylinder 114. The servo system is a dynamic system including the power-operated hydraulic pressure source device 84, while the brake-cylinder activating system is a static system including the wheel brake cylinders 74, 78. The manual-pressure-generating system including the master cylinder 82 may be considered to constitute a part of the static system.

In the assisting cylinder 114, the rear pressure chamber 170 connected to the servo system is isolated by the sealing members 161b from the second assisting chamber 168 (communicating with the brake cylinders 74). In the master cylinder 82, the rear pressure chamber 108 connected to the servo system is similarly isolated by the sealing members 93a from the pressurizing chamber 106.

In the assisting cylinder 114, the front brake-application sub-system including the second assisting chamber 168 and the front wheel brake cylinders 74 and the rear brake-application sub-system including the first assisting chamber 166 and the rear wheel brake cylinders 78 are isolated from each other by the sealing members 161a and the first assisting piston 162, to reduce an influence of a defect in one of the two brake-application sub-systems on the other sub-system. Where the fluid pressure in one of the first and second assisting chambers 166, 168 is lowered to the atmospheric pressure, this fluid pressure reduction has a reduced influence on the fluid pressure in the other assisting chamber.

While the master-cylinder cut-off valve 120 is in the closed state, the power-operated hydraulic pressure source device 84 may be controlled so as to establish predetermined $S_P$-$F_P$ and $F_P$-G relationships represented by respective curves, rather than the straight lines which represent the linear relationships between the operating stroke $S_P$ and the reaction force $F_P$ and between the operating force $F_P$ and the vehicle deceleration value G, which linear relationships are established in the illustrated embodiment. Further, the gradients of the straight lines representing the linear relationships (servo ratio) may be changed as needed.

Where the operating stroke $S_P$ tends to be increased while the master-cylinder cut-off valve 120 is in the closed state, an increase of the operating stroke $S_P$ can be avoided by controlling the simulator control valve 127 so as to reduce the amount of the fluid to be absorbed in the stroke simulator 126.

Figure 12:
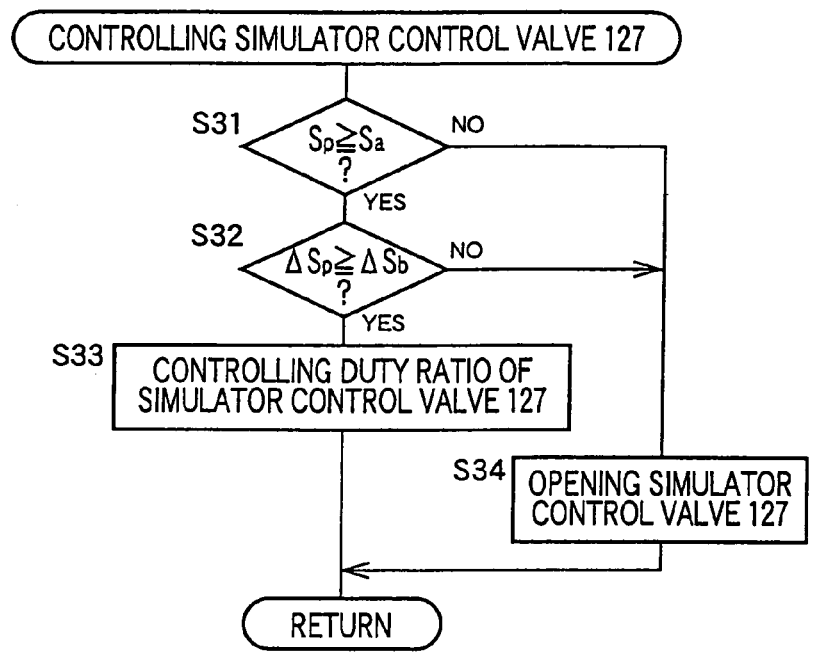
FIG. 12 is a flow chart illustrating a routine for controlling a simulator control valve according to a control program stored in the ROM of the brake control unit.

For instance, the simulator control valve 127 is controlled according to a control routine illustrated in the flow chart of FIG. 12. This control routine is initiated with step S31 to determine whether the operating stroke $S_P$ is equal to or larger than a predetermined threshold SA. If an affirmative decision (YES) is obtained in step SA31, the control flow goes to step S32 to determine whether a rate of increase $\Delta S_P$ of the operating stroke $S_P$ is equal to or higher than a predetermined threshold $\Delta$Sb. If the rate of increase $\Delta S_P$ is equal to or higher than the threshold $\Delta$Sb, it indicates that the operating stroke $S_P$ tends to be increased. In this case, the control flow goes to step S33 to control the duty ratio of the simulator control valve 127, so as to reduce the amount of flow of the fluid into the stroke simulator 126, for thereby reducing the rate of increase $\Delta S_P$ of the operating stroke $S_P$. If the operating stroke $S_P$ is smaller than the threshold Sa, or if the rate of increase $\Delta S_P$ is lower than the threshold $\Delta$Sb, the control flow goes to step S34 to place the simulator control valve 127 in the open state, rather than to control its duty ratio.

The simulator control valve control routine illustrated in the flow chart of FIG. 12 may be repeatedly executed with a predetermined cycle time while the master-cylinder cut-off valve 120 is in the closed state. In this case, step S9 of the braking force control routine of FIG. 4 is eliminated. The control routine of FIG. 12 may be executed before or after the operation of controlling the fluid pressure $P_4$ in step S13 of FIG. 4.

The simulator control valve 127 may be a linear valve the amount of opening of which is controlled by controlling the amount of electric current to be applied to its solenoid coil. In this case, the amount of flow of the fluid between the stroke simulator 126 and the pressurizing chamber 104 can be controlled by controlling the amount of opening of the linear valve. The duty ratio of the simulator control valve 127 may be controlled even while the operating stroke $S_P$ is smaller than the threshold Sa (even if a negative decision is obtained in step S31), if the rate of increase $\Delta S_P$ of the operating stroke $S_P$ is higher than a predetermined threshold. In this case, an increase in the operating stroke $S_P$ in an initial period of an operation of the brake pedal 80 can be reduced.

Further, it is possible to inhibit the control of the fluid pressure $P_4$ in the master-cylinder rear pressure chamber 108 and effect only the control of the fluid pressure $P_3$ in the assisting-cylinder rear pressure chamber 170, when the rate of increase $\Delta S_P$ of the operating stroke $S_P$ is higher than a predetermined threshold $\Delta Sc$ while the master-cylinder cut-off valve 120 is in the closed state. The pressurized fluid delivered from the pump 190 is not supplied to the master-cylinder rear pressure chamber 108, when the pressure-increasing linear valve 200 of the first linear valve device 194 is closed by maximizing the amount of electric current I to be applied to the solenoid coil of the linear valve 200. In this case, the entire amount of the pressurized fluid delivered from the pump 190 is supplied to the assisting-cylinder rear pressure chamber 170, so that the fluid pressure $P_3$ in the rear pressure chamber 170 can be rapidly increased to the desired value, permitting a rapid increase of the fluid pressure in the wheel brake cylinders 74, 78 to the desired value.

Figure 13:
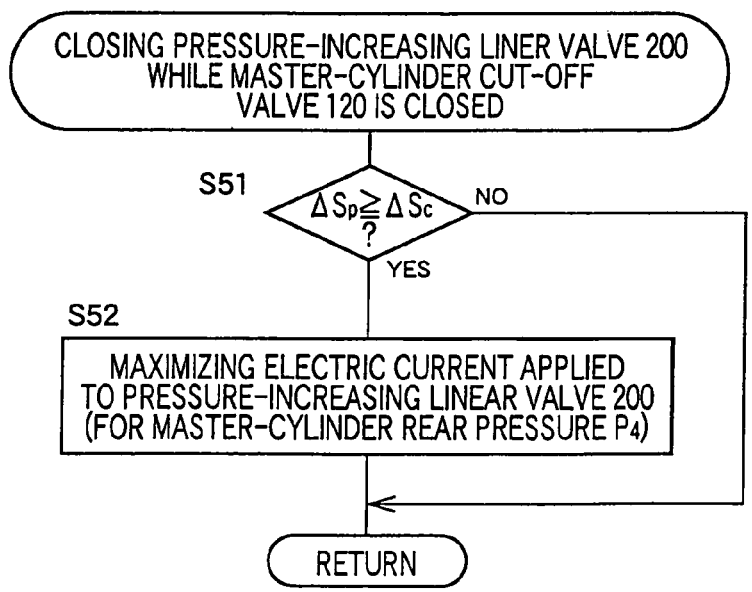
FIG. 13 is a flow chart illustrating a routine executed according to a control program stored in the ROM of the brake control unit, for closing pressure-increasing linear valve while master-cylinder cut-off valve is closed.

The above-indicated control of the pressure-increasing linear valve 200 is effected according to a control routine illustrated in the flow chart of FIG. 13. This control routine is initiated with step S51 to determine whether the rate of increase $\Delta S_P$ of the operating stroke $S_P$ is equal to or higher than the predetermined threshold $\Delta Sc$. If an affirmative decision (YES) is obtained in step S51, the control flow goes to step S52 to maximize the amount of electric current I to be applied to the pressure-increasing linear valve 200. In this case, the second linear valve device 196 is controlled on the basis of the operating force $F_P$, in the same manner as described above, so as to establish a predetermined relationship between the assisting-cylinder rear pressure $P_3$ and the operating force $F_P$, which relationship is similar to the relationship between the master-cylinder pressure $P_1$ and the assisting-cylinder rear pressure $P_3$ indicated in the graph of FIG. 7 by way of example. That is, the master-cylinder pressure $P_1$ of FIG. 7 must be replaced by the operating force $F_P$ in the present modified control arrangement of FIG. 13. The threshold value $\Delta Sc$ is determined such that the rate of increase $\Delta S_P$ equal to or higher than this threshold value $\Delta Sc$ indicates the operator's desire to rapidly increase the wheel brake cylinder pressure.

The pressure-increasing linear valve 200 may be closed to inhibit the supply of the pressurized fluid from the pump 190 to the master-cylinder rear pressure chamber 108 even while the master-cylinder cut-off valve 120 is in the open state, where the rate of increase of the operating stroke $S_P$ is excessively high. Further, the amount of opening of the pressure-increasing linear valve 200 may be reduced, rather than the linear valve 200 is fully closed. With the reduced amount of opening of the linear valve 200, the pressurized fluid delivered from the pump 190 is fed at a comparatively high rate to the assisting-cylinder rear pressure chamber 170 through the pressure-increasing linear valve 204, so that the delay in the increase in the fluid pressure $P_3$ in the assisting-cylinder rear pressure chamber 170 can be reduced. In either of the two cases indicated above, the ratio of the rate of flow of the pressurized fluid from the pump 190 to the master-cylinder rear pressure chamber 108 and the rate of flow of the fluid from the pump 190 to the assisting-cylinder rear pressure chamber 170 can be suitably controlled by controlling at least one of the two pressure-increasing linear valves 200 and 204.

The above-indicated ratio may be changed continuously or in steps, such that the rate of the fluid flow into the assisting-cylinder rear pressure chamber 170 increases with an increase in the rate of increase of the operating stroke $S_P$, that is, with an increase in the operator's required need for rapid brake application to the vehicle, for example. Alternatively, the rate of the fluid flow into the master-cylinder rear pressure chamber 108 may be made higher than the rate of the fluid flow into the assisting-cylinder rear pressure chamber 170.

The above-indicated control arrangement of increasing the rate of the fluid flow into one of the master-cylinder and assisting-cylinder rear pressure chambers 108, 170 depending upon the rate of change of the operating stroke SP makes it possible to reduce the control delay of the wheel brake cylinder pressure, without increasing the delivery capacity of the pump 190, that is, without using a pump having a relatively large delivery capacity.

There will next be described an initial diagnosis of the braking system. The brake control ECU 310 is arranged to execute an initial diagnostic routine illustrated in the flow chart of FIG. 14 according to a control program stored in the ROM 304. This initial diagnostic routine is executed when the brake pedal 80 is operated for the first time after the ignition switch 344 is turned ON while the parking brake switch 346 is placed in the ON state.

According to the initial diagnosis according to the routine of FIG. 14, the master-cylinder cut-off valves 120 is suitably switched between the closed and open states, while the pressure-holding valves 252, 272 are held in the closed state. The initial diagnosis can be effected with high accuracy and efficiency when it is effected while the pressure-holding valves 252, 272 are held in the closed state. Since the initial diagnosis is effected while the parking brake is in the ON state, the wheel brake cylinders 74, 78 need not be activated during the initial diagnosis. Further, the fluid pressures $P_4$ in the master-cylinder rear pressure chamber 108 and the fluid pressure $P_3$ in the assisting-cylinder rear pressure chamber 170 are controlled on the basis of the operating force $F_P$ rather than the operating stroke $S_P$. The initial diagnosis can be effected with higher accuracy when the operating stroke $F_P$ is used to control the fluid pressures $P_3$ and $P_4$, than when the operating stroke $S_P$ is used.

Referring to a table in FIG. 15, there will be described rules for determining defects of various elements of the braking system.

The servo system is diagnosed to be defective if the wheel brake cylinder pressure $P_2$ and the assisting-cylinder rear pressure $P_3$ are extremely low (almost equal to the atmospheric pressure) while the master-cylinder cut-off valve 120 is in the closed state, and if the master-cylinder pressure $P_1$ is almost equal to the atmospheric pressure after the master-cylinder cut-off valve 120 is switched to the open state. In this state, the fluid having a sufficiently high pressure is supplied to none of the master-cylinder and assisting-cylinder rear pressure chambers 108, 170.

One of the operating force sensor 330 and the master-cylinder pressure sensor 40 is diagnosed to be defective if the relationship between the operating force $F_P$ and the master-cylinder pressure $P_1$ is abnormal while the master-cylinder cut-off valve 120 is in the closed state. The operating force sensor 330 is diagnosed to be defective if the master-cylinder pressure $P_1$ is equal to the wheel brake cylinder pressure $P_2$ and the assisting-cylinder rear pressure $P_3$ while the master-cylinder cut-off valve 120 is in the open state. The master-cylinder pressure sensor 340 is diagnosed to be defective if the wheel brake cylinder pressure $P_2$ is different from the assisting-cylinder rear pressure $P_3$ while the shut-off valve 120 is in the open state.

Thus, the servo system, the operating force sensor 330 and the master-cylinder pressure sensor 340 are diagnosed on the basis of the operating conditions of the braking system while the master-cylinder cut-off valve 120 is in the closed state and in the open state. Since the operating conditions in both of the closed and open states of the shut-off valves 120 are used for the diagnosis, the accuracy of the diagnosis is improved.

One of the rear wheel brake pressure sensor 338 and the assisting-cylinder rear pressure sensor 336 is diagnosed to be defective if the wheel brake cylinder pressure P2 and the assisting-cylinder rear pressure P3 are different from each other while the master-cylinder cut-off valve 120 is in the closed state. If the operating state of the second linear valve device 196 and the assisting-cylinder rear pressure P3 have a normal relationship in the above case, the rear wheel brake pressure sensor 338 is diagnosed to be defective. The assisting-cylinder pressure sensor 336 is diagnosed to be defective if the operating state of the second linear valve device 196 and the pressure P3 have an abnormal relationship in the above case. Thus, the brake-activating system including the rear wheel brake pressure sensor 338 and the manual-pressure-generating system including the assisting-cylinder rear pressure sensor 336 can be diagnosed independently of each other while the master-cylinder cut-off valve 120 is in the closed state.

The rear wheel brake cylinder pressure sensor 338 is diagnosed to be defective if the master-cylinder pressure $P_1$ and the brake cylinder pressure $P_2$ are different from each other when the relationship between the operating state of the second linear valve device 196 and the assisting-cylinder rear pressure P3 is abnormal while the master-cylinder cut-off valve 120 is in the open state. The assisting-cylinder rear pressure sensor 336 is diagnosed to be defective if the master-cylinder pressure $P_1$ and the assisting-cylinder rear pressure $P_3$ are different from each other when the above-indicated relationship is abnormal while the shut-off valve 120 is in the open state.

The rear wheel brake pressure sensor 338 is diagnosed to be defective if the master-cylinder pressure $P_1$ and the wheel brake cylinder pressure $P_2$ are different from each other when the relationship between the operating state of the second linear valve device 194 and the maser-cylinder rear pressure $P_4$ is normal while the master-cylinder cut-off valve 120 is in the open state. The assisting-cylinder rear pressure sensor 336 is diagnosed to be defective if the master-cylinder pressure $P_1$ and the assisting-cylinder rear pressure $P_3$ are different from each other when the above-indicated relationship is normal in the open state of the shut-off valve 120.

The operating states of the first and second linear valve devices 194, 196 may be represented by the amounts of electric current applied to the pressure-increasing linear valves 200, 204 or the pressure-reducing linear valves 202, 206.

The rear wheel brake pressure sensor 338 and the assisting-cylinder rear pressure sensor 336 may be diagnosed to be defective if at least one additional condition other than the two conditions indicated above is satisfied while the master-cylinder cut-off valve 120 is in the closed or open state.

The front brake-application sub-system is diagnosed to be defective if the master-cylinder pressure $P_1$ is extremely low, even when the relationships between the operating force $F_P$ and the rear wheel brake pressure $P_2$ and assisting-cylinder rear pressure $P_3$ is normal, while the master-cylinder cut-off valve 120 is in the open state. The front brake-application sub-system can be diagnosed on the basis of the master cylinder pressure $P_1$ since the master cylinder pressure $P_1$ is normally equal to the fluid pressure in the front brake-application sub-system (in the front wheel brake cylinders 74) while the shut-off valve 120 is in the open state.

The rear brake-application sub-system is diagnosed to be defective if the rear wheel brake pressure $P_2$ is extremely low, even when the relationship between the operating force $F_P$ and the assisting-cylinder rear pressure $P_3$ is normal, while the shut-off valve 120 is in the open state. The rear brake-application sub-system can be diagnosed to be defective if a predetermined condition is satisfied while the master-cylinder cut-off valve 120 is in the closed state.

The initial diagnostic routine illustrated in the flow chart of FIG. 14 will be briefly described. This routine is initiated with step S101 to place the master-cylinder cut-off valve 120 and the pressure-holding valves 252, 272 in the closed state. Step S101 is followed by step S102 to determine whether the rear wheel brake pressure $P_2$ and the assisting-cylinder rear pressure $P_3$ are both almost equal to the atmospheric pressure. If a negative decision (NO) is obtained in step S102, the control flow goes to step S103 to determine whether the relationship between the operating force $F_P$ and the master-cylinder pressure $P_1$ is normal. If the rear wheel brake pressure $P_2$ and the assisting-cylinder rear P3 are both almost equal to the atmospheric pressure, an affirmative decision (YES) is obtained in step S102, and the control flow goes to step S104 to set a PROVISIONAL SERVO DEFECT flag to "1". In this case, there is a high possibility that the servo system is defective, as described above. If the $F_P$-$P_1$ relationship is not normal, a negative decision (NO) is obtained in step S103, and the control flow goes to step S105 to set a PROVISIONAL SENSOR DEFECT" flag to "1", since there is a high possibility that one of the master-cylinder pressure sensor 340 and the operating force sensor 330 is defective.

If the $F_P$-$P_1$ relationship is normal, an affirmative decision (YES) is obtained in step S103, and the control flow goes to step S106 to determine whether the rear wheel brake pressure $P_2$ and the assisting-cylinder rear pressure $P_3$ are different from each other. If an affirmative decision ((YES) is obtained in step S106, the control flow goes to step S107 to determine whether the relationship between the operating state of the second linear valve device 196 and the assisting-cylinder rear pressure $P_3$ is normal. In the present embodiment, the operating state of the second linear valve 196 is represented by the amount of electric current I applied to the solenoid coil of the pressure-increasing or pressure-reducing linear valve 204, 206. If the I-$P_3$ relationship is normal, the control flow goes to step S108 to determine that the rear wheel brake pressure sensor 338 is defective. If the I-$P_3$ relationship is abnormal, the control flow goes to step S109 to determine that the assisting-cylinder rear pressure sensor 336 is defective. In steps S108 and S109, an appropriate DEFECT flag is set to "1" to indicate that the sensor 338 or 336 is defective.

Steps S104, S105, S108 and S109 are followed by step S110 to place the master-cylinder cut-off valve 120 in the open state. Then, the control flow goes to step S111 to determine whether the PROVISIONAL SENSOR DEFECT flag is set at "1". If a negative decision (NO) is obtained in step S111, the control flow goes to step S112 to determine whether the PROVISIONAL SERVO DEFECT flag is set at "1". If an affirmative decision (YES) is obtained in step S111, the control flow goes to step S113 to determine whether the master-cylinder pressure $P_1$, the rear wheel brake pressure $P_2$ and the assisting-cylinder rear pressure $P_3$ are normal and are almost equal to each other. If an affirmative decision (YES) is obtained in step S113, the control flow goes to step S114 to determine that the operating force sensor 330 is defective. If a negative decision (NO) is obtained in step S113, that is, if the pressures $P_1$, $P_2$ and $P_3$ are different from each other, the control flow goes to step S115 to determine whether the pressure $P_1$ is different from the pressures $P_2$ and $P_3$. If an affirmative decision (YES) is obtained in step S115, the control flow goes to step S116 to determine that the master-cylinder pressure sensor 340 is defective.

If the PROVISIONAL SERVO DEFECT flag is set at "1", an affirmative decision (YES) is obtained in step S112, and the control flow goes to step S117 to determine whether the master-cylinder pressure $P_1$, the rear wheel brake pressure $P_2$ and the assisting-cylinder rear pressure $P_3$ are all almost equal to the atmospheric pressure. If an affirmative decision (YES) is obtained in step S117, the control flow goes to step S118 to determine that the servo system is defective.

If neither the PROVISIONAL DEFECT SENSOR flag nor the PROVISIONAL SERVO DEFECT flag is set at "1", the control flow goes to step S119 to determine whether the conditions for diagnosing the front brake-application sub-system to be defective are satisfied, and to step S120 to determine whether the conditions for diagnosing the rear brake-application sub-system to be defective are satisfied. If the master cylinder pressure $P_1$ is almost equal to the atmospheric pressure, and if the relationship between the operating force $F_P$ and the pressures $P_2$ and $P_3$ is normal, an affirmative decision (YES) is obtained in step S119, and the control flow goes to step S121 to determine that the front brake-application sub-system is defective. If the rear wheel brake pressure $P_2$ is almost equal to the atmospheric pressure and if the relationship between the operating force $F_P$ and the pressure $P_3$ is normal, an affirmative decision (YES) is obtained in step S120, and the control flow goes to step S122 to determine that the rear pressure-application sub-system is defective. One cycle of execution of he initial diagnostic routine is terminated with step S123 in which the PROVISIONAL SENSOR DEFECT flag and the PROVISIONAL SERVO DEFECT flag are reset to "0", and the pressure-holding valves 252, 272 are returned to the open state.

As described above, the master-cylinder cut-off valve 120 is switched between its open and closed states during the initial diagnosis, so that a relatively large number of elements of the braking system can be diagnosed in a relatively short time. That is, the initial diagnosis can be effected in a short time.

The specific manners of diagnosing the various elements are not limited to those described above by reference to the flow chart of FIG. 14. For instance, the relationship between the operating force $F_P$ and the master-cylinder pressure $P_1$ and assisting-cylinder rear pressure $P_3$ may be replaced by a relationship between the operating stroke $S_P$ and the pressures $P_1$, $P_3$. This latter relationship may be used in the case where the master-cylinder rear pressure $P_4$ and the assisting-cylinder rear pressure $P_3$ are controlled on the basis of the operating stroke $S_P$ rather than the operating force $F_P$.

Further, the pressure-holding valves 252, 272 need not be placed in the closed state during the initial diagnosis. That is, the wheel brake cylinders 74, 78 may be operated even while the parking brake is applied to the vehicle.

The diagnosis need not be effected as an initial checking when the brake pedal 80 is operated for the first time after the ignition switch 344 is turned ON, but may be effected during normal operations of the brake pedal 80, in substantially the same manner as described above with respect to the initial diagnosis. In this respect, it is noted that the master-cylinder cut-off valve 120 is placed in the open and closed states as needed during the normal operations of the brake pedal 80. In the diagnosis during the normal operations of the brake pedal 80, however, the pressure-holding valves 252, 272 are held in the open state. By storing in the RAM 306 the diagnostic results in the closed and open states of the master-cylinder cut-off valve 120, the operating force sensor 330, master-cylinder pressure sensor 340 and servo system can also be diagnosed on the basis of the stored diagnostic results. The diagnosis may be effected on the basis of the relationships between the master-cylinder and assisting-cylinder rear pressures $P_4$, $P_3$ and the operating states of the first and second linear valve devices 194, 196, and the relationships between the pressures $P_4$, $P_3$ and the operating force $F_P$ or stroke $S_P$.

It will be understood from the foregoing description of the present first embodiment of this invention that a portion of the brake control ECU 300 assigned to implement steps S8-S13 constitutes a first control portion operable while the master-cylinder cut-off valve 120 is placed in the closed state, to control the master-cylinder rear pressure $P_4$ on the basis of the operating stroke $S_P$, and control the assisting-cylinder rear pressure $P_3$ on the basis of the operating force $F_P$, and that a portion of the brake control ECU 300 assigned to implement steps S3-S7 constitutes a second control portion operable, while the master-cylinder cut-off valve 120 is placed in the open state, to control the master-cylinder rear pressure $P_4$ on the basis of the operating force $F_P$, and control the assisting-cylinder rear pressure $P_3$ on the basis of the operating stroke $S_P$. It will further be understood that a portion of the brake control ECU 300 assigned to implement steps S1 constitutes a control-portion selecting portion operable to select one of the first and second control portions on the basis of an operating state of the vehicle. It will also be understood that at least one of the first and second portions and the control-portion selecting portion cooperate to constitute a braking characteristic control device.

It will further be understood that a portion of the brake control ECU 300 assigned to implement steps S101-S105 is considered to constitute a first diagnosing device, since these steps are formulated to diagnose the manual-pressure-generating system on the basis of the operating force $F_P$ and the master-cylinder pressure $P_1$. It will also be understood that a portion of the ECU 300 assigned to implement steps S107-S109 constitutes a second diagnosing device, while a portion of the ECU 300 assigned to implement steps S101-S105 and S111-S118 constitutes a third diagnosing device. It will also be understood that the assisting cylinder 114 cooperates with the pump device 192, the second linear valve device 196 and the brake control ECU 300 to constitute an assisting pressure control device operable to control the pressure of the pressurized fluid delivered from the master cylinder 82 to a higher value to be applied to the brake cylinders 74, 78.

Where the hydraulically operated braking system according to the present embodiment is used on a hybrid vehicle, the braking system may be arranged to cooperate with an electric vehicle drive device to perform a cooperative braking control in which a required braking force is provided by a hydraulic braking force generated by the present braking system and a regenerative braking force generated by the electric vehicle drive device. The cooperative braking control will be described with respect to a third embodiment of this invention.

In the present embodiment, the master-cylinder cut-off valve 120 and the simulator control valve 127 are separate from each other. However, a single valve may function as these two valves 120, 127. For instance, the functions of these two valves 120, 127 may be performed by a single direction control valve having a first state in which the pressurizing chamber 104 is communicated with the stroke simulator 126 and is isolated from the brake cylinders 74, and a second state in which the pressurizing chamber 104 is isolated from the stroke simulator 126 and is communicated with the brake cylinders 74.

The master-cylinder cut-off valve 120 may be a linear valve. The second linear valve device 196 is not essential. In the absence of the second linear valve device 196, the assisting cylinder 114 may be controlled by controlling an electric motor to suitably advance and retract the second assisting piston 174, for instance. The power-operated hydraulic pressure source device 84 may includes an accumulator, and the simulator control valve 127 may be disposed between the stroke simulator 126 and the reservoir 125.

It is not essential to control both of the fluid pressure $P_4$ in the master-cylinder rear pressure chamber 108 and the fluid pressure $P_3$ in the assisting-cylinder rear pressure chamber 170. That is, only one of the fluid pressures $P_3$, $P_4$ may be controlled.

Figure 16:
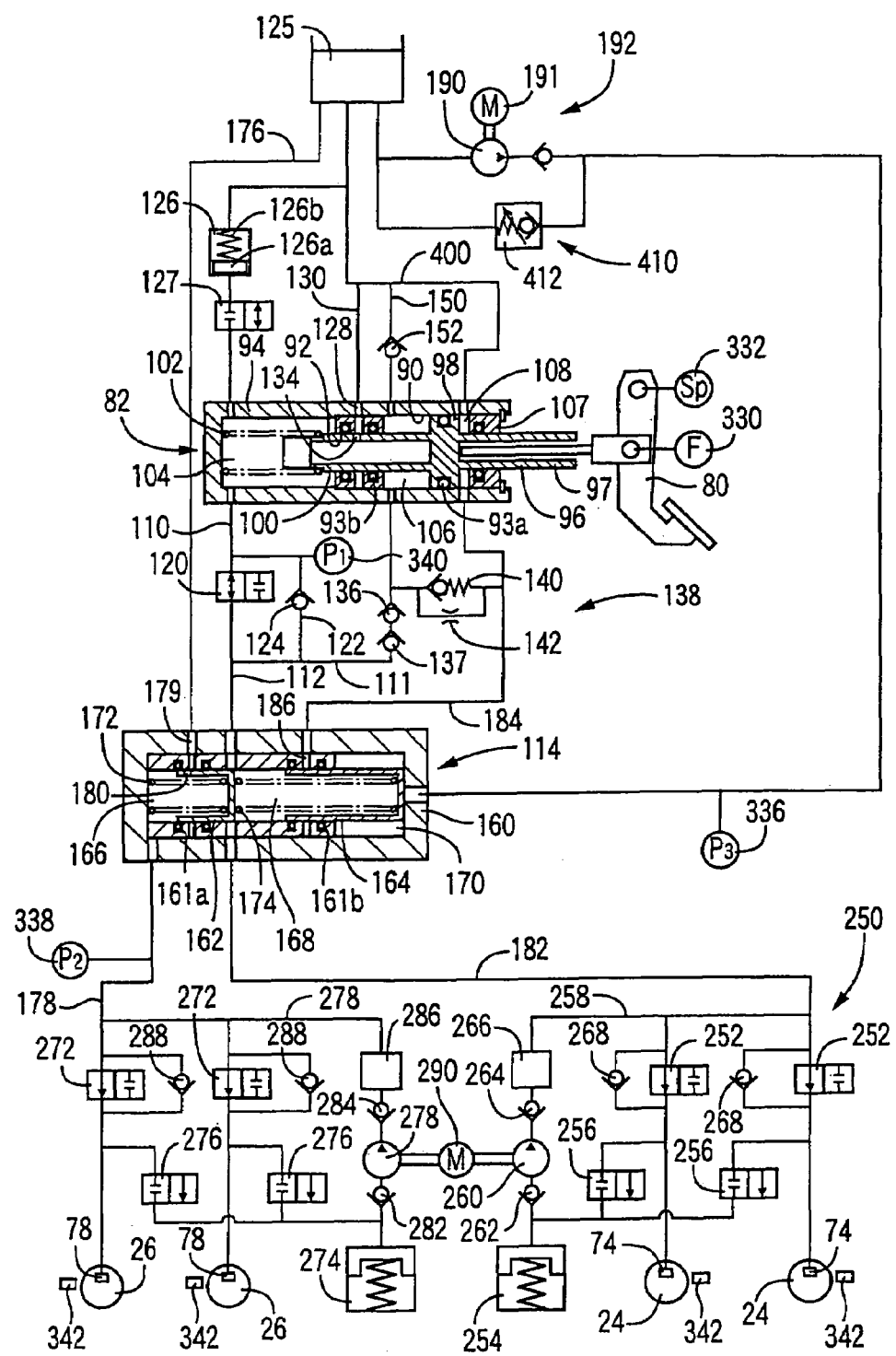
FIG. 16 is a hydraulic circuit diagram showing a hydraulic braking apparatus included in a braking system according to another embodiment of this invention.

Referring to FIG. 16, there is shown a hydraulically operated braking system according to a second embodiment of this invention, which includes a hydraulic braking apparatus adapted to control only the fluid pressure P3 in the rear pressure chamber 108 of the assisting cylinder 114. In the other aspects, the second embodiment is identical with the first embodiment. The same reference signs as used in the first embodiment will be used in the second embodiment to identify the same elements, which will not be described.

In the braking system of FIG. 16 wherein the fluid pressure $P_4$ in the rear pressure chamber 108 of the master cylinder 82 is not controlled, the rear pressure chamber 108 is connected to the reservoir 125 through a reservoir passage 400, so that the fluid flows between the rear pressure chamber 108 and the reservoir 125 as the volume of the chamber 108 changes as a result of an operation of the brake pedal 80. In the present braking system in which the fluid pressure in the rear pressure chamber 108 is kept at the atmospheric level, an assisting force based on the fluid pressure in the chamber 108 will not act on the pressurizing piston 96, and the fluid pressure in the rear pressure chamber 170 of the assisting cylinder 114 is controlled to control the braking characteristics, namely, the relationship between the operating state of the brake pedal 80 and the fluid pressure in the wheel brake cylinders 74, 78.

The port 186 between the pair of cup seals 161*b* in the housing 160 of the assisting cylinder 114 is connected to the reservoir 125 through the rear pressure chamber 108 of the master cylinder 82, so that the fluid pressure in the second assisting chamber 168 is prevented from being lowered below the atmospheric pressure.

The braking system of FIG. 16 includes a second linear valve device 410 for controlling the fluid pressure in the rear pressure chamber 170. This second linear valve device 410 does not include a pressure-increasing linear valve but includes a pressure-reducing linear valve 412. In this embodiment, the pressurized fluid delivered from the pump 192 need not be distributed to the master-cylinder rear pressure chamber 108 and the assisting-cylinder rear pressure chamber 170. The linear valve 412 is a normally open valve which is held in the open state while its solenoid coil is in the de-energized state, and is identical in construction as the pressure-reducing linear valve 202 in the first embodiment. Since the pressure-reducing linear valve 412 is disposed between the assisting-cylinder rear pressure chamber 170 and the reservoir 125, the fluid pressure difference across the linear valve 412 corresponds to the fluid pressure in the rear pressure chamber 170, which is raised with an increase in the amount of electric current applied to the solenoid coil of the linear valve 412.

Figure 17:
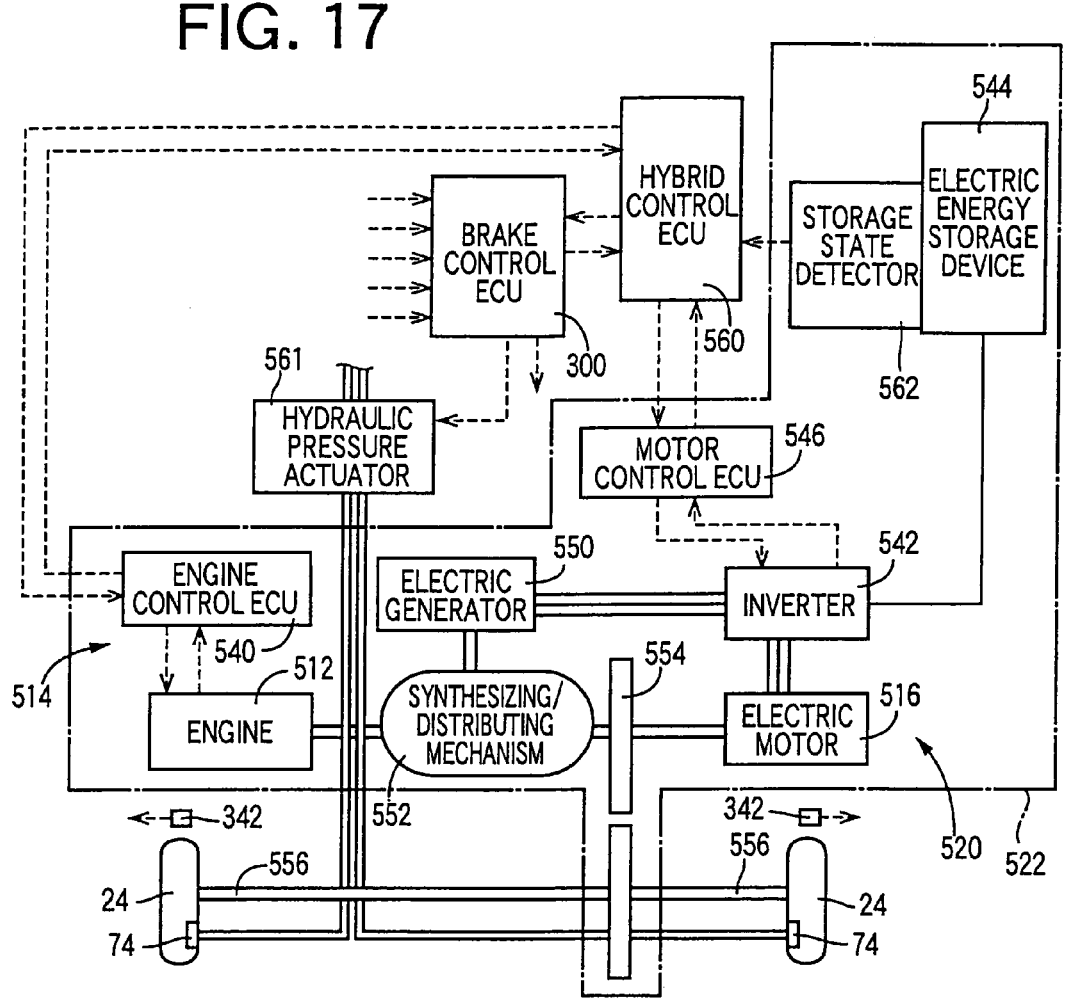
FIG. 17 is a block diagram showing an automotive vehicle equipped with a braking system according to a further embodiment of this invention.
Figure 18:
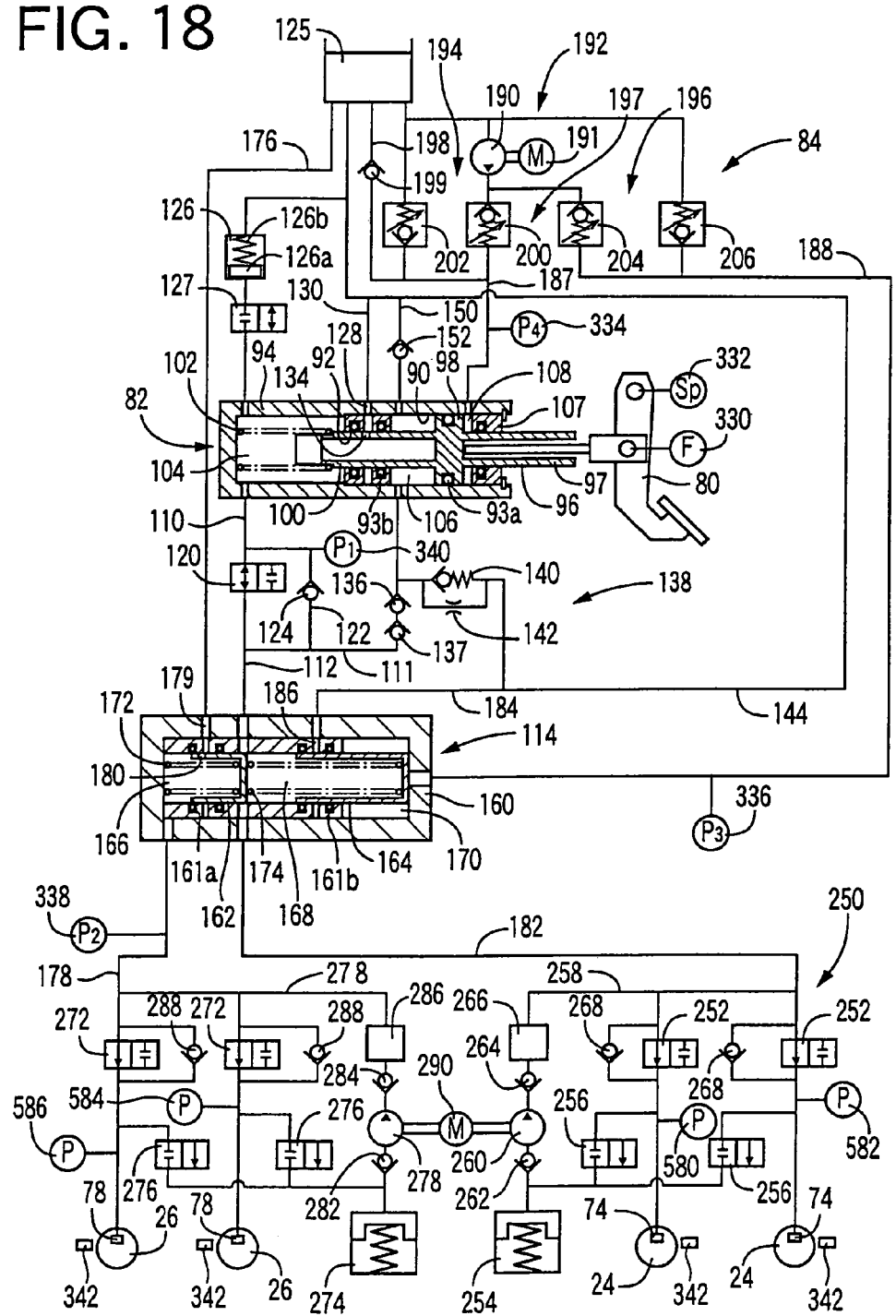
FIG. 18 is a circuit diagram showing a hydraulic braking apparatus included in the braking system of FIG. 17.

Referring next to FIGS. 17 and 18, there is shown a hydraulically operated braking system constructed according to a third embodiment of this invention, which includes a regenerative braking device.

The braking system according to the third embodiment is adapted to be used on a hybrid vehicle provided with a vehicle drive system including an engine drive device 514 having an engine 512, and an electric drive device 520 having an electric motor 516, as shown in FIG. 17. The engine 512 and the electric motor 516 are operatively connected to the front left and right wheels 24, which serve as the drive wheels. Thus, the hybrid vehicle is a front-drive vehicle.

The engine drive device 514 includes an electronic engine control unit (engine control ECU) 540 as well as the engine 512, while the electric drive device 520 includes a power converting device in the form of an inverter 542, an electric energy storage device 544, an electronic motor control unit (motor control ECU) 546, an electric generator 550 and a synthesizing/distributing mechanism 552, as well as the electric motor 516. The electric generator 550 is operated by the engine 512, to generate an electric energy. The synthesizing/distributing mechanism 552 includes a planetary gar device (not shown) having a sun gear connected to the electric generator 550, a ring gear connected to an output member 554 and the electric motor 516, and a carrier connected to the crankshaft of the engine 512. With the engine 512, electric motor 516 and electric generator 550 being suitably controlled, the vehicle drive system is placed in a MOTOR DRIVE mode in which only a drive torque generated by the electric motor 516 is transmitted to the output member 554, and an ENGINE-AND-MOTOR DRIVE mode in which both a drive torque generated by the engine 512 and the drive torque of the electric motor 516 are transmitted to the output member 554. The drive torque received by the output member 554 is transmitted to drive axles 556 of the front wheels 24 through a speed reducing device and a differential gear device.

In the present hybrid vehicle, an amount of electric current to be applied to the electric motor 516 is controlled by the inverter 542 according to a control signal received from the motor ECU 546, which is supplied with a control command from an electronic hybrid control unit (hybrid control ECU) 560. The electric motor 516 has a DRIVE state in which the electric motor 516 is operated with an electric energy supplied from the electric energy storage device 544, as a vehicle drive motor to drive the vehicle, and a REGENERATIVE BRAKING state in which the electric motor 516 is operated with a kinetic energy of the running vehicle, as an electric generator to convert the kinetic energy into an electric energy for charging the storage device 544, while generating a regenerative braking force for braking the front wheels 24. The regenerative braking force or torque generated by the electric motor 516 is controlled by controlling the amount of electric current applied thereto, which determines a resistance to rotation of the electric motor 516.

As described above, the regenerative braking force for braking the front wheels 24 is generated by the electric motor 516. In this sense, the electric drive device 520 may be considered to function as a regenerative braking apparatus. The regenerative braking force is controlled by controlling the amount of electric current applied to the electric motor 516. The power-operated hydraulic pressure source device 84, the assisting cylinder 114 and the electromagnetic braking-pressure control valve device 250 cooperate to constitute a hydraulic pressure control actuator 561 for controlling the fluid pressure in the wheel brake cylinders 24.

The hydraulically operated braking system according to the third embodiment is constructed as shown in detail FIG. 18. This braking system of FIG. 18 is identical with that of FIG. 1, except that four wheel brake pressure sensors 580, 582, 584, 586 are provided in the braking system of FIG. 18, for detecting the fluid pressures in the respective wheel brake cylinders 74, 78. The present braking system is capable of performing a braking force control and an initial diagnosis in the same manner as described above with respect to the first and second embodiments, while the cooperative braking control is not performed.

Each of the motor control ECU 546, hybrid control ECU 560 and engine control ECU 540 indicated above is constituted principally by a computer incorporating a CPU, a ROM, a RAM and an input/output. To the input/output portion of the hybrid control ECU 560, there is connected a storage state detector 562 for detecting the state of the electric energy storage device 544. The storage state detector 562 includes a charging state detecting portion for detecting the state of charging of the storage device 544, and a diagnosing portion for detecting the voltage and temperature of the storage device 544. The charging state detecting portion detects the amount of electric energy presently stored in the storage device 544. The amount of electric energy that can be stored in the storage device 544 decreases with an increase in the electric energy amount stored therein.

The hybrid control ECU 560, the motor control ECU 546, the engine control ECU 540 and the brake control ECU 300 are connected to each other for data communications with each other.

The brake control ECU 300 is adapted to calculate a required total braking torque Bref desired by the vehicle operator, on the basis of the operating force of the brake pedal 80 as detected by the operating force sensor 330. A signal indicative of the thus calculated required total braking torque Bref is fed from the brake control ECU 300 to the hybrid control ECU 560. The hybrid ECU 560 is adapted to determine a maximum regenerative braking torque that can be generated by the electric motor 516. The maximum regenerative braking torque is determined on the basis of the operating speed and other operating condition of the electric motor 516 as represented by information received from the motor control ECU 546, and the operating state of the electric energy storage device 544 as represented by information received from the storage state detector 562. The hybrid ECU 560 determines a smaller one of the required total braking torque Bref and the maximum regenerative braking torque, as a desired regenerative braking torque value. A signal indicative of the determined desired regenerative braking torque value is fed from the hybrid ECU 560 to the motor control ECU 546.

The motor control ECU 542 is adapted to control the inverter 542 so that the electric motor 516 operating as the electric generator generates the desired regenerative braking torque value represented by the signal received from the hybrid ECU 560. The amount of electric motor to be applied to the electric motor 516 is controlled by controlling the inverter 542, so that the resistance to the rotary motion of the electric motor 516 is controlled.

The operating speed and other actual operating condition of the electric motor 516 are detected by a motor state detector (not shown). The motor control ECU 546 obtains an actual regenerative braking torque value Bm on the basis of the detected operating condition of the electric motor 516. A signal indicative of the obtained actual regenerative braking torque value Bm is fed from the motor control ECU 546 to the hybrid control ECU 560, which applies a signal indicative of the actual regenerative braking torque value Bm to the brake control ECU 300.

The brake control ECU 300 obtains a desired hydraulic braking torque Bpref on the basis of a difference (Bref−Bm) between the required total braking torque Bref and the actual regenerative braking torque value Bm, and controls the fluid pressure in each of the wheel brake cylinders 74, 78 to a desired level Pref corresponding to the desired hydraulic braking torque Bpref. Thus, the regenerative braking torque Bm and the hydraulic braking torque Bpref are generated in the cooperative braking control such that a sum of the torque values Bm and Bpref is equal to the required total braking torque Bref.

In principle, the cooperative braking control is effected while the master-cylinder cut-off valve 120 is in the closed state, such that the fluid pressure $P_3$ in the assisting-cylinder rear pressure chamber 170 is controlled by the electromagnetic braking-pressure control valve device 250, so that the fluid pressure in each wheel brake cylinder 74, 78 approaches the desired pressure level Pref, while the operating feel of the brake pedal 80 is controlled by controlling the fluid pressure $P_4$ in the master-cylinder rear pressure chamber 108.

If an operation of the brake pedal 80 at a considerably high speed is detected during the cooperative braking control, the master-cylinder cut-off valve 120 is brought to its open state, for increasing the total braking torque at a higher rate than the regenerative braking torque, so that the actual total braking torque can be rapidly increased to the value desired by the vehicle operator.

Figure 19:
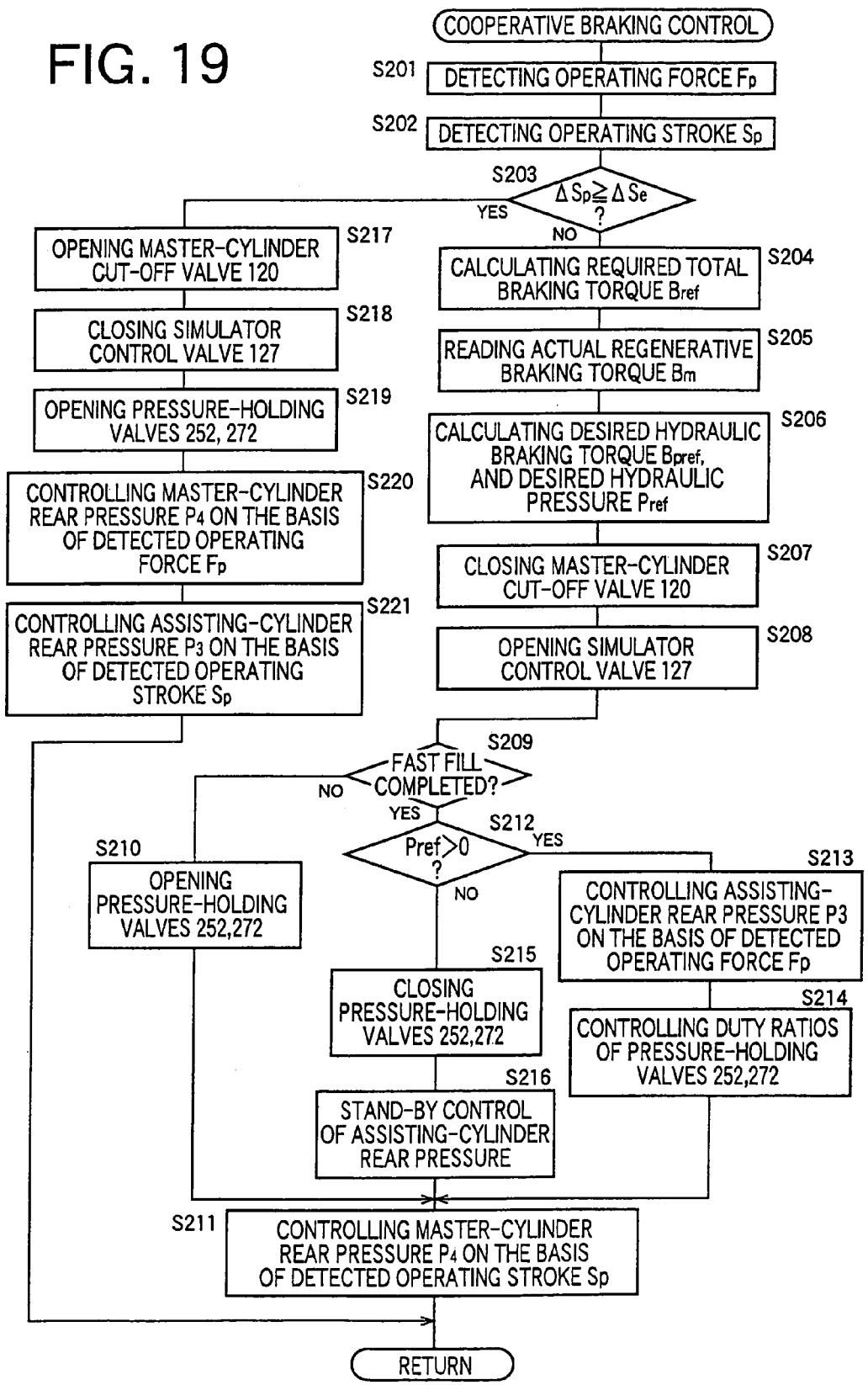
FIG. 19 is a flow chart illustrating a cooperative braking control routine executed according to a control program stored in a ROM of an electronic brake control unit of the hydraulic braking apparatus of FIG. 18.

The cooperative braking control is effected according to a control routine illustrated in the flow chart of FIG. 19.

The cooperative braking control routine is initiated with steps S201 and S202 to detect the operating force $F_P$ and stroke $S_P$ of the brake pedal 80. Step S202 is followed by step S203 to determine whether a rate of increase $\Delta S_P$ is equal to or higher than a predetermined threshold $\Delta Se$. If a negative decision (NO) is obtained in step S203, the control flow goes to step S204 and the following steps.

Steps S204-S206 are implemented to calculate the required total braking torque Bref on the basis of the basis of the detected operating force $F_P$, read the actual regenerative braking torque value Bm, calculate the desired hydraulic braking torque value Bpref on the basis of the difference (Bref−Bm) of the actual regenerative braking torque value Bm from the required total braking torque Bref, and calculate the desired hydraulic pressure value Pref corresponding to the desired hydraulic braking torque value Bpref.

Then, the control flow goes to step S207 to close the master-cylinder cut-off valve 120, and S208 to open the simulator control valve 127. Step S208 is followed by step S209 to determine whether the fast filling of the front wheel brake cylinders 74 is completed. This determination is effected by determining whether the fluid pressures in the front wheel brake cylinders 74 as detected by the respective wheel brake pressure sensors 580, 582 are raised to a predetermined level corresponding to the termination of the fast filling. If a negative decision (NO) is obtained in step S209, the control flow goes to step S210 to hold the pressure-holding valves 252, 272 in the open state, and to step S211 in which the fluid pressure $P_4$ in the master-cylinder rear pressure chamber 108 is controlled on the basis of the detected operating stroke $S_P$ in the same manner as in step S12 in the first embodiment. In this case, the fluid pressure $P_3$ in the master-cylinder rear pressure chamber 170 is not controlled, since it is not usually necessary to rapidly increase the fluid pressure in the front wheel brake cylinders 74 immediately after the moment of initiation of the operation of the brake pedal 80.

When the fast filling of the front wheel brake cylinders 74 is completed, an affirmative decision (YES) is obtained in step S209, and the control flow goes to step S212 to determine whether the desired hydraulic pressure Pref is higher than the atmospheric level. If an affirmative decision (YES) is obtained in step S212, the control flow goes to step S213 to control the fluid pressure $P_3$ in the assisting-cylinder rear pressure chamber 170 on the basis of the detected operating force $F_P$. Then, step S214 is implemented to control the duty ratios of the pressure-holding valves 252, 272 so that the fluid pressure in each of the wheel brake cylinders 74, 78 as detected by the corresponding wheel brake pressure sensor 580, 582, 584, 586 approaches the desired hydraulic pressure value Pref. In principle, the fluid pressure $P_3$ in the assisting-cylinder rear pressure chamber 170 is controlled to the desired hydraulic pressure value Pref. To inhibit a flow of the pressurized fluid from the pressurizing chamber 104, the fluid pressure in the second assisting chamber 168 of the assisting cylinder 114 must be higher than that in the pressurizing chamber 104. In view of this, the present embodiment is arranged to control the fluid pressure $P_3$ in the rear pressure chamber 170 on the basis of the operating force $F_P$, and control the duty ratio of each pressure-holding valve 252, 272, so that the fluid pressure in each wheel brake cylinder 74, 78 approaches the desired hydraulic pressure value Pref.

Figure 20:
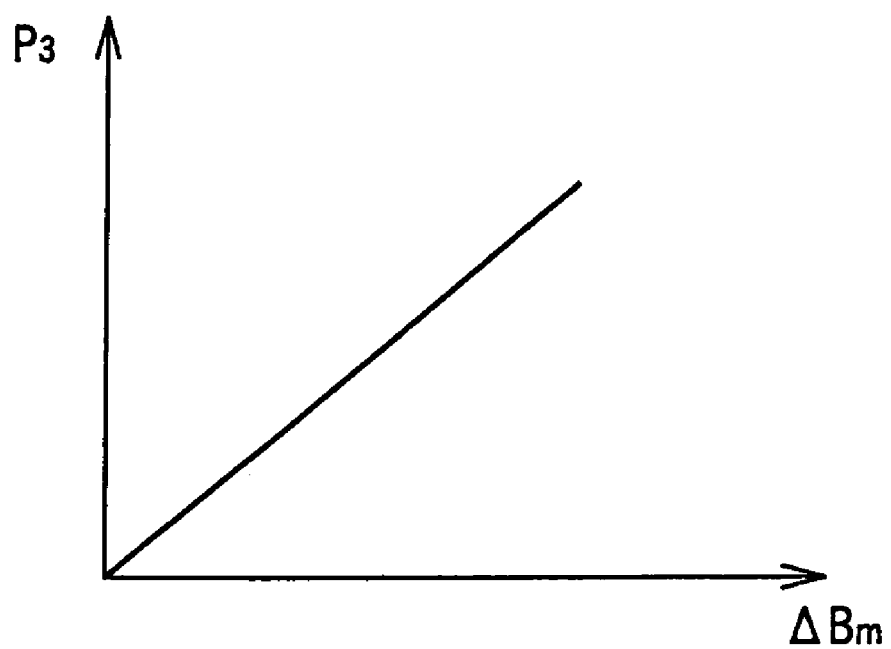
FIG. 20 is a graph indicating a data table stored in the ROM of the brake control unit and used to control a rear pressure in an assisting cylinder.

If the desired hydraulic pressure value Pref is equal to or lower than the atmospheric level, that is, the required total braking torque Bref can be provided by the actual regenerative braking torque Bm, a negative decision (NO) is obtained in step S212, and the control flow goes to step S215 to close the pressure-holding valves 252, 272, and to step S216 to effect a stand-by control in which the fluid pressure $P_3$ in the assisting-cylinder rear pressure chamber 170 is controlled according to a rate of change of the actual regenerative braking torque Bm, so that the fluid pressure in each wheel brake cylinder 74, 78 can be rapidly controlled to provide the desired hydraulic braking torque Bpref, when the generation of this hydraulic braking torque Bpref is subsequently required. The fluid pressure $P_3$ is increased with an increase in the desired hydraulic braking torque Bpref. In the present embodiment, the fluid pressure P3 is controlled to be increased with an increase in the absolute value of the rate of increase ΔBm of the actual regenerative braking torque value Bm, as indicated in the graph of FIG. 20. When the rate of increase ΔBm of the actual regenerative braking torque Bm is relatively high, it means that the rate of increase of the required total braking torque Bref is accordingly high, and that there is a relatively high possibility that the required total braking torque Bref will soon exceed the maximum regenerative braking torque. It is also noted that the desired hydraulic braking torque Bpref is increased with an increase in the rate of reduction of the actual regenerative braking torque Bm. Immediately before the vehicle has been stopped, the operating speed of the electric motor 516 is extremely low, and the regenerative braking torque is zeroed, so that only the hydraulic braking torque is applied to the vehicle. At this time, the hydraulic braking torque is equal to the required total braking torque Bref. It will be understood that there is a high possibility that the regenerative braking torque is zeroed when the rate of reduction of the regenerative braking torque is relatively high.

It is not essential to effect the stand-by control of the fluid pressure P3 in the assisting-cylinder rear chamber 170 during both of an increase and a decrease of the actual regenerative braking torque Bm. That is, the stand-by control may be effected during only one of the increase and decrease of the actual regenerative braking torque Bm.

Although the control routine of FIG. 19 is formulated such that the fluid pressure $P_3$ in the assisting-cylinder rear pressure chamber 170 is controlled on the basis of the rate of change of the actual regenerative braking toque Bm while the desired hydraulic pressure level Pref is lower than the atmospheric pressure, the fluid pressure $P_3$ may be controlled on the basis of a change in the required total braking torque Bref. For instance, the desired hydraulic braking torque Bpref may be increased with the rate of increase in the required total braking torque Bref. Alternatively, the desired hydraulic braking torque Bpref may be determined on the basis of both the rate of increase of the required total braking torque Bref and the rate of increase of the actual regenerative braking torque Bm. Still alternatively, the desired hydraulic braking torque Bpref may be determined on the basis of the required total braking torque value Bref per se, or the actual regenerative braking torque value Bm per se, rather than its rate of increase. Since the maximum value of the regenerative braking torque that can be generated by the electric motor 516 is known, the desired hydraulic braking torque Bpref can be estimated on the basis of the required total braking torque Bref or the actual regenerative braking torque Bm. Since the minimum value of the regenerative braking torque is also known, the desired hydraulic braking torque Bpref can be estimated on the basis of the actual regenerative braking torque Bm. It is also noted that the desired hydraulic braking torque Bpref can be determined on the basis of the amount of electric energy left in the electric energy storage device 544. Usually, the regenerative braking torque is zeroed when the amount of electric energy stored in the storage device 544 becomes larger than a predetermined upper limit. Therefore, the desired hydraulic braking torque Bpref may be considered to be relatively large when the stored electric energy amount is relatively close to the upper limit.

In the cooperative braking control, it is not essential to complete the fast filling of the front wheel brake cylinders 74 before generation of a hydraulic braking torque. Namely, steps S209 and S110 are not essential.

When the operating speed of the brake pedal 80 is relatively high, that is, if an affirmative decision (YES) is obtained in step S203, the control flow goes to step S217 to place the master-cylinder cut-off valve 120 in the open state, and to step S218 to place the simulator control valve 127 in the closed state. Step S219 is then implemented to place the pressure-holding valves 252, 272 in the open state. Accordingly, the pressurized fluid is delivered from the master cylinder 82 directly to the front wheel brake cylinders 74, to rapidly increase the hydraulic braking torque. Step S219 is followed by steps S220 and S221 to control the fluid pressure $P_4$ in the master-cylinder rear pressure chamber 108 on the basis of the detected operating force $F_P$, and control the fluid pressure $P_3$ in the assisting-cylinder rear pressure chamber 170 on the basis of the detected operating stroke $F_P$.

Thus, a delay in the increase of the total braking force or torque when the brake pedal 80 is operated at a relatively high speed can be reduced by opening the master-cylinder cut-off valve 120 upon rapid operation of the brake pedal 80.

The delay in the increase of the total braking torque upon rapid operation of the brake pedal 80 can be further reduced by opening the master-cylinder cut-off valve 120 and controlling the first ands second linear valve devices 194, 196 such that the rate of flow of the pressurized fluid from the pump 190 to the master-cylinder rear pressure chamber 108 is increased with respect to the rate of flow of the pressurized fluid to the assisting-cylinder rear pressure chamber 170.

It will be understood from the foregoing description of the third embodiment that the pressure-holding valves 252, 272 function as a brake-cylinder cut-off valve disposed between the assisting cylinder 114 and the wheel brake cylinders 74, 78, for disconnecting the wheel brake cylinders 74, 78 from the assisting cylinder, and that a portion of the brake control ECU 300 assigned to implement steps S212 and S216 constitutes a stand-by control device operable to place the brake-cylinder cut-off valve in a closed state and control the fluid pressure in the assisting cylinder 114 on the basis of at least one of the required total braking torque Bref and the actual regenerative braking torque Bm.

Figure 21:
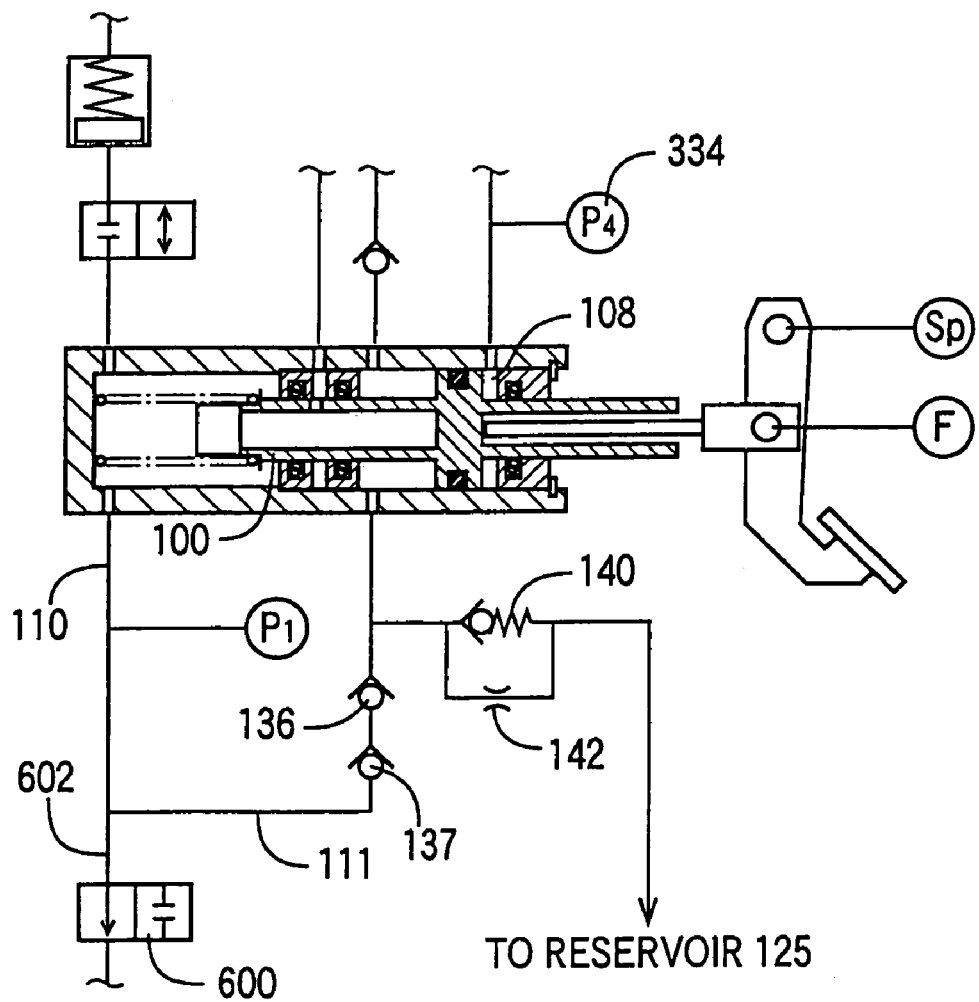
FIG. 21 is a fragmentary hydraulic circuit diagram of a hydraulic braking apparatus included in a braking system according to a still further embodiment of the invention.

Referring to FIG. 21, there is shown a part of a hydraulically operated braking system constructed according to a fourth embodiment of this invention, which is identical with the braking system of FIG. 1, 16 or 18, except in that a master-cylinder cut-off valve 602 is disposed in a common passage 602 connected to the two fluid passages 110, 111 which extend from the respective two front pressurizing chambers 104, 106 of the master cylinder. The fluid passage 110 is not provided with a check valve.

It will be understood that the check valves 136, 137 provided in the fluid passage 111 and the pressure relief valve 140 connected to the fluid passage 111 constitute a valve device having a first state in which the pressurized fluid is delivered from the two pressurizing chambers 104, 106 to the front wheel brake cylinders 74, and a second state in which the pressurized fluid is delivered from only the pressurizing chamber 104 to the brake cylinders 74.

Figure 22:
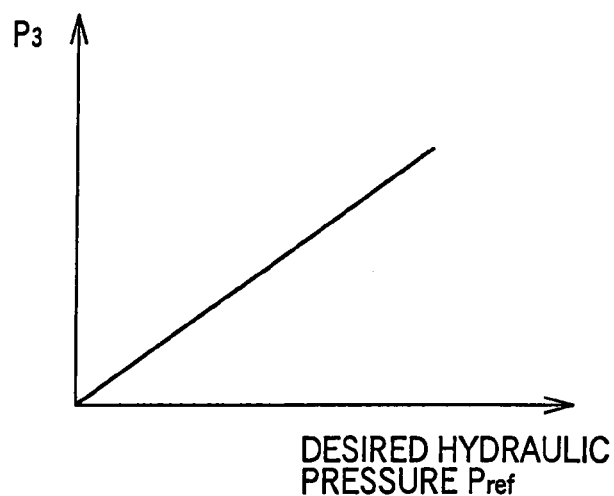
FIG. 22 is a graph indicating a data table stored in a ROM of an electronic brake control unit of the hydraulic braking apparatus of FIG. 21 and used to control a rear pressure in an assisting cylinder.

When the cooperative braking control is effected in the present fourth embodiment, the master-cylinder cut-off valve 600 is switched to the closed state, to disconnect the master cylinder 82 from the assisting cylinder 114, so that the fluid pressures in the rear pressure chambers 108, 170 can be controlled independently of each other. In the present embodiment wherein the fluid pressure in the second assisting chamber 168 need not be higher than that in the pressurizing chamber 104, the fluid pressure $P_3$ in the rear pressure chamber 170 is controlled to be equal to the desired hydraulic pressure Pref, as indicated I the graph of FIG. 22. The fluid pressure $P_3$ can be made equal to the desired hydraulic pressure Pref by holding the pressure-holding valves 252, 272 in the open state. In the present embodiment, the wheel brake pressure sensors 580-586 are not provided since they are not necessary, and the required amount of electric energy consumption by the braking system is accordingly reduced.

Figure 23:
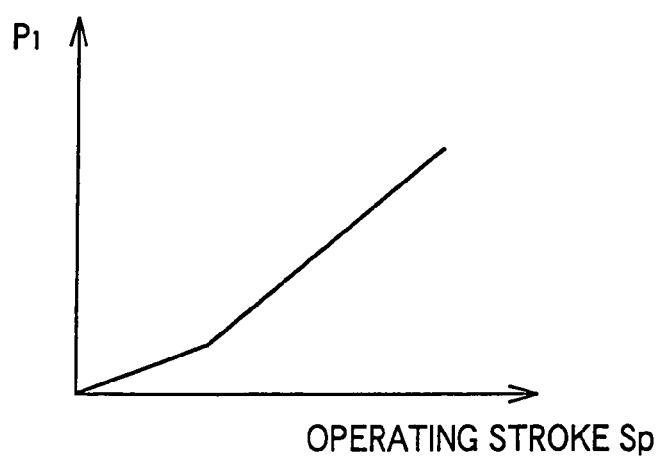
FIG. 23 is a graph indicating a data table stored in the ROM of the brake control unit and stored to control a rear pressure in a master cylinder.
Figure 24:
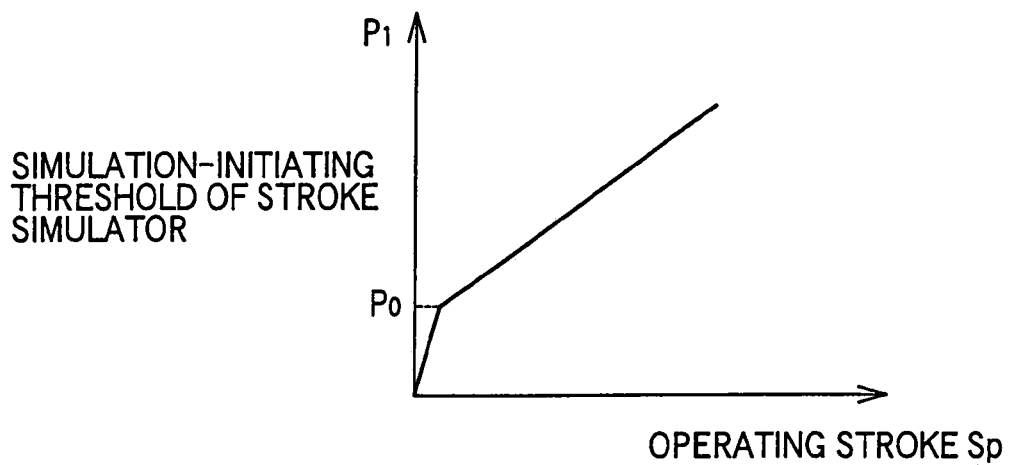
FIG. 24 is a graph indicating a change in master cylinder pressure with a change in operating stroke of a brake pedal in the hydraulic braking apparatus of FIG. 21.

On the other hand, the fluid pressure $P_4$ in the master-cylinder rear pressure chamber 108 is controlled on the basis of the operating stroke $S_P$, so as to establish a predetermined $P_1$-$S_P$ relationship as indicated in the graph of FIG. 23 (same relation as shown in FIG. 8), so that the operating feel of the brake pedal 80 is similar to that in the normal hydraulic braking control, namely, as if the cooperative braking control were not effected. In the present embodiment wherein the master-cylinder cut-off valve 600 is provided in the common passage 602, however, the pressurized fluid is not delivered from the front pressurizing chambers 104, 106 to the front wheel brake cylinders 74. Accordingly, the fluid pressure in the pressurizing chamber 104 changes as indicated in the graph of FIG. 24, if the fluid pressure in the rear pressure chamber 108 of the master cylinder 82 is not controlled.

Figure 25:
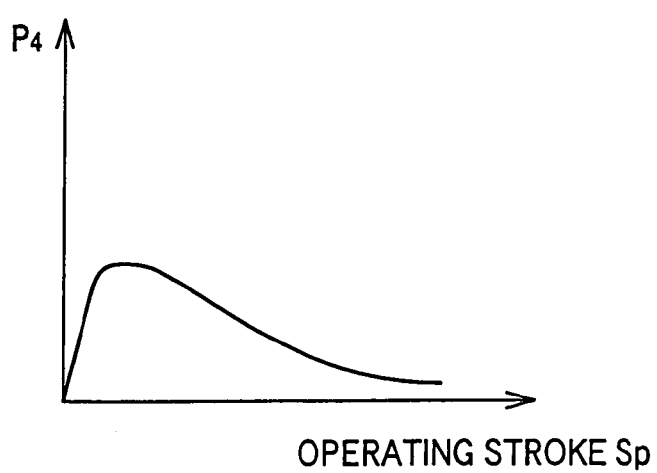
FIG. 25 is a graph indicating a relationship between the operating stroke and the rear pressure in the master cylinder.

Before the fluid pressure in the pressurizing chamber 104 has reached the simulation-initiating threshold value $P_0$, the fluid pressure in this chamber 104 is raised at a considerably high rate during a small amount of increase of the operating stroke $S_P$. After the fluid pressure has been raised to the threshold value $P_0$, the fluid pressurized by the pressurizing chamber 104 is absorbed by the stroke simulator 126, so that the fluid pressure in the pressurizing chamber 106 is raised at a relative low rate with a further increase in the operating stroke $S_P$. If the fluid pressure $P_4$ in the rear pressure chamber 108 is controlled as indicated in the graph of FIG. 25, the relationship between the operating stroke $S_P$ and the reaction force (corresponding to the pressure $P_1$ in the pressurizing chamber 104) can be made similar to that shown in FIG. 23.

The relationship of FIG. 23 can be established in the braking system of FIG. 1 where the delivery capacity of the pump 190 is so large that the maximum rate of increase of the wheel brake cylinder pressure (fluid pressure $P_3$ in the rear pressure chamber 170) is higher than the rate of increase of the operating force $F_P$ of the brake pedal 80 when the brake pedal 80 is rapidly operated. In this case, the fluid pressure in the second assisting chamber 168 can be rapidly increased above the fluid pressure in the pressurizing chamber 104, so that the fluid flow from the pressurizing chambers 104, 106 is prevented, causing the fluid pressure $P_1$ in the pressurizing chamber 104 to change as indicated in the graph of FIG. 24. By controlling the fluid pressure P3 in the rear pressure chamber 108 of the master cylinder 82 as indicated in the graph of FIG. 25, the operating feel of the brake pedal 80 can be controlled as represented by the relationship of FIG. 23 between the operating stroke $S_P$ and the fluid pressure $P_1$.

In the braking system of FIG. 21, the master-cylinder cut-off valve 600 may be kept in the open state until the fast filling of the front wheel brake cylinders 74 is completed.

The braking systems which have been described may use a master cylinder of tandem type. A braking system of FIG. 26 constructed according to a fifth embodiment of this invention is an example of a braking system using such a tandem type master cylinder. While the braking system of the fifth embodiment is schematically illustrated in FIG. 26, this braking system is identical with the braking systems of the preceding embodiments, except for the arrangement associated with the master cylinder, and is operated in substantially the same manner as described above.

Figure 26:
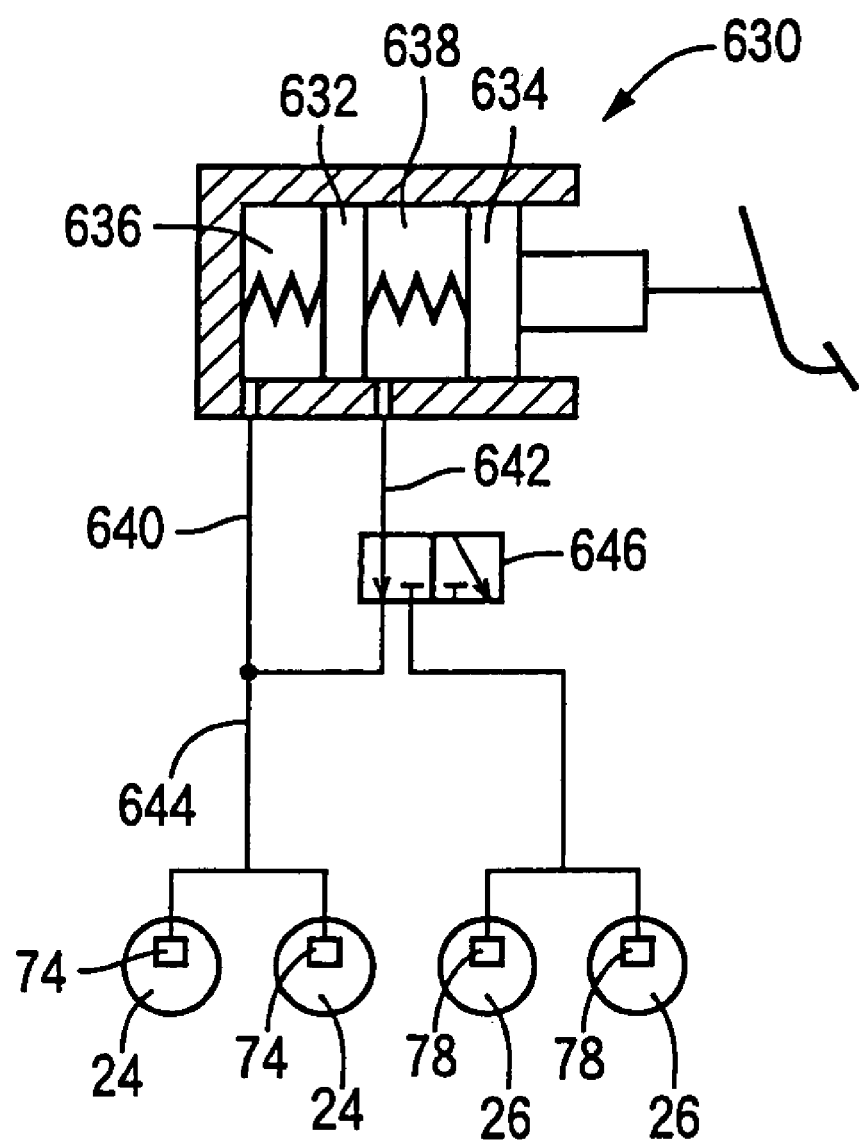
FIG. 26 is a fragmentary hydraulic circuit diagram of a hydraulic braking apparatus included in a braking system according to a yet further embodiment of the invention.

As shown in FIG. 26, the master cylinder 630 includes two pressurizing pistons 632, 634 which are fluid-tightly and slidably received in a housing, and arranged in series with each other such that the two pistons 632, 634 are movable relative to and independently of each other. The pressurizing piston 632 partially defines a first pressurizing chamber 636, while the pressurizing piston 634 partially defines a second pressurizing chamber 638. A fluid passage 640 is connected to the first or front pressurizing chamber 636, while a fluid passage 642 is connected to the second or rear pressurizing chamber 638. The fluid passages 640, 642 merge into a common passage 644 connected to the brake cylinders 74 for the front left and right wheels 24.

A directional control valve 646 is provided in the fluid passage 642 connected to the second pressurizing chamber 638, so that the second pressurizing chamber 638 is connected through the directional control valve 646 to the brake cylinders 78 for the rear left and right wheels 26.

The directional control valve 646 has a first state for connecting the second pressurizing chamber 638 to the front wheel brake cylinders 74 and disconnecting the chamber 638 from the rear wheel brake cylinders 78, and a second state for connecting the second pressurizing chamber 638 to the rear wheel brake cylinders 78 and disconnecting the chamber 638 from the front wheel brake cylinders 74. In the first state, the front wheel brake cylinders 74 are connected to both of the first and second pressurizing chambers 636, 638. In the second state, the front wheel brake cylinders 74 are connected to only the first pressurizing chamber 636. In the second state, therefore, the front wheel brake cylinders 74 are connected to the first pressurizing chamber 636 while the rear wheel brake cylinders 78 are connected to the second pressurizing chamber 638. In the present embodiment, the directional control valve 646 serves as a valve device having a first state in which the pressurized fluid is delivered from the two pressurizing chambers 636, 638 to the front wheel brake cylinders 74, and a second state in which the pressurized fluid is delivered from only the pressurizing chamber 636 to the brake cylinders 74.

Figure 27:
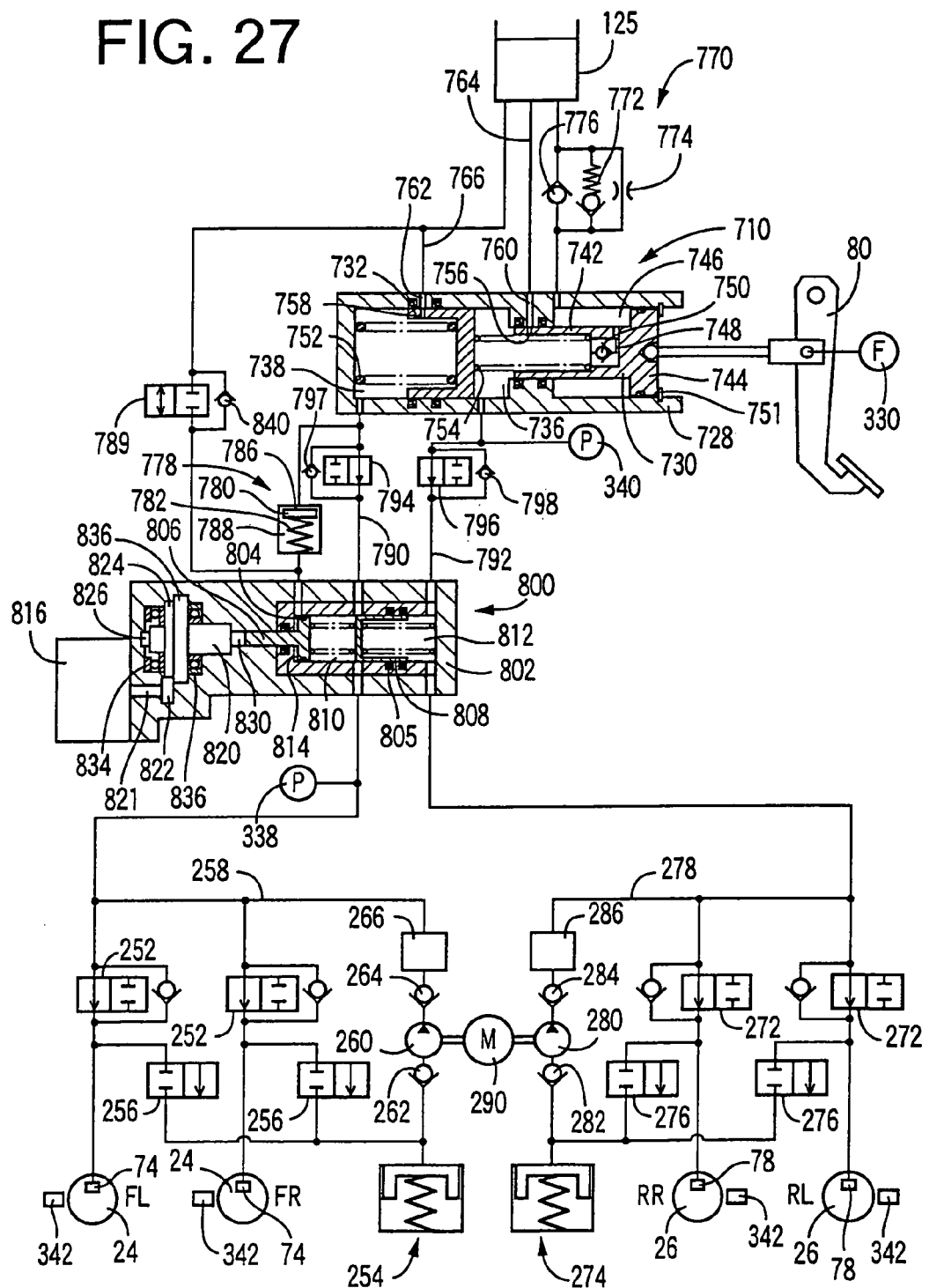
FIG. 27 is a fragmentary hydraulic circuit diagram of a hydraulic braking apparatus including in a braking system according to still another embodiment of the invention.

Referring next to FIG. 27, there will be described a hydraulically operated braking system constructed according to a sixth embodiment of this invention, which is different from the braking systems of the preceding embodiments, in the arrangements of the master cylinder and the assisting cylinder. The same reference signs as used in the preceding embodiments will be used in the present embodiment to identify the same elements, which will not be described.

The master cylinder indicated generally at 710 has a housing 728, and includes two pressurizing pistons 730, 732 which are fluid-tightly and slidably received in the housing 728. The pressurizing piston 730 is operatively connected to the brake pedal 80. The housing 728 cooperates with the two pressurizing pistons 730, 732 to define a pressurizing chamber 736 on the front side of the piston 730. The pressurizing chamber 736 is connected to the brake cylinders 78 for the rear wheels 26. The housing 72 cooperates with the pressurizing piston 732 to define a pressurizing chamber 738 on the front side of the piston 732. The pressurizing chamber 738 is connected to the brake cylinders 74 for the front wheels 24. The fluid masses in the two pressurizing chambers 736, 738 are pressurized to the same pressure level.

The pressurizing piston 742 is a stepped piston which includes a small-diameter portion 742 serving as a small-diameter piston and a large-diameter portion 744 serving as a large-diameter piston, which are movable as a unit. The front surface of the small-diameter portion 742 partially defines the pressurizing chamber 736, while the large-diameter portion 744 cooperates with the small-diameter portion 742 and the housing 728 to define an annular pressurizing chamber 746. Thus, the master cylinder 710 used in the present embodiment may be considered to include three pressurizing pistons 732, 742, 744, which partially define three pressurizing chambers 738, 736, 746. The master cylinder 710 does not have a rear pressure chamber whose pressure is controllable.

The small-diameter portion 742 has a communication passage 748 for fluid communication between the annular pressurizing chamber 746 and the pressurizing chamber 736. The communication passage 748 is provided with a check valve 750 which permits a flow of the fluid in a direction from the annular pressurizing chamber 746 toward the pressurizing chamber 736 and inhibits a flow of the fluid in the reverse direction.

In the presence of the check valve 750, the fluid flows from the annular pressurizing chamber 746 into the pressurizing chamber 736 when the fluid pressure in the chamber 746 is higher than that in the chamber 736, but the fluid flow from the chamber 736 into the chamber 746 is inhibited to prevent reduction of the fluid pressure in the chamber 736 even when the fluid pressure in the chamber 746 is lower than that in the chamber 736, In the present sixth embodiment, therefore, the annular pressurizing chamber 746 functions as a second pressurizing chamber, while the pressurizing chamber 736 functions as a first pressurizing chamber. The communication passage 748 for fluid communication between the first and second pressurizing chambers 746, 736 is provided within the master cylinder 710, so that the braking system can be made smaller and is available at a lower cost than where a communication passage is provided outside the master cylinder 710.

The housing 728 has a stop 751 at its rear end. The stop 751 defines the fully retracted position of the pressurizing piston 730. A return spring 752 is disposed between the pressurizing piston 732 and the housing 728, while a return spring 754 is disposed between the pressurizing piston 732 and the pressurizing piston 730 (small-diameter portion 742). These return springs 752, 754 define the fully retracted position of the pressurizing piston 732.

When the pressurizing pistons 730, 732 are placed at their fully retracted positions, the pressurizing chambers 736, 738 are held in communication with the reservoir 125 through communication passages 756, 758, ports 760, 762, and reservoir passages 764, 766, respectively.

The annular pressurizing chamber 746 is connected to the reservoir 125 through a flow restricting device 770, which includes a pressure relief valve 772 and an orifice 774 that are connected in parallel with each other. The pressure relief valve 772 permits the fluid to be discharged from the annular pressurizing chamber 746 into the reservoir 125 when the fluid pressure in the chamber 746 is higher than that in the reservoir 125 by more than a predetermined value (predetermined relief pressure). The relief pressure of the pressure relief valve 772 is determined to be higher than the pressure level at which the fast filling of the brake cylinders 74, 78 is completed. A check valve 776 is provided in a fluid passage which is connected in parallel to the flow restricting device 770. The check valve 776 permits a flow of the fluid in a direction from the reservoir 125 toward the annular pressurizing chamber 746 and inhibits a flow of the fluid in the reverse direction.

A stroke simulator 778 is provided between the pressurizing chamber 738 and the reservoir 125. The stroke simulator 778 includes a housing, and a simulator piston 780 which is fluid-tightly and slidably received in the housing so as to divide the interior of the housing into two variable-volume chambers 786, 788. The stroke simulator 778 further includes a spring 782 which biases the simulator piston 780 in one direction toward the first variable-volume chamber 786, which is connected to the pressurizing chamber 738. The second variable-volume chamber 788 is connected to the reservoir 125 through an electromagnetic shut-off valve 789.

When the electromagnetic shut-off valve 789 is placed in the open state, the second variable-volume chamber 788 is communicated with the reservoir 125, so that a change in the volume of this chamber 788 is permitted. That is, the stroke simulator 778 is in an operable state with the simulator piston 780 being movable, in the open state of the shut-off valve 789. In the closed state of the shut-off valve 789, a change of the volume of the second variable-volume chamber 788 is inhibited, and a movement of the simulator piston 780 is inhibited, so that the stroke simulator 778 is placed in an inoperable state. Thus, the electromagnetic shut-off valve 789 may be considered to be a simulator control valve.

The pressurizing chamber 738 is connected through a fluid passage 790 to the brake cylinders 74 for the front wheels 24, while the pressurizing chamber 736 is connected through a fluid passage 792 to the brake cylinders 78 for the rear wheels 26. The fluid passages 790, 792 are provided with respective master-cylinder cut-off valves 794, 796 in the form of electromagnetic shut-off valves. By opening and closing the master-cylinder cut-off valves 794, 796, the wheel brake cylinders 74, 78 are communicated to and isolated from the master cylinder 710. The master-cylinder cut-off valves 794, 796 are normally open valves which are held in the open state with their solenoid coils being de-energized.

Two check valves 797, 798 are connected in parallel to the respective master-cylinder cut-off valves 794, 796. The check valves 794, 796 permit flows of the fluid through the fluid passages 790, 792 in a direction from the master cylinder 710 toward the wheel brake cylinders 74, 78, and inhibit flows of the fluid in the reverse direction. When the fluid pressure in the master cylinder 710 is higher that that in the wheel brake cylinders 74, 78 while the master-cylinder cut-off valves 794, 796 are in the closed state, the check valves 797, 798 permit the fluid flows from the master cylinder 710 to the wheel brake cylinders 74, 78.

The assisting cylinder generally indicated at 800 is provided in portions of the fluid passages 790, 792 which are downstream of the master-cylinder cut-off valves 794, 796.

Like the assisting cylinder 114 provided in the preceding embodiments, the assisting cylinder 800 includes a housing 802, and two assisting pistons 806, 808 fluid-tightly and slidably received in the housing 802 through respective sealing members 804, 805. The housing 802 cooperates with the assisting pistons 806, 808 to define respective two assisting chambers 810, 812 on the front side of the pistons 806, 808. The assisting chambers 810, 812 are connected to the master cylinder 710 through the respective fluid passages 790, 792. The assisting piston 806 and the housing 802 cooperate to define a rear chamber 814 connected to the reservoir 125. In the present braking system, the fluid pressure in the rear chamber 814 is not controlled, and the assisting piston 806 is not moved by the fluid pressure in the rear chamber 814. To operate the assisting piston 806, there is provided a control motor 816 in the form of an electric motor. A controlled drive force of the control motor 816 is applied to the assisting piston 806, to thereby control the fluid pressure in the assisting chambers 810, 812, for thereby controlling the fluid pressure in the wheel brake cylinders 74, 78.

The control motor 816 is a bidirectionally operable electric motor. A rotary motion of the control motor 816 is converted by a motion converting device 820 into a linear motion. As shown in FIG. 27, a rotary motion of an output shaft 821 of the control motor 816 is transmitted through a pair of gears 822, 824 to a rotary shaft 826, and a rotary motion of the rotary shaft 826 is converted by the motion converting device 820 into a linear motion of a drive shaft 830. The assisting piston 806 is advanced by an advancing movement of the drive shaft 830. Thus, the drive torque of the control motor 816 is converted into the advancing movement of the drive shaft 830 for advancing the assisting piston 806. Reference numerals 834, 836 denote a thrust bearing and a radial bearing, respectively, and a reference numeral 838 denotes a flange adapted to receive an axial force.

As in the preceding embodiments, the fluid masses in the two assisting chambers 810, 812 are pressurized to the same pressure level, so that the front and rear wheel brake cylinders 74, 78 are supplied with the pressurized fluid masses having the same pressure, which is controlled by the assisting cylinder 800 operated by the control motor 816. The two assisting chambers 810, 812 are isolated from each other by the sealing members 805 disposed between the assisting piston 808 and the housing 802. In this arrangement, the front brake-application sub-system including the assisting chamber 810 and the front wheel brake cylinders 74 and the rear brake-application sub-system including the assisting chamber 812 and the rear wheel brake cylinders 78 are operated independently of each other, so that in the event of a failure of one of the sub-systems, a drop of the fluid pressure I the other sub-system can be reduced or prevented.

There will next be described an operation of the braking system of the present embodiment. When the brake pedal 80 is at rest, the electromagnetically operated or solenoid-operated valves are placed in the original positions shown in FIG. 27, and the assisting cylinder 800 is placed in the original non-operated state shown. When the brake pedal 80 is operated, the fluid pressurized by the master cylinder is delivered to the front and rear wheel brake cylinders 74, 78 through the respective assisting chambers 810, 812. The master-cylinder cut-off valves 794, 796 are held in the open state until the fluid pressure detected by the rear wheel brake sensor 338 has been raised to a level at which the fast filling of the brake cylinders 74, 78 is terminated.

In the master cylinder 710, the fluid pressure in the annular pressurizing chamber 746 and the pressurizing chamber 736 are increased as the pressurizing piston 730 is advanced (in the left direction as viewed in FIG. 27). The fluid pressure in the annular pressurizing chamber 746 is increased to the predetermined relief pressure of the pressure relief valve 772, and becomes higher than that in the pressurizing chamber 736. As a result, the fluid pressurized in the annular pressurizing chamber 746 is delivered to the pressurizing chamber 736, and the pressurized fluid is delivered from both of the chambers 746, 736 to the rear wheel brake cylinders 78. On the other hand, the pressurized fluid is delivered from only the pressurizing chamber 738 is delivered to the front wheel brake cylinders 74.

Since the rear wheel brake cylinders 78 are supplied with the pressurized fluid from both of the chambers 736, 746, the fluid pressure in the rear wheel brake cylinders 78 is raised at a comparatively high rate. At this time, the electromagnetic shut-off valve 789 is in the closed state, and the pressurized fluid in the pressurizing chamber 738 is not absorbed by the stroke simulator 778. Thus, the pressurized fluid is not wasted. It is also noted that since the relief pressure of the pressure relief valve 772 is higher than the pressure at which the fast filling of the wheel brake cylinders 74, 78 is completed, the pressurized fluid in the annular pressurizing chamber 746 is not discharged into the reservoir 125.

When the fluid pressure detected by the rear brake pressure sensor 338 has been increased to the level at which the fast filling of the front wheel brake cylinders 74 is terminated, the master-cylinder cut-off valves 784, 796 are switched to the closed state, and the electromagnetic shut-off valve 789 is switched to the open state. In this condition, the fluid pressure in the wheel brake cylinders 74, 78 is controlled by the assisting cylinder 800 operated by the control motor 816. Namely, the control motor 816 is activated to advance the first pressurizing piston 806 to pressurize the fluid in the first pressurizing chamber 810. As a result, the second pressurizing piston 808 is advanced to pressurize the fluid in the second pressurizing chamber 812. In the present embodiment, the amount of electric current to be applied to the control motor 816 is controlled such that the fluid pressure in the wheel brake cylinders 74, 78 corresponds to the operating force $F_P$ of the brake pedal 80.

In the master cylinder 710, the fluid pressurized in the annular pressurizing chamber 74 with an advancing movement of the pressurizing piston 730 is discharged to the reservoir 125 through the pressure relief valve 772 after the pressure of the pressurized fluid in the chamber 746 has been raised to the relief pressure of the pressure relief valve 772. If the pressurizing piston 730 is held at a given position for a relatively long time, the fluid pressure in the annular pressurizing chamber 746 is lowered to a level almost equal to the atmospheric pressure, due to a restricted flow of the fluid from the chamber 746 to the reservoir 125 through the orifice 774. Since the electromagnetic shut-off valve 789 is in the open state, the stroke simulator 778 is operable. That is, the shut-off valve 789 permits flows of the fluid between the pressurizing chamber 738 and the stroke simulator 778, thereby allowing a change of the operating stroke of the brake pedal 80 and improving the operating feel of the brake pedal 80.

When the servo system including the control motor 816 is defective, the operation of the assisting cylinder 800 is terminated, and the electromagnetic control valves are all returned to their original positions, and the master-cylinder cut-off valves 794, 796 are held in the open state. Since the rear wheel brake cylinders 78 are supplied with the pressurized fluid from both of the pressurizing chambers 746, 736 before the fast filling is completed (before the fluid pressure has reached the relief pressure of the pressure relief valve 772), the fast filling of the rear wheel brake cylinders 78 is completed in a relatively short time. Subsequently, the pressurized fluid in the pressurizing chamber 736 is applied to the wheel brake cylinders 78. In this instance, the fluid in the pressurizing chamber 736 is pressurized by the small-diameter portion 742, so that the fluid pressure in the chamber 736 in this instance is higher than the pressure of the fluid pressurized by the large-diameter portion 744 (than when the rear wheel brake cylinders 78 is supplied with the pressurized fluid from both of the chambers 746, 736), for a given amount of the operating force of the brake pedal 80.

It will be understood from the foregoing description of the present sixth embodiment that the check valve 750 and the flow restricting device 770 constitute a valve device having a first state in which the pressurized fluid is delivered from the two pressurizing chambers 746, 736 to the rear wheel brake cylinders 78, and a second state in which the pressurized fluid is delivered from only the pressurizing chamber 736 to the brake cylinders 784. It is noted that it is not essential to selectively enable or disable the stroke simulator 778 by selectively opening and closing the electromagnetic shut-off valve 789. The assisting piston 806 is permitted to be advanced since the check valve 840 is provided in parallel to the electromagnetic shut-off valve 789, to permit the fluid flow in a direction from the reservoir 125 toward the rear chamber 814 and inhibit the fluid flow in the reverse direction, Although the electromagnetic shut-off valve 789 is held in the open state while the assisting cylinder 800 is operated, the shut-off valve 789 may be closed while the fluid pressure in the assisting chambers 810, 812 is held constant. Since the fluid flow from the rear chamber 814 to the reservoir 125 is inhibited, the fluid pressure in the assisting chambers 810, 182 can be maintained even while the control motor 816 is at rest.

Each of the reservoir passages 764, 766 connecting the pressurizing chambers 736, 738 and the reservoir 125 may be provided with a discharge inhibiting valve 950 adapted to inhibit a large volume of the fluid from the pressurizing chambers 736, 738 of the master cylinder 710 to the reservoir 125.

Figure 28:
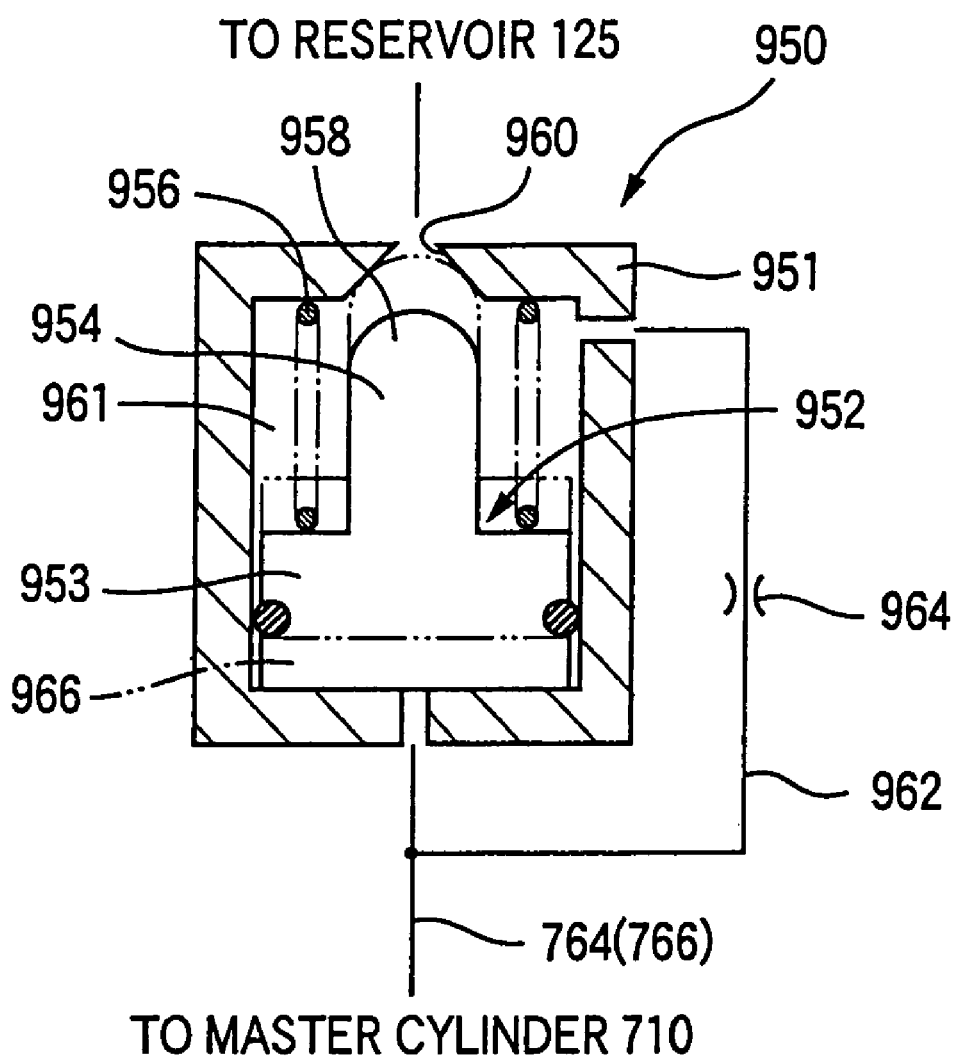
FIG. 28 is a fragmentary hydraulic circuit diagram of a hydraulic braking apparatus including a braking system according to yet another embodiment of the invention.

An example of the discharge inhibiting valve 950 is illustrated in FIG. 28. This discharge inhibiting valve 950 provided according to a seventh embodiment of this invention includes a housing 951, and a piston 952 fluid-tightly and slidably received in the housing 951. The piston 952 is a stepped member including a large-diameter portion 953, and a small-diameter portion 954 which has a valve member 958 at its distal end. The piston 952 is biased by a spring 956 in a direction that causes the valve member 958 to be moved away from a valve seat 960. The housing 951 cooperates with the piston 952 to define a first chamber 961 on one side of the piston 952, and a second chamber 966 on the other side of the piston 952. When the valve member 958 is spaced apart from the valve seat 960, the first chamber 961 is communicated through the reservoir passage 764, 766 to the reservoir 125. The second chamber 966 is connected through the reservoir passage 764, 766 to the master cylinder 710.

A fluid passage 962 is connected at its one end to the first chamber 961, and at the other end to a portion of the reservoir passage 764, 766 between the discharge inhibiting valve 950 and the master cylinder 710, so that the fluid pressure generated in the master cylinder 710 is applied to the first and second chambers 961, 966. The fluid passage 962 is provided with an orifice 964.

When the braking system is normal, the valve member 958 is held apart from the valve seat 960 under the biasing action of the spring 956, so that the discharge inhibiting valve 950 is placed in the open state. While the pressurizing pistons 730, 732 are located at their fully retracted positions, the fluid in the pressurizing chambers 736, 738 is discharged into the reservoir 125 through the reservoir passages 764, 766, the fluid passage 962 and the first chamber 961 of the discharge inhibiting valve 950. While the pressurizing pistons 730, 732 are not located at their fully retracted positions, that is, while the brake pedal 80 is in operation, the ports 760, 762 of the master cylinder 710 are closed, so that the fluid in the pressurizing chambers 736, 738 is prevented from being discharged into the reservoir 125, even while the discharge inhibiting valve 950 is in the open state.

Where the pressurized fluid in the assisting cylinder 800 is delivered to the pressurizing chamber 736, 738 through the master-cylinder cut-off valve 794, 796 which is abnormally stuck in the open state, for instance, the fluid pressure in the pressurizing chamber 736, 738 is raised to an excessively high level with respect to the operating force of the brake pedal 80. In this event, the pressurizing pistons 730, 732 are returned to their fully retracted positions, for instance, and the pressurized fluid is discharged from the pressurizing chambers 736, 738 at a comparatively high rate toward the reservoir 125. Accordingly, the fluid pressure in the portion of the reservoir passage 764, 766 between the master cylinder 710 and the discharge inhibiting valve 950 is made higher than that in the portion of the reservoir passage 764, 766 between the valve 950 and the reservoir 125, so that the fluid pressure in the second chamber 966 is made higher than that in the first chamber 961. As a result, the piston 952 is advanced against the biasing force of the spring 956, and the valve member 954 is seated on the valve seat 960. Namely, the fluid pressure in the second chamber 966 becomes higher than that in the first chamber 961, in the presence of the orifice 964 in the fluid passage 962, so that the piston 952 is moved to place the valve 950 in the closed state. Thus, the discharge inhibiting valve 950 is operable to prevent the discharge flow of the fluid from the pressurizing chambers 736, 738, for thereby reducing a drop of the fluid pressure in these chambers 736, 738. Therefore, the fluid pressure in the wheel brake cylinders 74, 78 can be controlled by controlling the assisting cylinder 800 even when the master-cylinder cut-off valve 794, 796 is defectively held open.

The discharge inhibiting valve 950 may be replaced an electromagnetic shut-off valve whose duty ratio is controlled. The discharge inhibiting valve 950 may be provided in the braking systems of FIGS. 1, 16, 18 and 21, for instance, in the fluid passage 130 connecting the pressurizing chamber 104 and the reservoir 125.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A braking system comprising:
   a brake operating member manually operable by an operator of the braking system;
   a master cylinder operable upon an operation of said brake operating member and including a housing, and at least two pressurizing pistons which are fluid-tightly and slidably fitted in said housing and which cooperate with said housing to define at least two pressurizing chambers which are isolated from each other, and wherein a working fluid in each of said at least two pressurizing chambers is pressurized by an advancing movement of a corresponding one of said at least two pressurizing pistons;
   a hydraulically operable brake cylinder for activating a brake; and
   a valve device having a first state in which the pressurized fluid is delivered from two pressurizing chambers of said at least two pressurizing chambers to said brake cylinder, and a second state in which the pressurized fluid is delivered from only one of said two pressurizing chambers to said brake cylinder, wherein:
   the braking system is structured such that when the at least two pressurizing pistons move relative to the housing while the valve device is in the second state, the fluid is permitted to be discharged from the only one of said two pressurizing chambers and delivered to the brake cylinder, but none of the fluid permitted to be discharged from the other of the two pressurizing chambers is permitted to be delivered to said brake cylinder,
   the braking system is structured to have the first state and the second state in a normal braking operation in which the pressure of the pressurized fluid in the brake cylinder changes with an amount of operation of the brake operating member, and
   said valve device is placed in said first state while the pressure of the pressurized fluid in said other of said two pressurizing chambers is not higher than a first predetermined value, and is placed in said second state while the pressure of the pressurized fluid in said other pressurizing chamber is higher than said first predetermined value.

2. A braking system according to claim 1, wherein said valve device is placed in said first state while the pressure of the pressurized fluid in said other pressurizing chamber is higher than that in said one pressurizing chamber, and is placed in said second state while the pressure of the pressurized fluid in said other pressurizing chamber is not higher than that in said one pressurizing chamber, said valve device placed in said second state permitting a flow of the pressurized fluid from said one pressurizing chamber to said brake cylinder and inhibiting a flow of the pressurized fluid from said other pressurizing chamber to said brake cylinder.

3. A braking system according to claim 1, wherein said brake cylinder is connected to a first pressurizing chamber which is one of said two pressurizing chambers, and said valve device includes an internal valve incorporated within said master cylinder, said valve device having a state in which the pressurized fluid supplied from a second pressurizing chamber which is the other of said two pressurizing chambers, to said first pressurizing chamber, and a state in which the pressurized fluid is not supplied from said second pressurizing chamber to said first pressurizing chamber.

4. A braking system according to claim 3, wherein said internal valve is a check valve which permits a flow of the pressurized fluid in a first direction from said second pressurizing chamber toward said first pressurizing chamber and inhibits a flow of the pressurized fluid in a second direction opposite to said first direction.

5. A braking system according to claim 3, further comprising a low-pressure source, and wherein said valve device further includes a pressure relief valve which inhibits a discharge flow of the pressurized fluid from said second pressurizing chamber into said low-pressure source when the pressure of the pressurized fluid in said second pressurizing chamber is not higher than a second predetermined value, and permits said discharge flow when the pressure of the pressurized fluid in said second pressurizing chamber is higher than said second predetermined value.

6. A braking system according to claim 1, further comprising two separate fluid passages which are connected to said two pressurizing chambers, respectively, and which merge into a common fluid passage to which said brake cylinder is connected, said valve device including at least one valve provided in at least one of said two separate fluid passages.

7. A baking system according to claim 6, wherein said at least one valve of said valve device includes at least one switch valve which is provided in at least one of said two separate fluid passages and which is operable between two states for respectively permitting and inhibiting a flow of the fluid from the corresponding pressurizing chamber toward said brake cylinder.

8. A braking system according to claim 6, further comprising a low-pressure source, and wherein said at least one valve of said valve device includes a pressure relief valve connected to one of said two separate fluid passages, said pressure relief valve inhibiting a discharge flow of the pressurized fluid from the corresponding one of said two pressurizing chamber to said low-pressure source while the pressure of the pressurized fluid in said corresponding pressurizing chamber is not higher than a second predetermined value, and permitting said discharge flow of the pressurized fluid while the pressure of the pressurized fluid in said corresponding pressurizing chamber is higher than said second predetermined value.

9. A braking system according to claim 8, wherein said at least two pressurizing pistons comprise two pressurizing pistons which cooperate with said housing to define said two pressurizing chambers and which are moved as a unit.

10. A braking system according to claim 8, wherein said at least one valve of said valve device further includes a check valve provided in a portion of said one of said two separate fluid passages, which portion is between said brake cylinder and a point of connection of said pressure relief valve to said one fluid passage, and said check valve permitting a flow of the pressurized fluid in a first direction from said corresponding pressurizing chamber toward said brake cylinder and inhibiting a flow of the pressurized fluid in a second direction opposite to said first direction.

11. A braking system according to claim 10, wherein said at least two pressurizing pistons comprise two pressurizing pistons which cooperate with said housing to define said two pressurizing chambers and which are moved as a unit.

12. A braking system according to claim 1, wherein said at least two pressurizing pistons comprise two pressurizing pistons which cooperate with said housing to define said two pressurizing chambers and which are moved as a unit.

13. A braking system according to claim 1, further comprising a stroke simulating device including a stroke simulator connected to one of said at least two pressurizing chambers, and a simulator control valve operable to control said stroke simulator.

14. A braking system according to claim 13, wherein said stroke simulator permits a flow of the pressurized fluid from said corresponding pressurizing chamber into said stroke simulator while the pressure of the pressurized fluid in said corresponding pressurizing chamber is higher than a second predetermined value.

15. A braking system according to claim 1, wherein said valve device includes a master-cylinder cut-off valve disposed between at least one of said at least two pressurizing chambers and said brake cylinder, said master-cylinder cut-off valve having an open state in which said brake cylinder is communicated with said at least one of said at least two pressurizing chambers, and a closed state in which said brake cylinder is isolated from said at least one of said at least two pressurizing chambers.

16. A braking system according to claim 15, further comprising two separate fluid passages which are connected to said two pressurizing chambers, respectively, and wherein said master-cylinder cut-off valve is disposed in each of at least one of said two separate fluid passages, and said valve device further includes a first check valve which is disposed in parallel connection with said master-cylinder cut-off valve and which permits a flow of the pressurized fluid in a first direction from a corresponding one of said two pressurizing chambers toward said brake cylinder and inhibits a flow of the pressurized fluid in a second direction opposite to said first direction.

17. A braking system according to claim 16, wherein said master-cylinder cut-off valve is disposed in one of said two separate fluid passages which is connected to one of said two pressurizing chambers, and said valve device includes a pressure relief valve and a second check valve which are connected to the other of said two pressurizing chambers, said pressure relief valve being switched from a closed state to an open state when the pressure of the pressurized fluid in said other pressurizing chamber becomes higher than a second predetermined value, said second check valve permitting a flow of the pressurizing fluid in a first direction from said other pressurizing chamber toward said brake cylinder and inhibits a flow of the pressurized fluid in a second direction opposite to said first direction.

18. A braking system according to claim 1, wherein said housing has a large-diameter portion and a small-diameter portion which is located in front of said large-diameter portion and which has a smaller diameter than said large-diameter portion, and one of said at least one pressurizing pistons is a large-diameter piston fluid-tightly and slidably fitted in said large-diameter portion, while another of said at least two pressurizing pistons is a small-diameter piston fluid-tightly and slidably fitted in said small-diameter portion, said large-diameter and small-diameter pistons being moved as a unit, said small-diameter piston partially defining one of said two pressurizing chambers in front of said small-diameter portion, while said large-diameter piston and said small-diameter piston partially defining therebetween the other of said two pressurizing chambers.

19. A braking system according to claim 18, wherein said valve device includes a pressure relief valve and an orifice which are connected to said other of said two pressurizing chambers such that said pressure relief valve and said orifice are disposed in parallel with each other.

20. A braking system according to claim 18, wherein said valve device includes a pressure relief valve connected to said other of said two pressurizing chambers.

21. A braking system according to claim 1, wherein said at least two pressurizing pistons include two pressurizing pistons have respective different pressure-receiving surface areas which partially define said two pressurizing chambers, respectively.

22. A braking system according to claim 1, wherein said two pressurizing chambers of said master cylinder have different transverse cross sectional areas.

23. A braking system according to claim 1, wherein said master cylinder is a master cylinder of tandem type that includes the at least two pressurizing pistons arranged in series with each other and partially defining the two pressurizing chambers as front and rear pressurizing chambers, respectively, the brake cylinder includes a first brake cylinder and a second brake cylinder, said front pressurizing chamber being connected to the first brake cylinder while said rear pressurizing chamber being connected to the second brake cylinder, said valve device including a directional control valve disposed between said first and second brake cylinders and one of said front and rear pressurizing chambers, said directional control valve having a first and a second state for fluid communication of said one pressurizing chamber and said first and second brake cylinders, respectively.

24. A braking system according to claim 1, wherein said master cylinder has a rear pressure chamber partially defined by a rear surface of one of said at least two pressurizing pistons, said braking system further comprising a master-cylinder pressure control device operable to control a pressure of the fluid in said rear pressure chamber of said master cylinder.

25. A braking system according to claim 1, further comprising an assisting pressure control device disposed between said master cylinder and said brake cylinder and operable to control the pressure of the fluid in said brake cylinder such that the pressure of the fluid in said brake cylinder is higher than that of the fluid in said master cylinder.

26. A braking system according to claim 25, wherein said assisting pressure control device comprising (a) an assisting cylinder including a housing, and an assisting piston which is fluid-tightly and slidably fitted in said housing and which cooperates with said housing to define an assisting chamber connected to said brake cylinder, and (b) a power-operated assisting-piston drive device operable to move said assisting piston relative to said housing.

27. A braking system according to claim 25, further comprising a braking-pressure control valve device disposed between said assisting cylinder and said brake cylinder.

28. A braking system comprising:
a master cylinder including a housing, and a pressurizing piston which is fluid-tightly and slidably fitted in said housing and which is operatively connected to a manually operable brake operating member, said pressurizing piston cooperating with said housing to define a pressurizing chamber and a rear pressure chamber on respective front and rear sides thereof;
a brake cylinder connected to said pressurizing chamber;
an assisting cylinder including a housing, and an assisting piston fluid-tightly and slidably fitted in said housing and cooperating with said housing to define an assisting chamber in front of said assisting piston, said assisting chamber being connected to said brake cylinder and said master cylinder such that said assisting chamber is located between said brake cylinder and said master cylinder;
a master-cylinder cut-off valve disposed between said assisting chamber and said pressurizing chamber, and having an open state in which said assisting chamber and said pressurizing chamber are communicated with each other, and a closed state in which said assisting chamber and said pressurizing chamber are isolated from each other;
a stroke simulating device operable to permit flows of a working fluid between said stroke simulating device and said pressurizing chamber according to a movement of said pressurizing piston while said master-cylinder cut-off valve is placed in said closed state, such that said stroke simulating device applies to said pressurizing piston a reaction force which corresponds to a pressure of the fluid in said pressurizing chamber; and
a braking characteristic control device operable to control a pressure of the fluid in said rear pressure chamber and the pressure of the fluid in said assisting chamber, for thereby controlling braking characteristics of the braking system,
and wherein said braking characteristic control device comprises:
a first control portion operable while said master-cylinder cut-off valve is placed in said closed state, to control the pressure of the fluid in said rear pressure chamber on the basis of an operating stroke of said brake operating member, and control the pressure of the fluid in said assisting chamber on the basis of an operating force of said brake operating member; and
a second control portion operable while said master-cylinder cut-off valve is placed in said open state, to control the pressure of the rear pressure chamber on the basis of said operating force, and control the pressure of the fluid in said assisting chamber on the basis of said operating stroke.

29. A braking system according to claim 28, which is adapted to be installed on a vehicle, wherein said braking characteristic control device further comprises a control-portion selecting portion operable to select one of said first and second control portions on the basis of an operating state of said vehicle.

30. A braking system according to claim 28, wherein said housing of said assisting cylinder and said assisting piston of said assisting cylinder cooperate to define an assisting rear pressure chamber on a rear side of said assisting piston remote from said assisting chamber, said assisting cylinder being operated according to the pressure of the fluid in said assisting rear pressure chamber, said braking system further comprising a hydraulic pressure source operable to deliver a pressurized fluid used commonly for said rear pressure chamber of said master cylinder and said assisting rear pressure chamber of said assisting cylinder,
and wherein said braking characteristic control device includes a ratio control portion operable while said master-cylinder cut-off valve is placed in said closed state, to control a ratio of a rate of flow of the pressurized fluid from said hydraulic pressure source to said assisting rear pressure chamber of said assisting chamber, to a rate of flow of the pressurized fluid from said hydraulic pressure source to said rear pressure chamber of said master cylinder.

31. A braking system according to claim 30, wherein said ratio control portion includes a first cut-off valve disposed between said hydraulic pressure source and said rear pressure chamber of said master cylinder and having an open state and a closed state in which said rear pressure chamber is communicated with and isolated from said hydraulic pressure source, respectively, a second cut-off valve disposed between said hydraulic pressure source and said assisting rear pressure chamber and having an open state and a closed state in which said assisting rear pressure chamber is communicated with and isolated from said hydraulic pressure source, and a cut-off valve control portion operable to control at least one of said first and second cut-off valves for thereby controlling the rates of flows of the pressurized fluid from said hydraulic pressure source to said rear pressure chamber of said master cylinder and said assisting rear pressure chamber of said assisting cylinder.

32. A braking system according to claim 28, further comprising at least one of:
a first diagnosing device operable while said master-cylinder cut-off valve is in said closed state, to diagnose a manual-pressure-generating system on the basis of a relationship between an operating state of said manually operable brake operating member and the pressure of the fluid in said pressurizing chamber of said master cylinder; and a second diagnosing device operable while said master-cylinder cut-off valve is in said closed state, to diagnose a brake-cylinder activating system on the basis of a relationship between the pressure of the fluid in said brake cylinder and an operating state of said assisting cylinder.

33. A braking system according to claim 32, wherein said control-portion selecting portion is operable to select said first control portion when said first diagnosing device has detected that said manual-pressure-generating system is defective.

34. A braking system according to claim 28, further comprising a third diagnosing device operable to diagnose the braking system, on the basis of at least two relationships selected from relationships between at least two of the operating state of said brake operating member, the fluid pressure in said pressurizing chamber of said master cylinder, the operating state of said assisting cylinder, and the fluid pressure in said brake cylinder, which are obtained while said maser-cylinder cut-off valve is in at least one of said closed and open states.

35. A braking system according to claim 34, wherein said control-portion selecting portion is operable to select said first control portion when said first diagnosing device has detected that said manual-pressure-generating system is defective.

36. A braking system comprising:
a master cylinder including a pressurizing piston which is operatively connected to a manually operable brake operating member and which defines a pressurizing chamber and a rear pressure chamber on respective front and rear sides thereof;
a brake cylinder connected to said pressurizing chamber;
an assisting cylinder including a housing, and an assisting piston fluid-tightly and slidably fitted in said housing and cooperating with said housing to define an assisting chamber and an assisting rear pressure chamber on respective front and rear sides thereof, said assisting chamber being connected to said brake cylinder and said master cylinder such that said assisting chamber is located between said brake cylinder and said master cylinder wherein said assisting cylinder being operated according to the pressure of the fluid in said assisting rear pressure chamber;
a master-cylinder cut-off valve disposed between said assisting chamber and said pressurizing chamber, and having an open state in which said assisting chamber and said pressurizing chambers are communicated with each other, and a closed state in which said assisting chamber and said pressurizing chamber are isolated from each other;
a braking characteristic control device operable to control at least one of a pressure of the fluid in said rear pressure chamber of said master cylinder and a pressure of the fluid said assisting rear pressure chamber, for thereby controlling braking characteristics of the braking system; and
a hydraulic pressure source operable to deliver a pressurized fluid used commonly for said rear pressure chamber of said master cylinder and said assisting rear pressure chamber of said assisting cylinder,
and wherein said braking characteristic control device includes a ratio control portion operable while said master-cylinder cut-off valve is placed in said closed state, to control a ratio of a rate of flow of the pressurized fluid from said hydraulic pressure source to said assisting rear pressure chamber of said assisting chamber, to a rate of flow of the pressurized fluid from said hydraulic pressure source to said rear pressure chamber of said master cylinder.

37. A braking system according to claim 36, further comprising at least one of:
a first diagnosing portion operable while said master-cylinder cut-off valve is in said closed state, to diagnose a manual-pressure-generating system on the basis of a relationship between an operating state of said manually operable brake operating member and the pressure of the fluid in said pressurizing chamber of said master cylinder; and
a second diagnosing portion operable while said master-cylinder cut-off valve is in said closed state, to diagnose a brake-cylinder activating system on the basis of a relationship between the pressure of the fluid in said brake cylinder and an operating state of said assisting cylinder.

38. A braking system according to claim 36, further comprising a third diagnosing device operable to diagnose the braking system, on the basis of at least two relationships selected from relationships between at least two of the operating state of said brake operating member, the fluid pressure in said pressurizing chamber of said master cylinder, the operating state of said assisting cylinder, and the fluid pressure in said brake cylinder, which are obtained while said maser-cylinder cut-off valve is in said closed and open states.

39. A braking system comprising:
a manual pressure-generating system including a manually operable brake operating member, and a master cylinder including a pressurizing piston which is operatively connected to said manually operable brake operating member and which defines a pressurizing chamber and a rear pressure chamber on respective front and rear sides thereof;
a brake cylinder connected to said pressurizing chamber;
an assisting cylinder including a housing, and an assisting piston fluid-tightly fitted in said housing and cooperating with said housing to define an assisting chamber and an assisting rear pressure chamber on respective front and rear sides thereof, said assisting chamber being connected to said brake cylinder and said pressurizing chamber of said master cylinder, said assisting cylinder being operated according to a pressure of the fluid in said assisting rear pressure chamber;
a master-cylinder cut-off valve disposed between said assisting chamber and said pressurizing chamber, and having an open state in which said assisting chamber and said pressurizing chamber are communicated with each other, and a closed state in which said assisting chamber and said pressurizing chamber are isolated from each other;
a braking characteristic control device operable to control a pressure of the fluid in said rear pressure chamber of said master cylinder, and the pressure of the fluid in said assisting rear pressure chamber, for thereby controlling braking characteristics of the braking system; and
a diagnosing device operable while said master-cylinder cut-off valve is in said closed state, to diagnose said manual-pressure-generating system on the basis of a relationship between an operating state of said manually operable brake operating member and the pressure of the fluid in said pressurizing chamber of said master cylinder, and wherein said braking characteristic control device is operated with said master-cylinder cut-off valve held in said open state when said diagnosing device determines that said manual-pressure-generating system is normally operable.

40. A braking system according to claim 39, further comprising another diagnosing device operable, while said master-cylinder cutoff valve is in said closed state, to diagnose a brake-cylinder activating system on the basis of a relationship between the pressure of the fluid in said brake cylinder and an operating state of said assisting cylinder, and wherein said brake-cylinder activating system includes said brake cylinder and said assisting cylinder.

41. A braking system comprising:
a master cylinder including a pressurizing piston which is operatively connected to a manually operable brake operating member and which defines a pressurizing chamber on a front side thereof;
a brake-cylinder activating system including (a) a brake cylinder connected to said pressurizing chamber, and (b) an assisting cylinder including a housing, and an assisting piston fluid-tightly and slidably fitted in said housing and cooperating with said housing to define an assisting chamber and an assisting rear pressure chamber on respective front and rear sides thereof, said assisting chamber being connected to said brake cylinder and said master cylinder such that said assisting chamber is located between said brake cylinder and said master cylinder, said assisting cylinder being operated according to a pressure of a working fluid in said assisting rear pressure chamber;
a master-cylinder cut-off valve disposed between said assisting chamber and said pressurizing chamber, and having an open state in which said assisting chamber and said pressurizing chamber are communicated with each other, and a closed state in which said assisting chamber and said pressurizing chamber are isolated from each other;
a braking characteristic control device operable to control a pressure of the fluid in said assisting rear pressure chamber, for thereby controlling braking characteristics of the braking system; and
a diagnosing device operable, while said master-cylinder cut-off valve is in said closed state, to diagnose said brake-cylinder activating system on the basis of a relationship between the pressure of the fluid in said brake cylinder and an operating state of said assisting cylinder.

42. A braking system comprising:
a brake operating member manually operable by an operator of the braking system;
a master cylinder operable upon an operation of said brake operating member and including a housing, and at least two pressurizing pistons which are fluid-tightly and slidably fitted in said housing and which cooperate with said housing to define at least two pressurizing chambers which are isolated from each other, and wherein a working fluid in each of said at least two pressurizing chambers is pressurized by an advancing movement of a corresponding one of said at least two pressurizing pistons;
a hydraulically operable brake cylinder for activating a brake; and
a valve device having a first state in which the pressurized fluid is delivered from two pressurizing chambers of said at least two pressurizing chambers to said brake cylinder, and a second state in which the pressurized fluid is delivered from only one of said two pressurizing chambers to said brake cylinder, wherein:
the braking system is structured such that when the at least two pressurizing pistons move relative to the housing while the valve device is in the second state, the fluid is permitted to be discharged from the only one of said two pressurizing chambers and delivered to the brake cylinder, but none of the fluid permitted to be discharged from the other of the two pressurizing chambers is permitted to be delivered to said brake cylinder,
the braking system is structured to have the first state and the second state in a normal braking operation in which the pressure of the pressurized fluid in the brake cylinder changes with an amount of operation of the brake operating member, and
said master cylinder has a rear pressure chamber partially defined by a rear surface of one of said at least two pressurizing pistons, said braking system further comprising a master-cylinder pressure control device operable to control a pressure of the fluid in said rear pressure chamber of said master cylinder.

43. A braking system comprising:
a brake operating member manually operable by an operator of the braking system;
a master cylinder operable upon an operation of said brake operating member and including a housing, and at least two pressurizing pistons which are fluid-tightly and slidably fitted in said housing and which cooperate with said housing to define at least two pressurizing chambers which are isolated from each other, and wherein a working fluid in each of said at least two pressurizing chambers is pressurized by an advancing movement of a corresponding one of said at least two pressurizing pistons;
a hydraulically operable brake cylinder for activating a brake;
a valve device having a first state in which the pressurized fluid is delivered from two pressurizing chambers of said at least two pressurizing chambers to said brake cylinder, and a second state in which the pressurized fluid is delivered from only one of said two pressurizing chambers to said brake cylinder;
an assisting pressure control device disposed between said master cylinder and said brake cylinder and operable to control the pressure of the fluid in said brake cylinder such that the pressure of the fluid in said brake cylinder is higher than that of the fluid in said master cylinder; and
a braking-pressure control valve device disposed between said assisting cylinder and said brake cylinder, wherein:
the braking system is structured such that when the at least two pressurizing pistons move relative to the housing while the valve device is in the second state, the fluid is permitted to be discharged from the only one of said two pressurizing chambers and delivered to the brake cylinder, but none of the fluid permitted to be discharged from the other of the two pressurizing chambers is permitted to be delivered to said brake cylinder, and
the braking system is structured to have the first state and the second state in a normal braking operation in which the pressure of the pressurized fluid in the brake cylinder changes with an amount of operation of the brake operating member.

* * * * *